US009253670B2

(12) United States Patent
Kim et al.

(10) Patent No.: US 9,253,670 B2
(45) Date of Patent: Feb. 2, 2016

(54) METHOD AND APPARATUS FOR PERFORMING COMMUNICATION IN A WIRELESS COMMUNICATION SYSTEM

(71) Applicant: Samsung Electronics Co., Ltd, Gyeonggi-do (KR)

(72) Inventors: Soeng-Hun Kim, Gyeonggi-do (KR); Gert Jan Van Lieshout, Middlesex (GB); Kyeong-In Jeong, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 112 days.

(21) Appl. No.: 14/093,273

(22) Filed: Nov. 29, 2013

(65) Prior Publication Data

US 2014/0146697 A1    May 29, 2014

(30) Foreign Application Priority Data

| Nov. 28, 2012 | (KR) | .................. | 10-2012-0136411 |
| Jan. 18, 2013 | (KR) | .................. | 10-2013-0005876 |
| Jan. 28, 2013 | (KR) | .................. | 10-2013-0009091 |
| Apr. 5, 2013 | (KR) | .................. | 10-2013-0037375 |

(51) Int. Cl.
*H04W 24/08* (2009.01)
*H04W 72/04* (2009.01)
*H04B 7/04* (2006.01)
*H04L 5/00* (2006.01)

(52) U.S. Cl.
CPC ............ *H04W 24/08* (2013.01); *H04W 72/042* (2013.01); *H04B 7/0413* (2013.01); *H04L 5/001* (2013.01)

(58) Field of Classification Search
None
See application file for complete search history.

(56) References Cited

U.S. PATENT DOCUMENTS

| 2010/0008348 | A1 | 1/2010 | Zhang et al. |
| 2010/0034158 | A1 | 2/2010 | Meylan |
| 2010/0035624 | A1 | 2/2010 | Tseng |
| 2010/0061278 | A1 | 3/2010 | McCoy |
| 2011/0116364 | A1 | 5/2011 | Zhang et al. |
| 2013/0235808 | A1* | 9/2013 | Earnshaw et al. ............. 370/329 |

FOREIGN PATENT DOCUMENTS

KR    10-2011004490    5/2011

OTHER PUBLICATIONS

Extended European Search Report dated Mar. 7, 2014 in connection with European Patent Application No. 13194831.7, 10 pages.
International Search Report dated Feb. 18, 2014 in connection with International Patent Application No. PCT/KR2013/010926, 3 pages.

(Continued)

*Primary Examiner* — Kerri Rose

(57) ABSTRACT

A method and apparatus for performing communication in a wireless communication system are provided. The method includes receiving Measurement Gap (MG) configuration information related to the measurement gap, determining a subframe number specifying a starting point of the measurement gap based on the measurement gap configuration information, starting the measurement gap at an end of a subframe immediately before a subframe of the determined subframe number, performing a predetermined measurement operation during the measurement gap, and performing a predetermined operation in a subframe immediately after the measurement gap based on a duplexing mode of a User Equipment (UE) and a type of the subframe immediately before the measurement gap.

20 Claims, 35 Drawing Sheets

(56) References Cited

OTHER PUBLICATIONS

Written Opinion of the International Searching Authority dated Feb. 18, 2014 in connection with International Patent Application No. PCT/KR2013/010926, 4 pages.

Catt, "Measurement Gap Handling for Full-Duplex TDD UE", 3GPP TSG RAN WG2 Meeting #80, R2-125575, New Orleans, Louisiana, Nov. 12-16, 2012, 3 pages.

Catt, et al., "Measurement Gap in Uplink for Different TDD Configurations", 3GPP TSG RAN WG2 Meeting #80, R2-125576, Nov. 12-16, 2012, New Orleans, Louisiana, 3 pages.

Nokia Siemens Networks, et al., "Measurement Gap Creation", 3GPP TSG-RAN WG2 Meeting #59, R2-073397, Aug. 20-24, 2007, Athens, Greece, 5 pages.

3GPP TS 36.133 V.9.13.0 (Sep. 2012), 3rd Generation Partnership Project; Technical Specification Group Radio Access Network; Evolved Universal Terrestrial Radio Access (E-UTRA); Requirements for Support Radio Resource Management (Release 9); Sep. 24, 2012, 518 pages.

3GPP TS 36.331 V11.1.0 (Sep. 2012), "3rd Generation Partnership Project; Technical Specification Group Radio Access Network; Evolved Universal Terrestrial Radio Access (E-UTRA); Radio Resource Control (RRC); Protocol Specification (Release 11)", Sep. 23, 2012, 325 pages.

* cited by examiner

FIG. 30

METHOD AND APPARATUS FOR PERFORMING COMMUNICATION IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 28, 2012 and assigned Serial No. 10-2012-0136411, a Korean patent application filed in the Korean Intellectual Property Office on Jan. 18, 2013 and assigned Serial No. 10-2013-0005876, a Korean patent application filed in the Korean Intellectual Property Office on Jan. 28, 2013 and assigned Serial No. 10-2013-0009091, and a Korean patent application filed in the Korean Intellectual Property Office on Apr. 5, 2013 and assigned Serial No. 10-2013-0037375, the entire disclosure of any of which is incorporated herein by reference.

The present application also incorporates herein by reference in its entirety U.S. patent application Ser. No. 14/093,257, titled "METHOD AND APPARATUS FOR PERFORMING COMMUNICATION IN A WIRELESS COMMUNICATION SYSTEM" and filed on Nov. 29, 2013.

TECHNICAL FIELD

The present disclosure relates generally to a communication system, and more particularly, to a method and apparatus for transmitting and receiving data in a wireless communication system.

BACKGROUND

Mobile communication systems have been developed to guarantee mobility of users and enable communication for the users. Due to the drastic development of technology, the mobile communication systems provide high-speed data communication service as well as voice communication service.

A future-generation mobile communication system, 3rd Generation Partnership Project Long Term Evolution (3GPP LTE) achieves high-speed packet communication at a data rate of up to 100 Mbps higher than 3GPP data rates. In addition, an LTE-Advanced (LTE-A) system is under discussion, which increases data rates by applying new techniques to the LTE communication system. Hereinbelow, the term "LTE" covers both the legacy LTE system and the LTE-A system.

The LTE standard supports both duplexing modes, Frequency Division Duplexing (FDD) and Time Division Duplexing (TDD). In FDD, different frequency bands are used for an UpLink (UL) and a DownLink (DL), whereas in TDD, the same frequency band is used for a UL and a DL.

One of new techniques to be introduced to the LTE-A system is Carrier Aggregation (CA). In CA, a User Equipment (UE) transmits and receives data in multiple carriers. Specifically, the UE transmits and receives data in a plurality of aggregated carriers (generally, carriers serviced by the same evolved Node B (eNB)). Data transmission and reception of the UE in aggregated carriers is equivalent to data transmission and reception of the UE through a plurality of cells. Therefore, there exists a need for a technique that enables a UE to reliably transmit and receive data to and from an eNB, when CA is applied to TDD cells having different frequency bands and different subframe patterns.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for transmitting and receiving control signals required for data communication in a wireless communication system.

Another aspect of the present disclosure is to provide a method and apparatus for measuring non-serving frequencies in a wireless communication system supporting a plurality of frequencies.

Another aspect of the present disclosure is to provide a method and apparatus for configuring a measurement gap during which an UE does not perform an uplink transmission and a downlink reception in a wireless communication system supporting a plurality of frequencies.

Another aspect of the present disclosure is to provide a method and apparatus for reporting a Rank Indication (RI) for a Multiple Input Multiple Output (MIMO) operation.

Another aspect of the present disclosure is to provide a method and apparatus for determining the number of bits (or the bit width) of an RI representing the number of layers for spatial multiplexing.

Another aspect of the present disclosure is to provide a method and apparatus for transmitting and receiving data to and from a Base Station (BS) in a Time Division Duplexing (TDD) terminal, when the carriers of TDD cells having different subframe patterns are aggregated.

Another aspect of the present disclosure is to provide a method and apparatus for transmitting and receiving data in aggregated carriers of TDD cells having different subframe configurations.

In accordance with an aspect of the present disclosure, there is provided a communication method in a wireless communication system. The method includes receiving Measurement Gap (MG) configuration information related to a measurement gap, wherein the measurement gap comprises a time period during which the UE does not perform an uplink transmission and a downlink reception, determining a subframe number specifying a starting point of the measurement gap based on the measurement gap configuration information, starting the measurement gap at an end of a subframe immediately before a subframe of the determined subframe number, performing a predetermined measurement operation during the measurement gap, and performing a predetermined operation in a subframe immediately after the measurement gap based on a duplexing mode of a User Equipment (UE) and a type of the subframe immediately before the measurement gap.

In accordance with another aspect of the present disclosure, there is provided a communication method in a wireless communication system. The method includes transmitting, to a UE, measurement gap (MG) configuration information related to a measurement gap, wherein the MG comprises a time period during which the UE does not perform an uplink transmission and a downlink reception, determining subframes included in the measurement gap based on the measurement gap configuration information, and if a subframe immediately before the measurement gap is a downlink subframe, blocking monitoring of an uplink transmission from the UE in an uplink subframe immediately after the measurement gap.

In accordance with another aspect of the present disclosure, there is provided an apparatus of a UE for performing communication in a wireless communication system. The apparatus of the UE includes a transceiver configured to receive measurement gap (MG) configuration information related to a measurement gap, wherein the measurement gap comprises a time period during which the UE does not perform an uplink transmission and a downlink reception, and a controller configured to determine a subframe number specifying a starting point of the measurement gap based on the measurement gap configuration information, to determine to start the measurement gap at an end of a subframe immediately before a subframe of the determined subframe number, to control the transceiver to perform a predetermined measurement operation during the measurement gap, and to control the transceiver to perform a predetermined operation in a subframe immediately after the measurement gap based on a duplexing mode of the UE and a type of the subframe immediately before the measurement gap.

In accordance with another aspect of the present disclosure, there is provided an apparatus of a BS for performing communication in a wireless communication system. The apparatus of the BS includes a transceiver configured to transmit, to a UE, measurement gap (MG) configuration information related to a measurement gap, wherein the measurement gap comprises a time period during which the UE does not perform an uplink transmission and a downlink reception, and a controller configured to determine subframes included in the measurement gap based on the measurement gap configuration information, and if a subframe immediately before the measurement gap is a downlink subframe, to block the transceiver from monitoring of an uplink transmission from the UE in an uplink subframe immediately after the measurement gap.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 30 illustrates an example embodiment of subframe sets according to this disclosure;

Throughout the drawings, like reference numerals will be understood to refer to like parts, components, and structures.

DETAILED DESCRIPTION

FIGS. 1 through 36, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
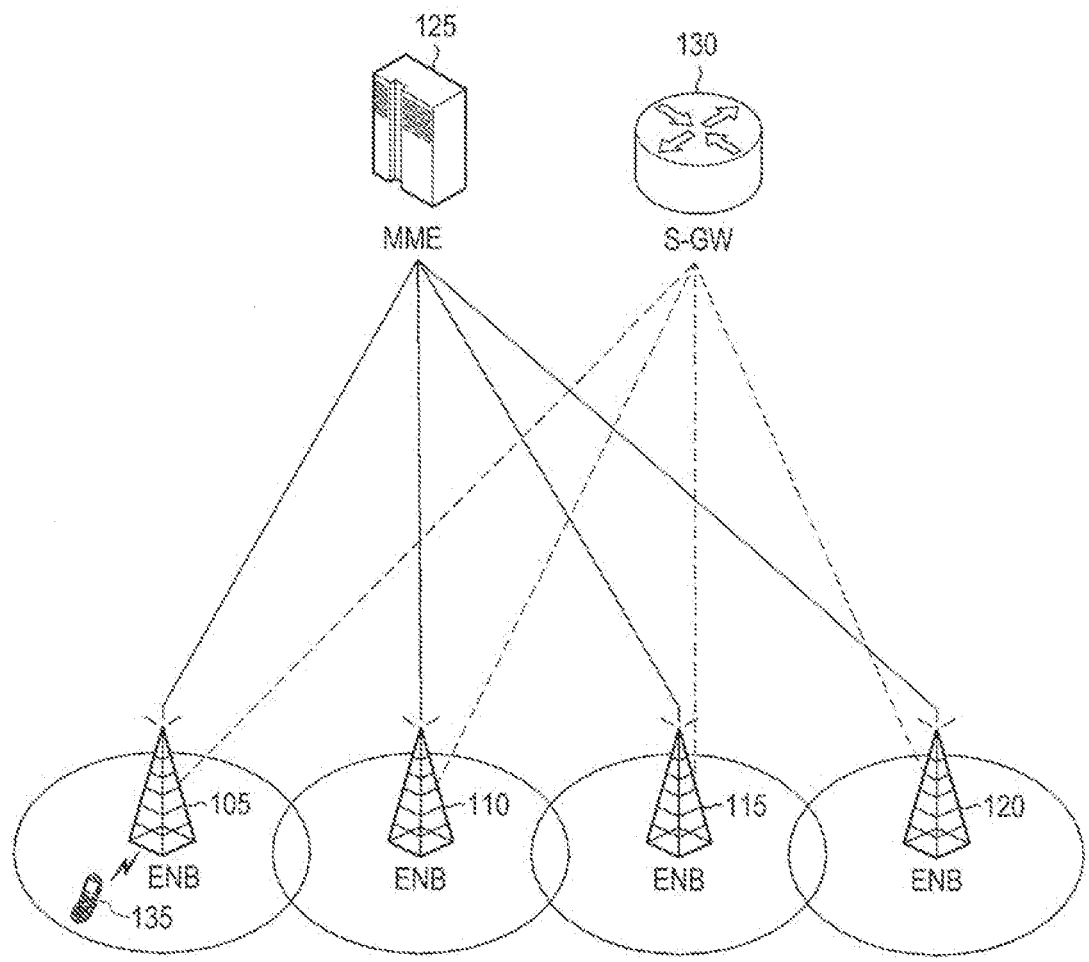
FIG. 1 illustrates an example embodiment of a configuration of a Long Term Evolution (LTE) system.

FIG. 1 illustrates an example embodiment of a configuration of a mobile communication system according to this disclosure. While the following description is given in the context of a Long Term Evolution (LTE) system as an example of the mobile communication system to which the present disclosure is applied, it is clearly to be understood that the present disclosure is not limited to the specific system.

Referring to FIG. 1, a Radio Access Network (RAN) of the mobile communication system includes evolved Node Bs (eNBs, eNode Bs, Node Bs, or Base Stations (BSs)) 105, 110, 115, and 120, a Mobility Management Entity (MME) 125, and a Serving GateWay (serving-GW) 130. User Equipment (UE or Mobile Station (MS)) 135 is connected to an external network (not shown) through the eNBs 105, 110, 115, and 120 and the S-GW 130.

The eNBs 105, 110, 115, and 120 correspond to Node Bs of a Universal Mobile Telecommunication System (UMTS). An eNB is connected to the UE 135 and plays a more complex role than a legacy Node B. Since all user traffic including real-time service (such as Internet Protocol (IP)-based voice service or Voice over IP (VoIP)) is serviced through a shared channel in the LTE system, an entity that schedules UEs according to state information about the UEs is needed. State information about the UEs can include buffer states, available transmission power states, and channel states of the UEs. Such entities are the eNBs 105, 110, 115, and 120. One eNB generally controls a plurality of cells.

To achieve a high data rate (such as 100 Mbps), the LTE system adopts Orthogonal Frequency Division Multiplexing (OFDM) as a radio access technology in a bandwidth of 20 MHz. In addition, the LTE system uses an Adaptive Modulation and Coding (AMS) scheme in which a modulation scheme and a channel coding rate are determined for a UE adaptively according to the channel state of the UE.

The S-GW 130 is configured to provide a data bearer and is configured to generate or remove the data bearer under the control of the MME 125. The MME 125, which is an entity that performs a mobility management function and other control functions for the UE 135, is connected to the plurality of eNBs 105, 110, 115, and 120.

Figure 2:
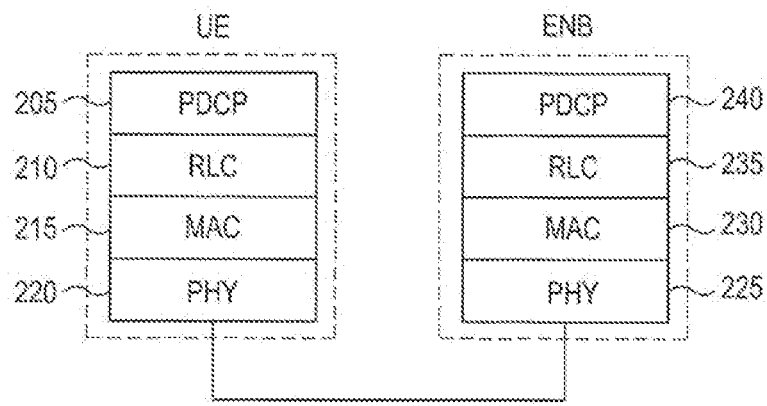
FIG. 2 illustrates an example embodiment of a radio protocol architecture in an LTE system.

FIG. 2 illustrates an example embodiment of a radio protocol architecture in an LTE system according to this disclosure.

Referring to FIG. 2, the radio protocol architecture of the LTE system includes Packet Data Convergence Protocol (PDCP) layers 205 and 240, Radio Link Control (RLC) layers 210 and 235, Medium Access Control (MAC) layers 215 and 230, and Physical (PHY) layers 220 and 225 in a UE and an eNB. The PDCP layers 205 and 240 compress or decompress an IP header. The RLC layers 210 and 235 perform an Automatic Repeat reQuest (ARQ) operation by reconfiguring a PDCP Packet Data Unit (PDU) to an appropriate size. Each of the MAC layers 215 and 230 are connected to a plurality of RLC entities configured in the UE or the eNB. The MAC layers 215 and 230 multiplex RLC PDUs into a MAC PDU and demultiplex a MAC PDU into RLC PDUs.

The PHY layers 220 and 225 channel-encode or modulate higher layer data of OFDM symbols and transmit the OFDM symbols on a radio channel. The PHY layers 220 and 225 also demodulate and channel-decode OFDM symbols received on a radio channel or provide the channel-decoded OFDM symbols to a higher layer or perform a Hybrid ARQ (HARQ) operation for data transmission or reception. To support UpLink (UL) data transmission, the PHY layers 220 and 225 use a Physical Uplink Shared Channel (PUSCH), a Physical HARQ Indicator Channel (PHICH) carrying an ACKnowledgement or Negative ACKnowledgement (ACK/NACK) as an HARQ feedback for a PUSCH transmission, a Physical Downlink Control Channel (PDCCH) carrying a DownLink (DL) control signal (e.g. scheduling information), or a Physical Uplink Control Channel (PUCCH) carrying a UL control signal. Further, the PHY layers 220 and 225 can use a Physical Downlink Shared Channel (PDSCH) to support DL data transmission.

Figure 3:
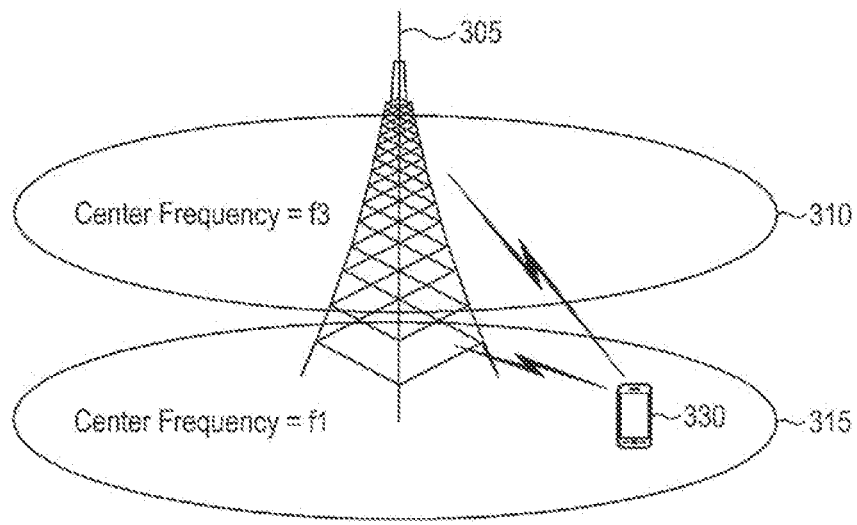
FIG. 3 illustrates an example embodiment of Carrier Aggregation (CA) for a User Equipment (UE)

FIG. 3 illustrates an example embodiment of Carrier Aggregation (CA) for a UE according to this disclosure.

Referring to FIG. 3, an eNB 305 generally transmits and receives multiple carriers across a plurality of frequency bands. If the eNB 305 transmits a carrier 315 having a center frequency (f1) and a carrier 310 having a center frequency (f3), a UE that is not CA-enabled can transmit or receive data in one of the two carriers 310 and 315. On the other hand, a CA-enabled UE 330 can transmit or receive data simultaneously in the plurality of carriers 310 and 315. When needed, the eNB 305 can allocate more carriers to the CA-enabled 330, thereby increasing the transmission rate of the UE 330.

If one DL carrier and one UL carrier transmitted from or received at an eNB form one cell, CA can be regarded as a UE's simultaneous transmission or reception of data in a plurality of cells. A maximum transmission rate of data is increased in proportion to the number of aggregated carriers.

In the following description of embodiments of the present disclosure, data reception in a DL carrier at a UE or data transmission in a UL carrier from the UE means data transmission or reception on a control channel and a data channel provided by a cell corresponding to the center frequency and frequency band of the DL and UL carriers. Particularly, CA is regarded as configuration of a plurality of serving cells for a UE in the present disclosure. Each serving cell can be a Primary serving Cell (PCell) or a Secondary serving Cell (SCell). In CA, one PCell and one or more SCells can be configured for a UE. These terms are used as defined by the LTE standard. For details, refer to 3GPP TS 36.331 and 3GPP TS 36.321 (December 2011).

While the embodiments of the present disclosure will be described in the context of an LTE system for the convenience of description, the embodiments of the present disclosure are applicable to any wireless communication system supporting CA.

In Time Division Duplexing (TDD) mode, one frequency band is used for a UL during the duration of a specific subframe and for a DL during the duration of another subframe. A UE should have accurate knowledge of the positions of UL subframes and DL subframes and an eNB preliminarily transmits information about the positions of these UL and DL subframes to the UE.

Information about UL subframes and DL subframes is referred to as a TDD UL/DL configuration. TABLE 1 lists TDD UL/DL configurations that an eNB can provide according to this disclosure. Each subframe is configured as a UL subframe, a DL subframe, or a special subframe according to a TDD UL/DL configuration.

TABLE 1

| UL/DL Con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TABLE 1, 'D' represents a DL subframe used to transmit DL data, 'U' represents a UL subframe used to transmit UL data, and 'S' represents a special subframe interposed between a DL subframe and a UL subframe.

The reason for configuring a special subframe is that UEs differ in the timing of completely receiving a DL subframe and the timing of transmitting a UL subframe depending on the positions of the UEs. For example, a UE remote from an eNB receives data from the eNB later than a UE near to the eNB. Therefore, for the eNB to receive data from the remote UE within a specific time, the remote UE should start data transmission earlier than the nearby UE. That is, a certain Guard Period (GP) is needed between DL data reception and UL data transmission and defined in the special subframe. On the contrary, a special subframe is not needed between a UL subframe and a DL subframe.

Figure 4:
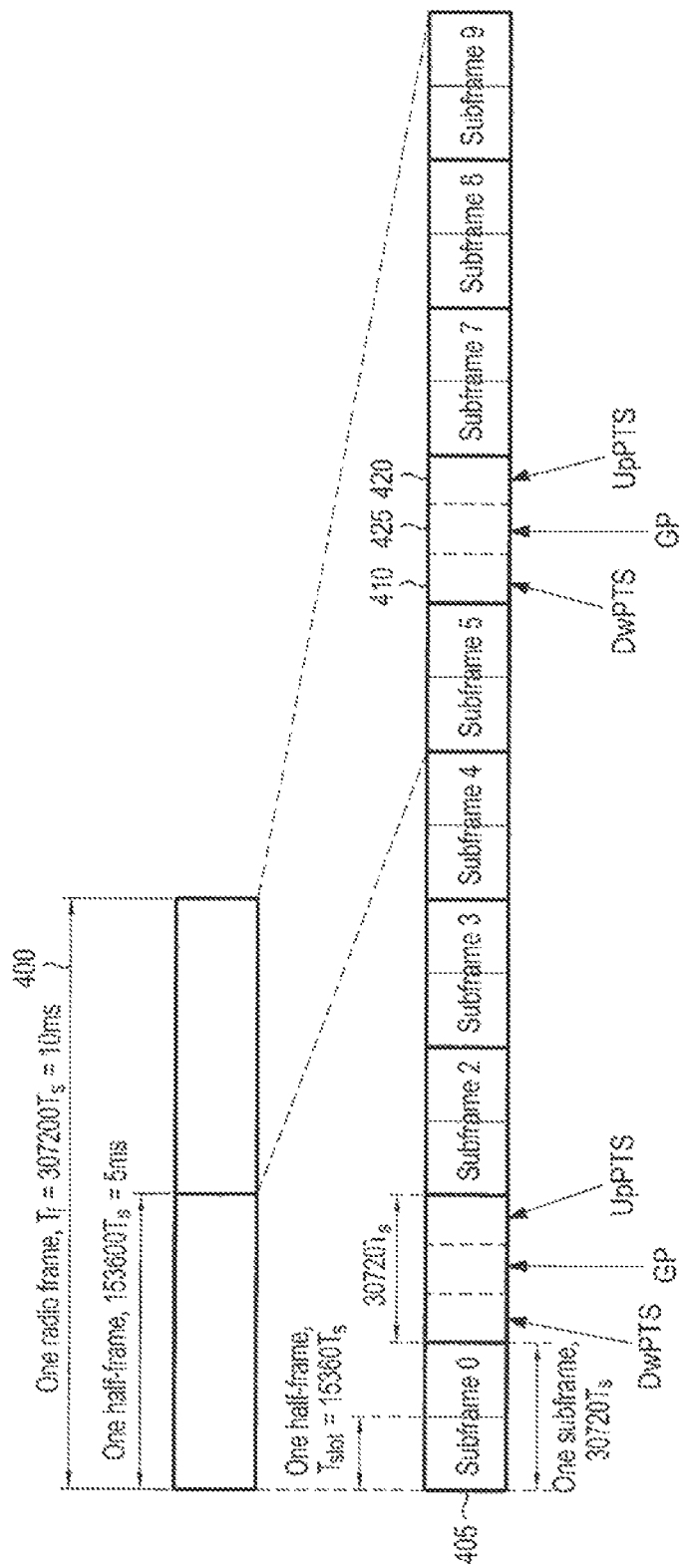
FIG. 4 illustrates an example embodiment of Time Division Duplexing (TDD) frame structure.

FIG. 4 illustrates an example embodiment of a TDD frame structure according to this disclosure.

Referring to FIG. 4, a 10-ms radio frame 400 is divided into 10 subframes. Each radio frame 400 is identified by a System Frame Number (SFN) such as an integer ranging from 0 to 4095. Each time one radio frame elapses, the SFN can be incremented by 1. Each subframe 405 can be 1 ms long, including two slots. A special subframe can be divided into three parts, a Downlink Pilot Time Slot (DwPTS) 410, a GP 425, and an Uplink Pilot Time Slot (UpPTS) 420. The DwPTS 410 is a time period for DL reception and the UpPTS 420 is a time period for UL transmission. No transmission or reception can take place in the GP 425.

Optimum lengths of the DwPTS 410 and the UpPTS 420 vary with propagation environments. An eNB can indicate appropriate lengths of the DwPTS 410 and the UpPTS 420 in advance to a UE. The eNB broadcasts, to UEs, the TDD UL/DL configurations listed in (Table 1) and the lengths of the DwPTS and the UpPTS listed in TABLE 2 in a TDD-configured Information Element (IE) of System Information Block Type 1 (SIB1).

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592Ts | 2192Ts | 2560Ts | 7680Ts | 2192Ts | 2560Ts |
| 1 | 19760Ts | | | 20480Ts | | |
| 2 | 21952Ts | | | 23040Ts | | |
| 3 | 24144Ts | | | 25600Ts | | |
| 4 | 26336Ts | | | 7680Ts | 4384Ts | 5120Ts |
| 5 | 6592Ts | 4384Ts | 5120Ts | 20480Ts | | |
| 6 | 19760Ts | | | 23040Ts | | |
| 7 | 21952Ts | | | — | — | — |
| 8 | 24144Ts | | | — | — | — |

As noted in TABLE 2, the lengths of the DwPTS and the UpPTS can be set to multiples of a symbol duration, Ts, according to special subframe configurations indicated by the eNB and the types of Cyclic Prefixes (CPs) used for the DL and the UL.

If one eNB provides a plurality of TDD serving cells, compatibility with a legacy system can be ensured and better load balancing can be enabled by applying different TDD UL/DL configurations to the plurality of TDD serving cells. For example, in the case where a TDD cell of a 3G mobile communication system and a TDD cell of an LTE mobile communication system are provided over the same area and the operation frequencies of the two cells are adjacent, interference between the 3G TDD cell and the LTE TDD cell can be minimized by applying a specific UL/DL configuration to the LTE TDD cell. At the same time, a different UL/DL configuration from the LTE TDD cell can be applied to an LTE TDD cell having an operation frequency very remote from the operation frequency of the 3G TDD cell, thereby increasing efficiency.

When different UL/DL configurations (such as a plurality of UL/DL configurations) are applied to a plurality of serving cells of the same eNB as described above, UEs connected to the serving cells can experience different types of subframes between the serving cells during a predetermined time period.

Figure 5:
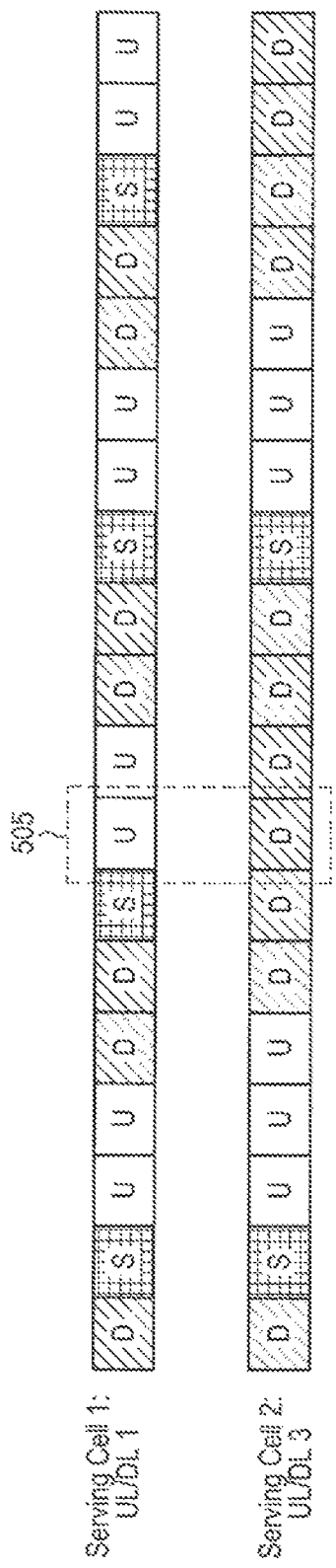
FIG. 5 illustrates an example embodiment of cells having different TDD UpLink/DownLink (UL/DL) configurations.

FIG. 5 illustrates an example embodiment of cells having different TDD UL/DL configurations according to this disclosure. Referring to FIG. 5, if a first serving cell (serving cell 1) and a second serving cell (serving cell 2) are configured for a UE and UL/DL configuration 1 and UL/DL configuration 2 are applied to serving cell 1 and serving cell 2, respectively, a UL subframe (hereinafter, referred to as a "U subframe") of serving cell 1 and a DL subframe (hereinafter, referred to as a "D subframe") of serving cell 2 coincide during a time period 505. Although it is preferred that the UE performs UL transmission in serving cell 1 and DL reception in serving cell 2 during the time period 505, the UL transmission and the DL reception can be impossible under circumstances.

Basically, a UE does not need to perform UL transmission and DL reception simultaneously in a TDD system. Accordingly, a Radio Frequency (RF) circuit of the TDD UE is designed to perform only one of a DL operation and a UL operation during one time period, that is, to operate in Half Duplex (HF). Thus, a general TDD UE that does not have a Full Duplex (FD) function of simultaneous UL and DL operations is allowed to perform only one of a DL reception and a UL transmission during the time period 505.

In this context, embodiments of the present disclosure provide methods and apparatuses for performing reliable communication by enabling an eNB and a UE to operate in the same link direction in the above situation.

According to the embodiments of the present disclosure, the UE and the eNB can operate as follows.

If different UL/DL configurations are assigned to a PCell and an SCell, an HD UE does not perform an operation related to an subframe of the SCell (referred to as an "SCell subframe") directed to a different direction from a subframe of the PCell (referred to as a "PCell subframe").

If different UL/DL configurations are assigned to a PCell and an SCell, an HD UE determines an SCell subframe in which the HD UE will receive a PHICH for a PUSCH transmission, based on the UL/DL configuration of the PCell.

If different UL/DL configurations are assigned to a PCell and an SCell, an HD UE determines an SCell subframe in which the HD UE will retransmit a PUSCH, based on the UL/DL configuration of the PCell.

Figure 6:
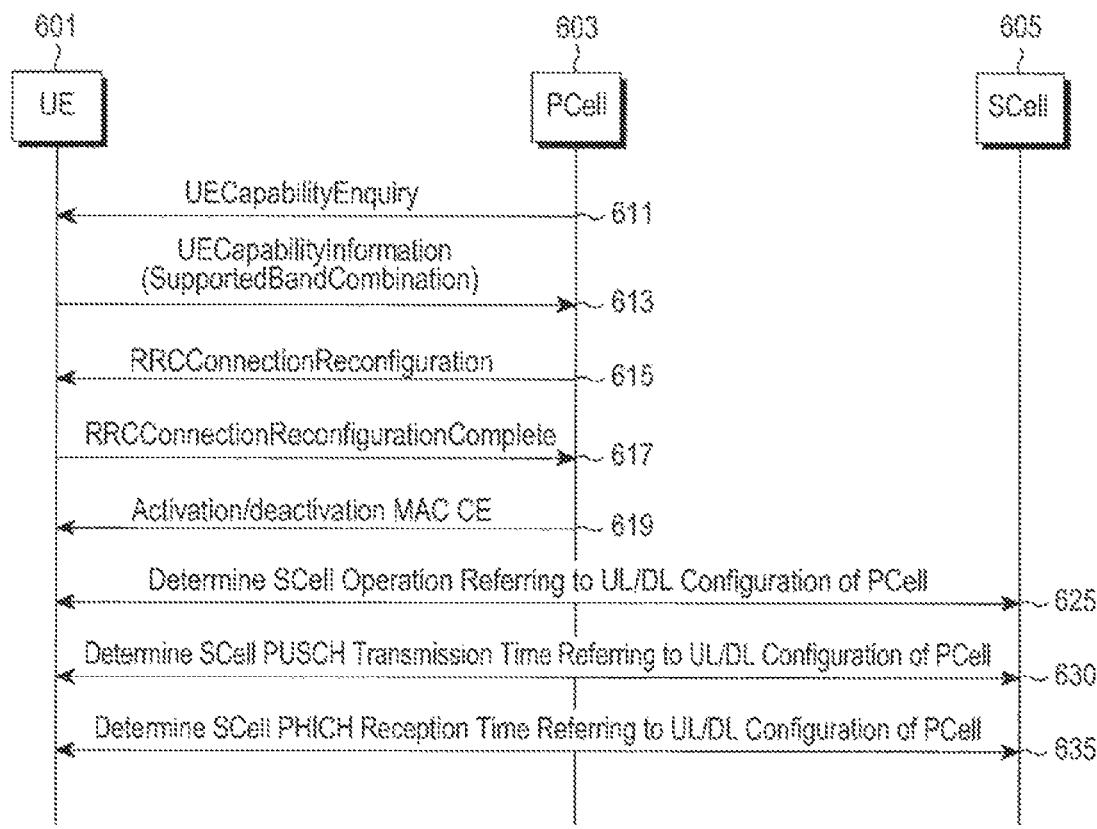
FIG. 6 illustrates an example embodiment of an operation of a UE according to this disclosure.

FIG. 6 illustrates an example embodiment of an operation of a UE according to this disclosure.

Referring to FIG. 6, serving cells having different TDD UL/DL configurations, such as PCell 603 and SCell 605 can be configured for a UE 601 by CA. The same eNB manages the PCell 603 and the SCell 605 while the UE 601 is initially connected only to the PCell 603.

The PCell 603 carries a UECapabilityEnquiry message to the UE 601 to check functions supported by the UE 601 in operation 611. That is, the eNB transmits the UECapabilityEnquiry message to the UE 601 in the PCell 603. The UE 601 indicates its supported functions to the eNB by transmitting a UECapabilityInformation message in the PCell 603 in operation 613. The UE 601 reports its CA capability by setting band combinations supported by the UE 601 in a 'supported band combination' Information Element (IE) of the UECapabilityInformation message.

The 'supported band combination' IE includes one or more band parameters. One of the band parameters includes a band indicator, the number and bandwidths of serving cells configurable in the bands of the band combination, configurable Multiple Input Multiple Output (MIMO) information, and the like. In addition, 1-bit information indicating availability of simultaneous transmission and reception is reported for a band combination satisfying a predetermined condition from among the supported band combinations. The predetermined condition can be, for example, that the band combination includes only TDD bands and the TDD bands are different.

For example, in the case where the UE reports its supported band combinations as combination 1 to band combination 10 listed in TABLE 3 below, the UE sets 1-bit information indicating availability of simultaneous transmission and reception only for band combination 9 and band combination 10. In TABLE 3, 'band FDD' represents an LTE frequency band in FDD and 'band TDD' represents an LTE frequency band in TDD. For example, band 1 to band 32 are FDD frequency bands and band 33 to band 64 are TDD frequency bands among LTE frequency bands.

TABLE 3

| Index of supported band combination | Composition of band combination | Report availability of simultaneous transmission and reception |
|---|---|---|
| supported band combination 1 | band FDD1 | No |
| supported band combination 2 | band FDD2 | No |
| supported band combination 3 | band TDD1 | No |
| supported band combination 4 | band TDD2 | No |
| supported band combination 5 | band TDD3 | No |
| supported band combination 6 | band FDD1, band FDD1 | No |
| supported band combination 7 | band FDD1, band FDD2 | No |
| supported band combination 8 | band TDD1, band TDD1 | No |
| supported band combination 9 | band TDD1, band TDD2 | Yes |
| supported band combination 10 | band TDD1, band TDD3 | Yes |

In regards to each 'supported band combination' satisfying the predetermined condition, the UE reports whether simultaneous transmission and reception is available in the band combination by 1-bit information. The 1-bit information can be configured into a bitmap. For example, in TABLE 3 the UE reports a bitmap including 2-bit meaningful information for band combination 9 and band combination 10. Each bit of the bitmap represents a band combination satisfying the predetermined condition in the order of inclusion in the UECapabilityInformation message. In the example of TABLE 3, the first bit and the second bit of the bitmap indicate availability of simultaneous transmission and reception in band combination 9 and band combination 10, respectively.

If the UE reports that simultaneous transmission and reception is available in a specific TDD band combination, the UE can perform DL reception and UL transmission simultaneously even though different UL/DL configurations are assigned to the band combination and the directions of subframes are different during a time period according to the UL/DL configurations.

In contrast, if the UE reports that simultaneous transmission and reception is not available in a specific TDD band combination, the UE should perform only one of DL reception and UL transmission, if different UL/DL configurations are assigned to the band combination and the directions of subframes during a time period are different according to the UL/DL configurations.

The eNB applies a necessary setting to the UE based on the UECapabilityInformation message. For example, if the UE supports CA in a specific band combination and there are serving cells operating in the bands of the band combination in the eNB, the eNB can configure CA for the band combination for the UE. That is, the eNB can configure a plurality of serving cells corresponding to the band combination for the UE.

The eNB transmits a control message that configures a plurality of TDD serving cells to the UE 601 in operation 615. The control message can be an RRCConnectionReconfiguration message. The SCell 605 is added to the UE 601 by the control message. The UE 601 is aware of the UL/DL configuration of the PCell 603 by system information (e.g. SIB1) broadcast in the PCell 603 and the UL/DL configuration of the SCell 605 by the control message that configures the SCell 605.

The UE 601 performs an establishment procedure requested by the eNB (such as RRC connection establishment for the SCell 605) based on the RRCConnectionReconfiguration message and transmits an RRCConnectionReconfigurationComplete message indicating completion of the RRC connection establishment procedure to the eNB in operation 617. Then the eNB transmits an activation command for the configured SCell 605 to the UE 601 at a specific time in operation 619. The activation command can be an Activation/deactivation MAC Control Element (CE) message.

The UE 601 refers to the UL/DL configuration of the PCell 603 to determine an operation in the SCell 605 during a subsequent time period in operation 625. Specifically, the UE 601 operates in every subframe as illustrated in TABLE 4. That is, if a PCell subframe direction defined by the UL/DL configuration of the PCell 603 is different from an SCell subframe direction defined by the UL/DL configuration of the SCell 605, the UE 601 determines an operation to perform in the SCell 605 based on the UL/DL configuration of the PCell 603.

TABLE 4

| PCell subframe | SCell subframe | UE operation in PCell | UE operation in SCell |
|---|---|---|---|
| D | D | PDCCH/PHICH/PDSCH reception | PDCCH/PHICH/PDSCH reception |
| D | S | PDCCH/PHICH/PDSCH reception | PDCCH/PHICH reception (DwPTS reception) |
| D | U | PDCCH/PHICH/PDSCH reception | No uplink transmission |
| S | D | PDCCH/PHICH reception, UpPTS transmission | PDCCH/PHICH reception |
| S | S | PDCCH/PHICH reception, UpPTS transmission | PDCCH/PHICH reception, conditional UpPTS transmission |
| S | U | PDCCH/PHICH reception, UpPTS transmission | conditional SRS transmission |

TABLE 4-continued

| PCell subframe | SCell subframe | UE operation in PCell | UE operation in SCell |
|---|---|---|---|
| U | D | PUSCH/PUCCH transmission | PDCCH/PHICH/PDSCH non-reception |
| U | S | PUSCH/PUCCH transmission | UpPTS transmission |
| U | U | PUSCH/PUCCH transmission | PUSCH transmission |

If a PCell subframe and an SCell subframe corresponding to a current time period are D subframes, the UE performs DL reception in the two serving cells during the current time period (such as in the same subframes of the PCell and the SCell). That is, the UE receives a PDCCH and a PHICH in the control regions of the current subframes of the two serving cells and a PDSCH in the data regions of the current subframes of the two serving cells. Likewise, the eNB transmits, to the UE, the PDCCH and the PHICH in the control regions of the current subframes of the two serving cells and the PDSCH in the data regions of the current subframes of the two serving cells.

If a PCell subframe and an SCell subframe corresponding to a current time period are a D subframe and an S subframe, respectively, the UE performs a D-subframe operation which includes receiving a PDCCH/PHICH/PDSCH in the PCell during the current time period and performs a DL operation which includes a DwPTS reception in the SCell during the current time period. The DwPTS reception means that a DL signal is received only in a predetermined starting time period of a current subframe on a time axis. Since the PDSCH can occupy up to the last of the subframe, the UE can receive only the PDCCH and the PHICH except for the PDSCH. In the above situation, that is, when the PCell subframe is a D subframe and the SCell subframe is an S subframe during the same time period, the eNB does not schedule a PDSCH for the UE in the SCell subframe and transmits only the PDCCH and the PHICH in the DwPTS of the SCell subframe.

If a PCell subframe and an SCell subframe corresponding to a current time period are a D subframe and a U subframe, respectively, the UE performs a D-subframe operation, which includes receiving a PDCCH/PHICH/PDSCH in the PCell during the current time period, whereas the UE performs no UL transmission in the SCell during the current time period even though a UL transmission is scheduled in the SCell. Therefore, the eNB does not perform a UL reception in this situation.

If a PCell subframe and an SCell subframe corresponding to a current time period are an S subframe and a D subframe, respectively, the UE performs an S-subframe operation in the PCell during the current time period. That is, the UE receives a PDCCH/PHICH in the DwPTS of the PCell subframe, discontinues transmission and reception in the GPS of the PCell subframe, and when needed, performs a UL transmission (such as a Sounding Reference Signal (SRS)) in the UpPTS of the PCell subframe. In addition, the UE receives a DL signal in the SCell subframe only during a time period overlapped between the DwPTS of the PCell subframe and the SCell subframe. That is, the UE receives a PDCCH and a PHICH in the SCell, except for a PDSCH. In this situation, when the PCell subframe is an S subframe and the SCell subframe is a D subframe, the eNB does not schedule a PDSCH in the SCell subframe and performs only a DL transmission in the DwPTS of the PCell subframe.

If a PCell subframe and an SCell subframe corresponding to a current time period are S subframes, the UE performs an S-subframe operation in the PCell during the current time period. That is, the UE receives a PDCCH/PHICH in the DwPTS of the PCell subframe, discontinues transmission and reception in the GP of the PCell subframe, and when needed, performs a UL transmission in the UpPTS of the PCell subframe, for example, transmits an SRS in the UpPTS. In addition, the UE receives a DL signal in the SCell subframe only during a time period overlapped between the DwPTS of the PCell subframe and the SCell subframe. That is, the UE receives a PDCCH and a PHICH in the SCell subframe, except for a PDSCH. The UE discontinues transmission and reception in the SCell subframe during a time period overlapped between the GP of the PCell subframe and the SCell subframe. When needed, the UE can perform a UL transmission in the UpPTS of the SCell subframe overlapped with the UpPTS of the PCell subframe. The UL transmission can be performed depending on how much of the UpPTS of the SCell subframe is overlapped with the UpPTS of the PCell subframe. Accordingly, the UL transmission is optional. In this situation, the eNB can attempt to receive an SRS in the UpPTS of the SCell subframe, transmit a PHICH in the DwPTS of the SCell subframe, and recognize that no transmission and reception of the UE occurs in the GP of the SCell subframe.

If a PCell subframe and an SCell subframe corresponding to a current time period are an S subframe and a U subframe, respectively, the UE performs an S-subframe operation in the PCell during the current time period, while transmitting an SRS conditionally without transmitting a PUCCH and a PUSCH in the SCell during the current time period. That is, if SRS transmission is scheduled in the SCell U subframe and a part of the SCell U subframe overlapped with the UpPTS of the PCell S subframe is equal to or larger than a predetermined value (such as one OFDM symbol period), the UE transmits an SRS in the SCell U subframe and otherwise, the UE does not transmit the SRS. In this situation, the eNB attempts to receive the SRS from the UE during the time period overlapped between the SCell U subframe and the UpPTS of the PCell S subframe.

If a PCell subframe and an SCell subframe corresponding to a current time period are a U subframe and a D subframe, respectively, the UE performs a U-subframe operation in the PCell subframe. That is, if a PUCCH or PUSCH transmission is scheduled in the PCell, the UE transmits a PUCCH or a PUSCH in the PCell subframe. However, in this case, the UE does not receive a DL signal in the SCell during the current time period. That is, the UE does not receive a PDCCH/PHICH/PDSCH in the SCell subframe. In this situation, when the PCell subframe is a U subframe and the SCell subframe is a D subframe, the eNB does not schedule a PDSCH in the SCell.

If a PCell subframe and an SCell subframe corresponding to a current time period are a U subframe and an S subframe, respectively, the UE performs a U-subframe operation in the PCell during the current time period, while when needed, the UE transmits a UL signal in the UpPTS of the SCell subframe. That is, if an SRS transmission is scheduled in the SCell S subframe, the UE transmits an SRS and does not receive a DL signal in the DwPTS of the SCell S subframe. In this situation, the eNB attempts to receive the SRS from the UE during a time period overlapped between the UpPTS of the SCell S subframe and the PCell U subframe and does not transmit a DL signal to the UE in the DwPTS of the SCell S subframe.

If a PCell subframe and an SCell subframe corresponding to a current time period are U subframes, the UE performs a U-subframe operation in both the PCell and the SCell during the current time period. That is, the UE transmits a PUSCH and a PUCCH, when needed. In this situation, the eNB attempts to receive the PUSCH from the UE in the SCell U subframe.

In operation 630, the UE 601 determines a PUSCH transmission time based on the UL/DL configuration of the PCell 603. The PUSCH transmission time refers to the position of a subframe to carry a PUSCH. The UE 601 generally refers to the UL/DL configuration of a serving cell in transmitting a PUSCH in the serving cell. For example, upon receipt of a PDCCH indicating a PUSCH transmission or an HARQ NACK signal in subframe n, the UE transmits a PUSCH in subframe n+m where n and m are defined for each UL/DL configuration.

An FD UE or a UE operating in CA under the same UL/DL configuration determines a PUSCH transmission time, an HARQ feedback reception time, and a PUSCH retransmission time, based on the UL/DL configuration of a serving cell. An HD UE operating under a plurality of UL/DL configurations determines a timing relationship between serving cells based on the UL/DL configuration of a PCell, instead of the UL/DL configuration of a serving cell in which a PUSCH will be transmitted.

The UE 601 refers to the UL/DL configuration of the PCell 603 in determining a subframe in which an HARQ feedback will be received for a PUSCH transmitted in the SCell in operation 635. This is because if a subframe to carry a PHICH, determined based on the UL/DL configuration of the SCell, is overlapped with a U subframe of the PCell, the PHICH can not be received.

Figure 7:
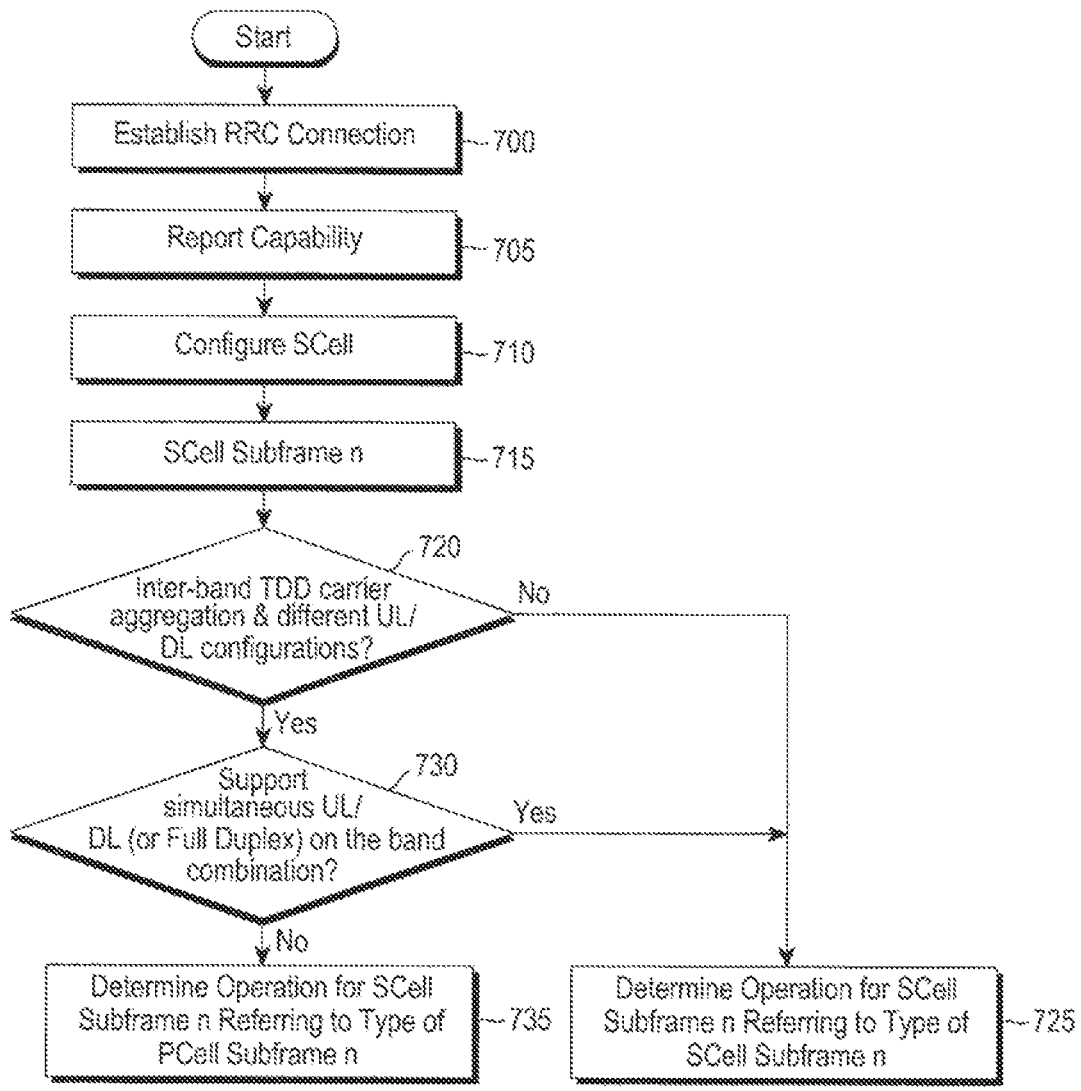
FIG. 7 is a flowchart illustrating an example embodiment of an operation of a UE in a subframe of a secondary serving cell according to this disclosure.

FIG. 7 is a flowchart illustrating an example embodiment of an operation of a UE in an SCell subframe according to this disclosure.

Referring to FIG. 7, the UE receives system information about a serving cell and acquires the UL/DL configuration of the serving cell from the system information in operation 700. The UE then starts an RRC connection establishment procedure for the serving cell. Once the RRC connection establishment procedure is completed, the serving cell becomes a PCell for the UE.

In operation 705, the UE reports its capabilities to an eNB by a UE capability information message. The UE capability information message includes information about UE-supported band combinations and the UE additionally reports information indicating whether simultaneous transmission and reception is available in a band combination composed of different TDD bands (referred to as an "inter-TDD band combination").

In operation 710, an SCell is configured for the UE. The SCell is configured by transmitting an RRC control message including SCell configuration information from the eNB to the UE and establishing a signal path for the SCell based on the SCell configuration information by the UE. The SCell configuration information includes, for example, information about a center frequency of the SCell, radio resources allocated to the UE in the SCell, and the UL/DL configuration of the SCell. Each SCell can be placed in an active or inactive state. Data transmission and reception is possible only in an active SCell. When an SCell is initially configured, the SCell is in an inactive state. Then the SCell is switched to an active state by a command from the eNB.

In operation 715, the UE waits until subframe n of the SCell starts in order to determine an operation to perform in subframe n of the SCell.

The UE checks whether the following conditions are satisfied in operation 720.

The PCell and the SCell have different frequency bands (inter-band TDD carrier aggregation).

The PCell and the SCell have different UL/DL configurations.

If the following conditions are satisfied, the UE goes to operation 730 and otherwise, the UE goes to operation 725. If the above conditions are not satisfied, this implies that the PCell and the SCell have the same frequency band or that even though PCell and the SCell have different frequency bands, they have the same UL/DL configuration. If the PCell and the SCell have the same frequency band, the same UL/DL configuration should be assigned to the PCell and the SCell.

In operation 725, the UE determines the type of SCell subframe n based on the UL/DL configuration of the SCell and determines an operation to perform according to the type of SCell subframe n. The UE operates as follows according to the types of subframes.

If subframe n is a D subframe, the UE determines to receive a PDCCH/PHICH/PDSCH in subframe n.

If subframe n is an S subframe, the UE determines to receive a PDCCH/PHICH and when needed, to perform a UpPTS transmission in subframe n.

If subframe n is a U subframe, the UE determines to transmit a PUSCH and an SRS in subframe n, when needed.

The above operations may be limited by another solution or a requirement imposed on the UE. For example, if subframe n does not correspond to an active time in a Discontinuous Reception (DRX) operation or overlaps with a Measurement Gap (MG) which is a time period for measuring non-serving frequencies, the above operations may not be performed. During the measurement gap, the UE does not perform an uplink transmission and a downlink reception, and then can perform a measurement of non-serving frequencies.

On the other hand, if the above conditions are satisfied, this implies that the PCell and the SCell have different frequency bands and different UL/DL configurations. In operation 730, the UE determines whether simultaneous transmission and reception is available in a current band combination (such as the combination of the frequency bands of the PCell and the SCell). Or the UE determines whether information indicating that simultaneous transmission and reception is available in the current band combination has been reported to the eNB. If the determination result is affirmative, the UE goes to operation 725 and otherwise, the UE goes to operation 735.

In operation 735, the UE determines an operation to perform in SCell subframe n based on the type of a PCell subframe overlapped with SCell subframe n. Since the frame boundaries of the PCell and the SCell are generally aligned, PCell subframe n is overlapped with SCell subframe n.

Figure 8:
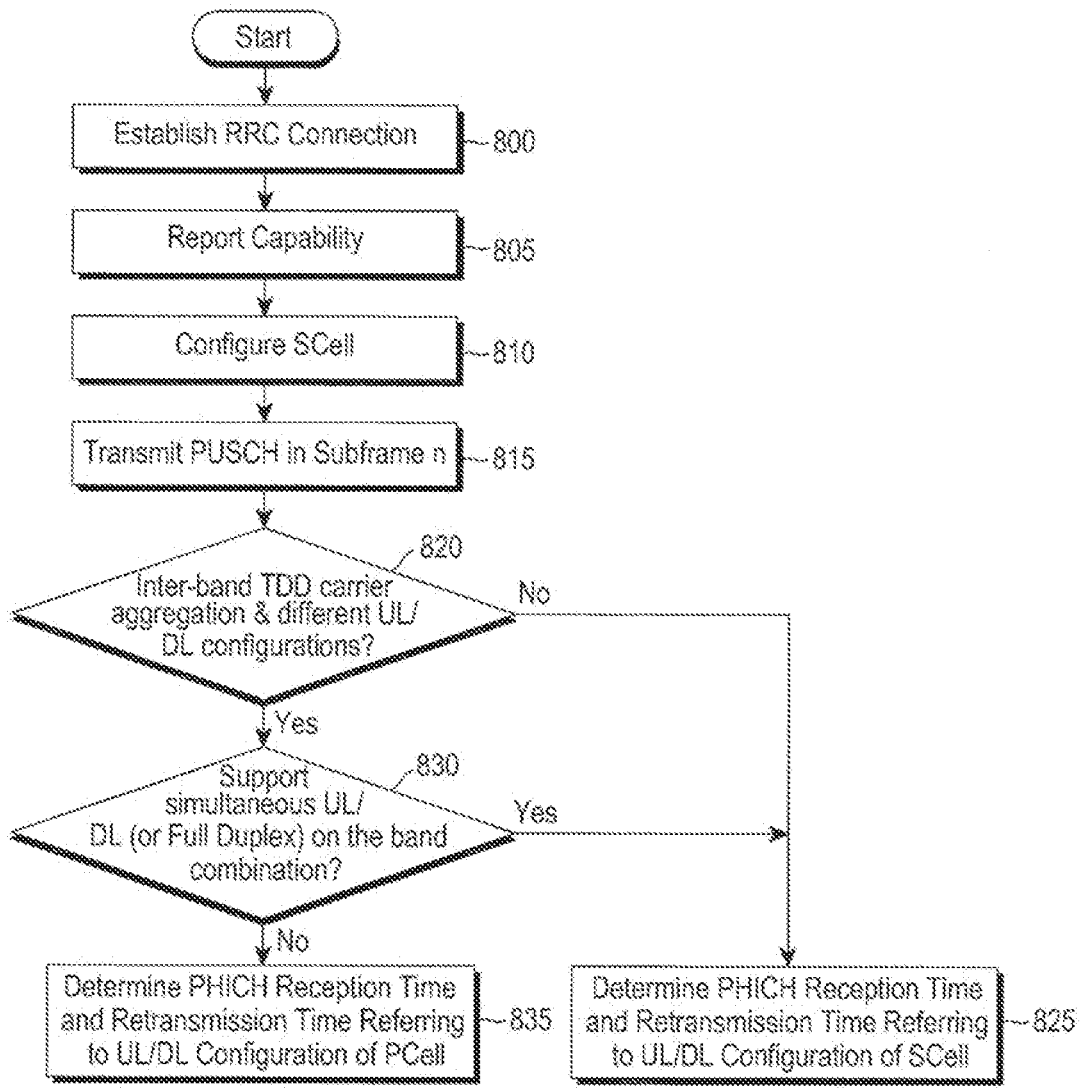
FIG. 8 is a flowchart illustrating an example embodiment of an operation of a UE for determining a feedback reception time and a data retransmission time in a secondary serving cell according to this disclosure.

FIG. 8 illustrates a flowchart illustrating an example embodiment of an operation of a UE for determining a feedback reception time and a PUSCH retransmission time in an SCell according to this disclosure.

Referring to FIG. 8, the UE receives system information about a serving cell and thus acquires the UL/DL configuration of the serving cell from the system information in operation 800. The UE then starts an RRC connection establishment procedure for the serving cell. Once the RRC connection establishment procedure is completed, the serving cell becomes a PCell for the UE.

In operation 805, the UE reports its capabilities to an eNB by a UE capability information message. The UE capability information message includes information about UE-supported band combinations and the UE additionally reports information indicating availability of simultaneous transmission and reception in an inter-TDD band combination.

In operation 810, an SCell is configured for the UE. The SCell is configured by transmitting an RRC control message including SCell configuration information from the eNB to the UE and establishing a signal path for the SCell based on the SCell configuration information by the UE. The SCell configuration information includes, for example, information about a center frequency of the SCell, radio resources allocated to the UE in the SCell, and the UL/DL configuration of the SCell.

In operation 815, the UE transmits a PUSCH in SCell subframe n. Then the UE proceeds to operation 820 to determine a subframe in which an HARQ feedback for the PUSCH transmission will be received and a subframe in which the PUSCH will be retransmitted in case the HARQ feedback is a NACK.

The UE checks whether the following conditions are satisfied in operation 820.

The PCell and the SCell have different frequency bands (inter-band TDD carrier aggregation).
The PCell and the SCell have different UL/DL configurations.

If the following conditions are satisfied, the UE goes to operation 830 and otherwise, the UE goes to operation 825. If the above conditions are not satisfied, this implies that the PCell and the SCell have the same frequency band or that even though PCell and the SCell have different frequency bands, they have the same UL/DL configuration. If the PCell and the SCell have the same frequency band, the same UL/DL configuration should be assigned to the PCell and the SCell. In operation 825, the UE determines the position of a subframe in which to receive a PHICH for the PUSCH transmitted in SCell subframe n and the position of a subframe for PUSCH retransmission, based on the UL/DL configuration of the SCell. The PHICH reception time and the PUSCH retransmission time are defined according to a UL/DL configuration in the standard. For example, if the UE receives a NACK as an HARQ feedback in subframe n, the UE retransmits a PUSCH in subframe n+k. For example, k is determined according to the UL/DL configuration and the index of the subframe in which the PHICH has been received, as illustrated in TABLE 5.

TABLE 5

| TDD UL/DL Configuration | subframe number 2 | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

If the above conditions are satisfied, this implies that the PCell and the SCell have different frequency bands and different UL/DL configurations. In operation 830, the UE determines whether simultaneous transmission and reception is available in a current band combination. Or the UE determines whether information indicating that simultaneous transmission and reception is available in the current band combination has been reported to the eNB. If the determination result is affirmative, the UE goes to operation 825 and otherwise, the UE goes to operation 835.

In operation 835, the UE determines the PHICH reception time and the PUSCH retransmission time based on the UL/DL configuration of the PCell, instead of the UL/DL configuration of the SCell. For example, if UL/DL configuration 4 is assigned to the SCell, UL/DL configuration 6 is assigned to the PCell, and the UE receives an HARQ feedback, NACK in subframe 9, the UE selects 5 as the value of k according to the UL/DL configuration of the PCell in TABLE 5. Then the UE retransmits the PUSCH in subframe (9+5), that is, subframe 4 of the next radio frame.

Likewise, the eNB transmits an HARQ feedback to the UE that has reported that simultaneous transmission and reception is not available in the SCell having a different UL/DL configuration from the PCell and considers the UE's decision on a PHICH reception time and a PUSCH retransmission time based on the UL/DL configuration of the PCell in managing PUSCH transmission resources. That is, the eNB determines to transmit the HARQ feedback, NACK in subframe 9 of the SCell based on the UL/DL configuration of the PCell configured for the UE and determines to receive retransmission data on the PUSCH in subframe (9+5) of the SCell, that is, subframe 4 of the next radio frame in the SCell.

Figure 9:
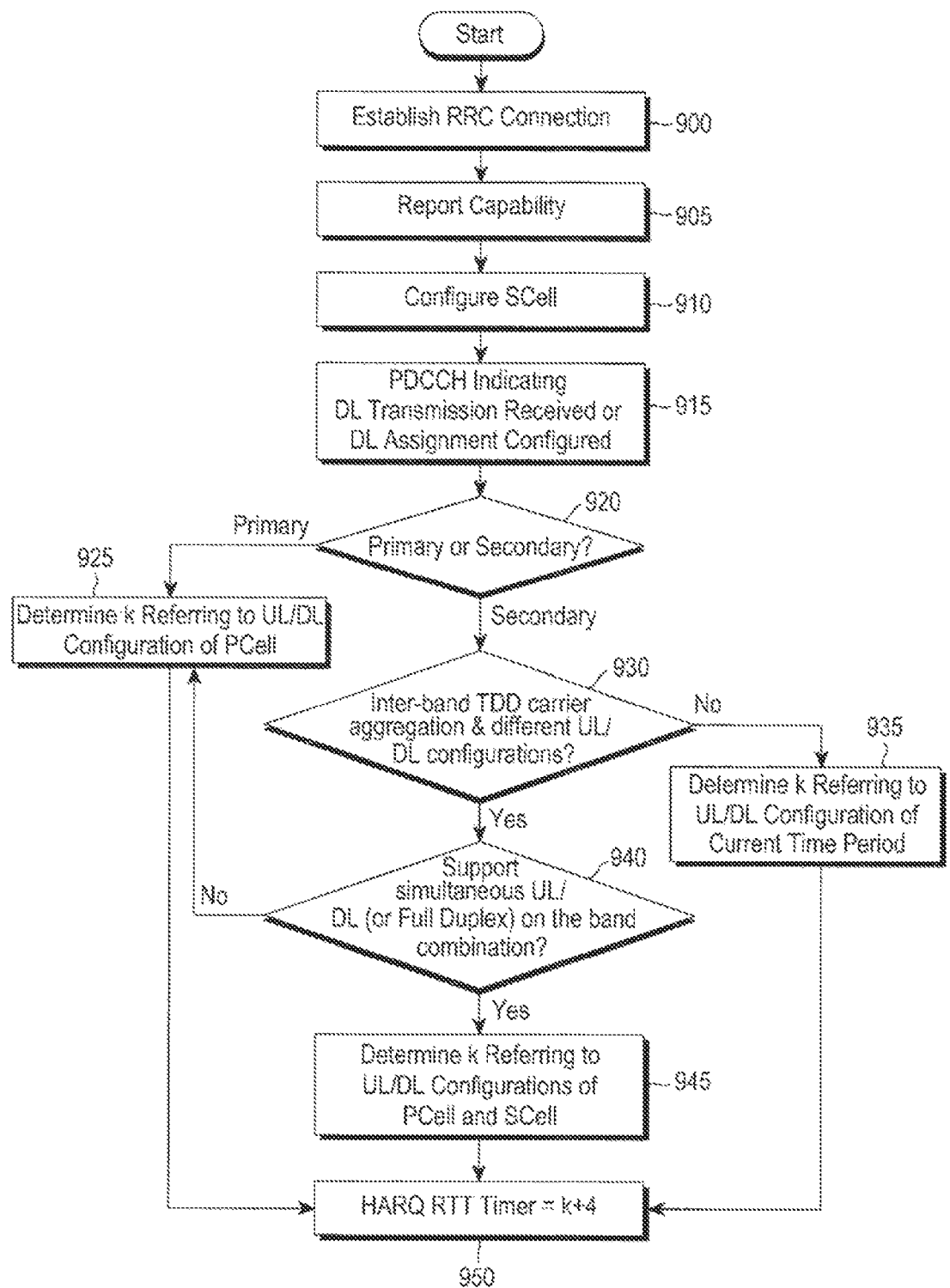
FIG. 9 is a flowchart illustrating an example embodiment of an operation of a UE for determining a feedback transmission time in a secondary cell according to this disclosure.

FIG. 9 is a flowchart illustrating an example embodiment of an operation of a UE for determining a feedback transmission time in an SCell according to this disclosure. Operations 900, 905, and 910 are performed in the same manner as operations 800, 805, and 810 illustrated in FIG. 8 and thus will not be described herein in detail.

Referring to FIG. 9, a PDCCH indicating a PDSCH transmission (or a DL transmission) is received or a subframe for which a DL assignment is configured comes in operation 915. The UE receives PDSCH data in the subframe, decodes the PDSCH data, and proceeds to operation 920 to transmit a feedback for the PDSCH data.

In operation 920, the UE determines whether a serving cell carrying the PDSCH data is a PCell or an SCell. If the serving cell carrying the PDSCH data is the PCell, the UE goes to operation 925 and if the serving cell carrying the PDSCH data is the SCell, the UE goes to operation 930.

In operation 930, the UE determines whether the following conditions are satisfied. If the conditions are satisfied, the UE goes to operation 940 and otherwise, the UE goes to operation 935.

If the conditions are not satisfied, this implies that the PCell and the SCell have the same frequency band or despite different frequency bands, the PCell and the SCell have the same UL/DL configuration. If the PCell and the SCell have the same frequency band, the same UL/DL configuration should be assigned to the two serving cells. In operation 935, the UE selects a subframe in which the HARQ feedback will be transmitted, based on the UL/DL configuration of a current time period. If the UE receives a PDSCH in subframe n−k, the UE transmits an HARQ feedback for the PDSCH in subframe n. For example, k is defined according to the number n of a subframe to carry an HARQ feedback according to a UL/DL configuration, as illustrated in TABLE 6 below.

TABLE 6

| UL/DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, if the UL/DL configuration is UL/DL configuration 5 and n is 2, k is one of 13, 12, 9, 8, 7, 5, 3, 11, and 6.

If the conditions are satisfied, this implies that the PCell and the SCell have different frequency bands and different UL/DL configurations. In operation 940, the UE determines whether simultaneous transmission and reception is available in a current band combination. Or the UE determines whether information indicating that simultaneous transmission and reception is available in the current band combination has been reported to the eNB. If the determination result is affirmative, the UE proceeds to operation 945 and otherwise, the UE proceeds to operation 925.

In operation 925, the UE selects k based on the UL/DL configuration of the PCell instead of the UL/DL configuration of a serving cell to carry the HARQ feedback and selects a subframe to carry the HARQ feedback according to the value of k.

If the UE proceeds from operation 940 to operation 945, this means that the UE may perform simultaneous transmission and reception. In operation 945, the UE selects k, taking into account the UL/DL configurations of both the PCell and the SCell and selects a subframe to carry the HARQ feedback according to the selected k.

Considering the UL/DL configurations of both the PCell and the SCell amounts to identifying a predetermined reference UL/DL configuration according to the combination of the two UL/DL configurations and selecting a subframe to carry the HAR feedback based on the reference UL/DL configuration. If a UE capable of simultaneous transmission and reception considers only the UL/DL configuration of one of a PCell and an SCell, a potential maximum performance that can be achieved by the UE is unnecessarily restricted. Therefore, it is preferred to use a reference UL/DL configuration predefined in the standard. For each combination of UL/DL configurations of a PCell and an SCell, an optimum UL/DL configuration can be determined as a reference UL/DL configuration and clarified in the standard. For example, if UL/DL configuration 3 and UL/DL configuration 1 are assigned to the PCell and the SCell, respectively, their reference UL/DL configuration can be set to UL/DL configuration 4.

Once the value of k is determined, the UE activates an HARQ Round Trip Time (RTT) timer to the sum of 4 and k determined in operation 935 or operation 945 in operation 950 and ends the procedure. The UE waits until receiving a PDCCH indicating a DL transmission according to the HARQ RTT timer.

The HARQ RTT timer is defined so that a UE operating in DRX mode can discontinue PDCCH monitoring to save battery power until receiving an HARQ retransmission. Unless otherwise needed, the UE can discontinue PDCCH monitoring while the HARQ RTT timer is running. If the HARQ RTT timer expires and the UE fails to decode data of an HARQ process associated with the HARQ RTT timer, the UE activates a drx-Retransmission timer.

As described before, if serving cells having different TDD bands and different UL/DL configurations are configured for a UE that does not support simultaneous transmission and reception in the band combination of the TDD bands and the UE receives a PDSCH in an SCell, the UE selects a subframe to carry an HARQ feedback based on the UL/DL configuration of a PCell.

Figure 10A:
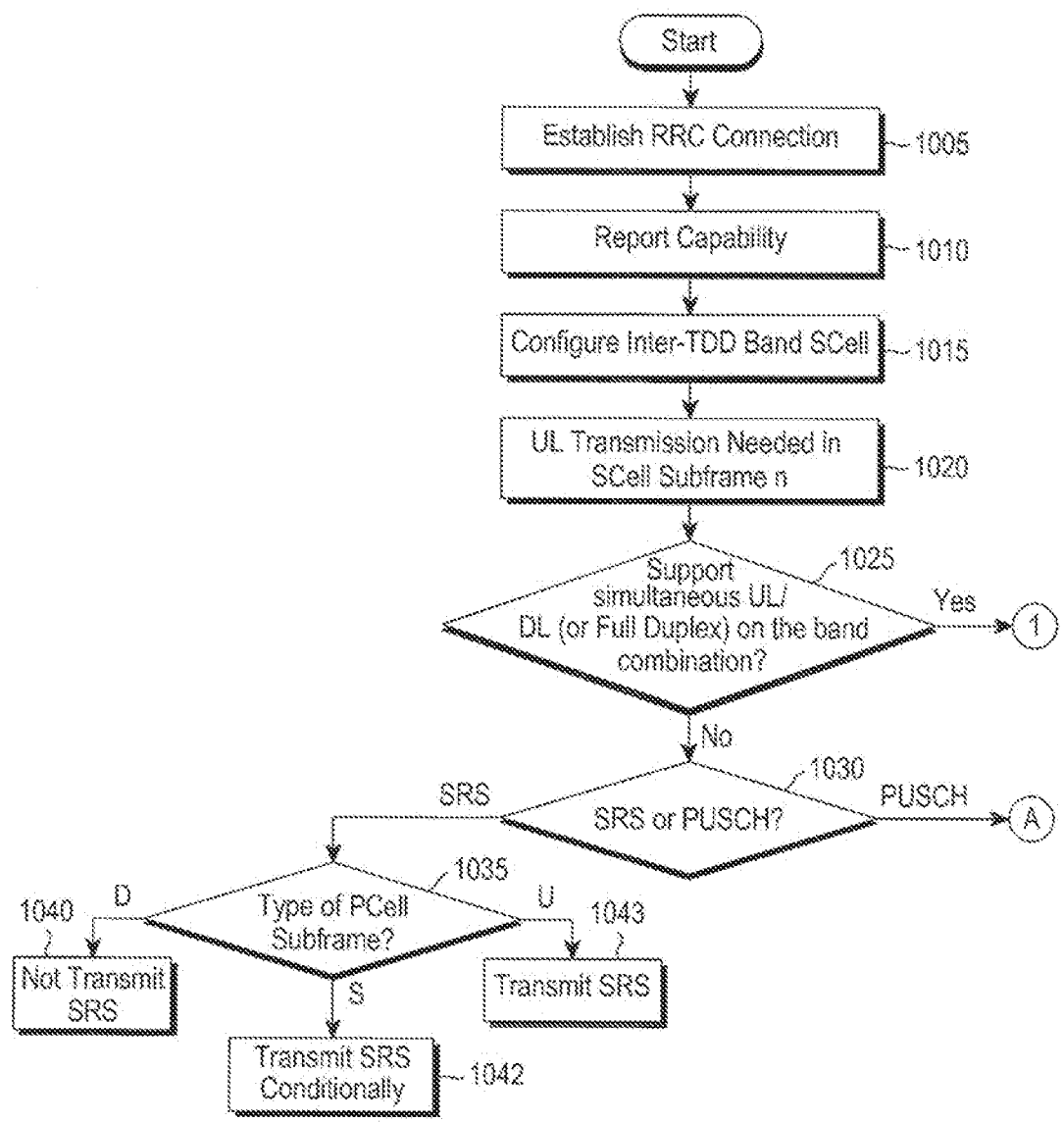
FIGS. 10A and 10B are flowcharts illustrating an example embodiment of an operation of a UE for performing a UL transmission in a secondary serving cell according to this disclosure.
Figure 10B:
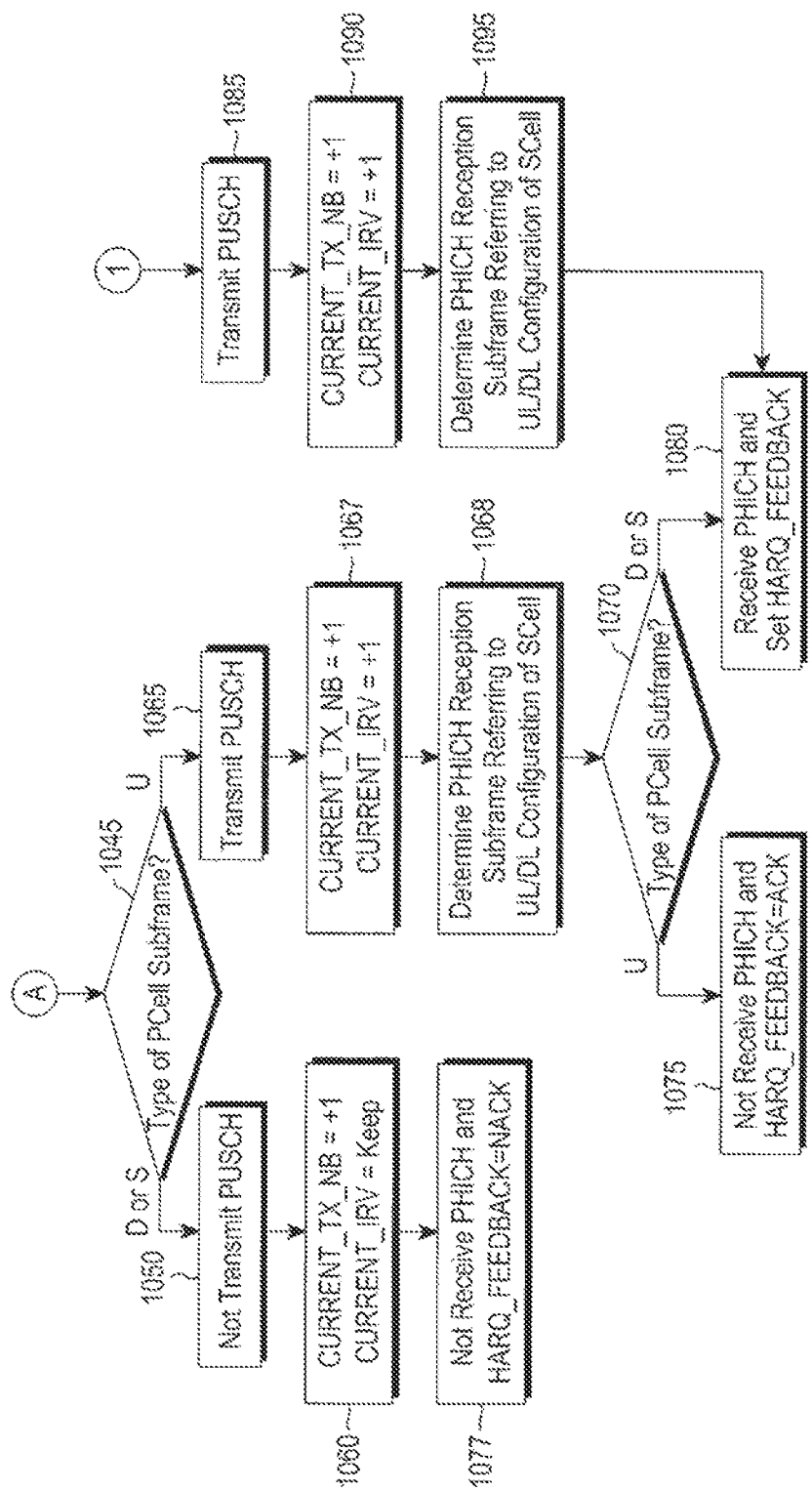

FIGS. 10A and 10B are flowcharts illustrating an example embodiment of an operation of a UE for performing a UL transmission in an SCell according to this disclosure. In FIGS. 10A and 10B, a UE determines a PHICH reception time and a PUSCH transmission time based on the UL/DL configuration of an SCell instead of the UL/DL configuration of a PCell. Therefore, the UE may not receive a PHICH or may not transmit a PUSCH. Herein, the UE increases transmission efficiency by setting related variables to optimum values. Operations 1005 and 1010 are performed in the same manner as operations 905 and 910 illustrated in FIG. 9 and thus will not be described herein in detail.

Referring to FIGS. 10A and 10B, the UE receives a control message indicating configuration of an SCell and configures the SCell in operation 1015. The frequency band and UL/DL configuration of the SCell are different from the frequency band and UL/DL configuration of the PCell.

In operation 1020, the UE determines that it is necessary to perform a UL transmission in subframe n of the SCell. For example, the UE can receive a UL grant for subframe n or an SRS transmission can be scheduled in subframe n.

In operation 1025, the UE determines whether simultaneous transmission and reception is available in a current band combination or information indicating that simultaneous transmission and reception is available has been reported to an eNB. If the determination result is affirmative, the UE proceeds to operation 1085 and otherwise, the UE goes to operation 1030.

In operation 1030, the UE determines whether an SRS or a PUSCH is to be transmitted. In the case of an SRS, the UE goes to operation 1035 and in the case of a PUSCH, the UE goes to operation 1045.

In operation 1035, the UE determines whether subframe n of the PCell is a D subframe, an S subframe, or a U subframe. If PCell subframe n is a D subframe, the UE does not transmit the SRS in the SCell and waits until a UL transmission is needed again in the SCell in operation 1040.

If PCell subframe n is an S subframe, the UE transmits the SRS in the SCell conditionally in operation 1042. Specifically, if the time period of the last OFDM symbol of SCell subframe n is fully included in the time period of the UpPTS of PCell subframe n, the UE transmits the SRS and otherwise, the UE does not transmit the SRS and waits until a UL transmission is needed again in the SCell.

If PCell subframe n is a U subframe, the UE transmits the SRS in the SCell and waits until a UL transmission is needed again in the SCell in operation 1043.

In operation 1045, the UE determines whether PCell subframe n a D subframe, an S subframe, or a U subframe. If PCell subframe n is a D subframe or an S subframe, the UE does not transmit the PUSCH in operation 1050 and increases CURRENT_TX_NB by 1 and maintains CURRENT_IRV in operation 1060. CURRENT_TX_NB and CURRENT_IRV are variables related to PUSCH transmission and have the following meanings.

CURRENT_TX_NB: a variable indicating the number of transmissions of a packet on a PUSCH in a current HARQ operation. If CURRENT_TX_NB reaches a predetermined maximum value, the UE deletes the packet from a buffer.

CURRENT_IRV: a variable indicating the Redundancy Version (RV) of the packet in the current HARQ operation. The UE applies an RV indicated by CURRENT_IRV to PUSCH transmission. RV indicates a configuration of coded bits to be included in a packet to be transmitted on the PUSCH.

Each time the UE receives an HARQ feedback or transmits a PUSCH, the UE updates these variables. If the eNB determines that the UE will not transmit a PUSCH for any reason, it is preferred that the UE and the eNB maintain CURRENT_IRV. Each time a non-adaptive retransmission is performed in a UL HARQ operation, a specific RV is automatically applied. The non-adaptive retransmission refers to a retransmission of the UE in the same transmission resources as used for a previous transmission. Upon receipt of a NACK signal as a feedback, the UE basically performs a non-adaptive retransmission. For example, the UE applies RV 0 to an initial transmission, RV 2 to a first non-adaptive retransmission, RV 3 to a second non-adaptive retransmission, and RV 1 to a third non-adaptive retransmission. The UE and the eNB determine an RV for a next retransmission based on CURRENT_IRV. If CURRENT_IRV is increased in spite of non-transmission of the PUSCH, a part of the RVs is not used in the PUSCH transmission, thereby degrading performance. Thus, the UE maintains CURRENT_IRV in operation 1060.

CURRENT_TX_NB is used to prevent further retransmission in the case where PUSCH transmission is failed despite a predetermined number of or more transmissions. If the current number of transmissions of a current packet reaches a predetermined maximum value, the UE deletes the packet from an HARQ buffer and does not retransmit the packet any longer. If the current number of transmissions of the current packet reaches the predetermined maximum value, the eNB can allocate time/frequency resources allocated to the UE for packet transmission to another UE, considering that the packet will not be retransmitted non-adaptively any longer. Accordingly, it is important for the UE and the eNB to determine that the number of transmissions of a current packet has reached a predetermined maximum number at the same time. For this purpose, the UE and the eNB preferably manage CURRENT_TX_NB based on the number of elapses of retransmission time points, not based on the number of actual PUSCH transmissions. That is, each time a transmission time of a packet elapses, the UE and the eNB preferably increase CURRENT_TX_NB by 1 even though the packet is not actually transmitted.

After setting CURRENT_TX_NB and CURRENT_IRV in operation 1060, the UE sets HARQ_FEEDBACK to NACK without receiving a PHICH in operation 1077. HARQ_FEEDBACK is a variable indicating an HARQ feedback for a PUSCH transmission. If HARQ_FEEDBACK is NACK, the UE performs a retransmission at a next retransmission time. If HARQ_FEEDBACK is ACK, the UE does not perform a retransmission at a next retransmission time.

This is because PHICH reception despite non-transmission of PUSCH data just increases an HARQ feedback error probability. Because the UE has not transmitted PUSCH data, there is no possibility that the eNB receives PUSCH data without an error. Accordingly, HARQ_FEEDBACK is set to NACK.

If PCell subframe n is a U subframe in operation 1045, the UE transmits PUSCH data in SCell subframe n in operation 1065 and increases each of CURRENT_TX_NB and CURRENT_IRV by 1 in operation 1067. In operation 1068, the UE determines a subframe in which to receive a PHICH based on the UL/DL configuration of the SCell. The UE determines whether a PCell subframe corresponding to the PHICH reception subframe is a U subframe in operation 1070. In the case of a U subframe, the UE proceeds to operation 1075. In the case of a D subframe or an S subframe, the UE goes to operation 1080.

In operation 1075, the UE does not receive a PHICH and sets HARQ_FEEDBACK to ACK because although the UE has transmitted the PUSCH, the UE has not received a feedback for the PUSCH. If the UE sets HARQ_FEEDBACK to NACK in this case, the UE performs an unnecessary PUSCH retransmission.

In operation 1080, the UE receives a PHICH and sets HARQ_FEEDBACK to ACK or NACK according to a feedback received on the PHICH.

If simultaneous transmission and reception is available in the current band combination or information indicating support of simultaneous transmission and reception in the current band combination has been reported to the eNB in operation 1025, the UE transmits a PUSCH in SCell subframe n in operation 1085 and increases each of CURRENT_TX_NB and CURRENT_IRV by 1 in operation 1090. In operation 1095, the UE determines a subframe in which to receive a PHICH based on the UL/DL configuration of the SCell. Then the UE receives a feedback on the PHICH in the determined subframe and sets HARQ_FEEDBACK to ACK or NACK according to the received feedback in operation 1080.

Only when a UL transmission is not restricted by another solution or a requirement, an SRS or a PUSCH is transmitted in operations 1042, 1043, 1065, and 1085.

Figure 11:
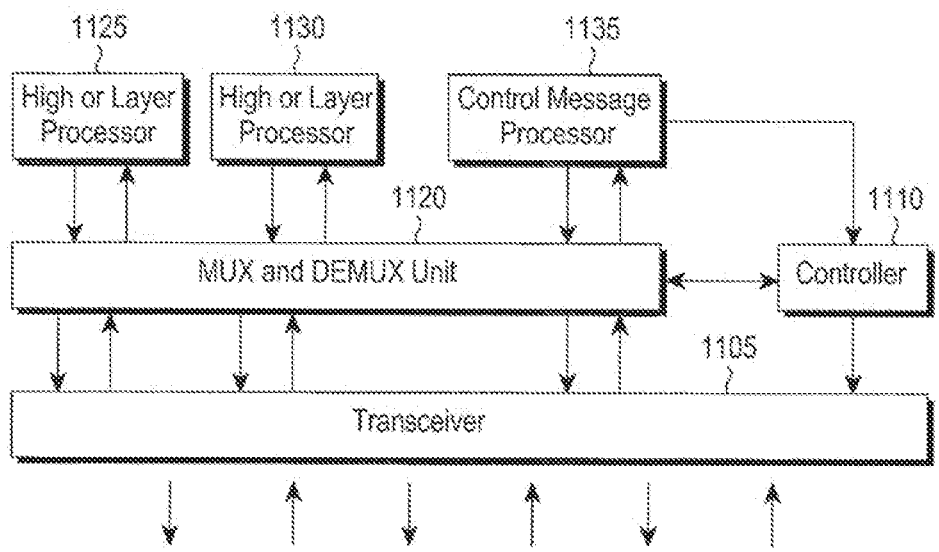
FIG. 11 is a block diagram of an example embodiment of a UE according to this disclosure.

FIG. 11 is a block diagram of an example embodiment of a UE according to this disclosure.

Referring to FIG. 11, the UE includes a transceiver 1105, a controller 1110, a Multiplexer (MUX) and Demultiplexer (DEMUX) unit 1120, a control message processor 1135, and one or more higher layer processors 1125 and 1130.

The transceiver 1105 includes a receiver that receives data and a control signal on a DL channel of a serving cell and a transmitter that transmits data and a control signal on a UL channel of the serving cell. If a plurality of serving cells are configured for the, the transceiver 1105 can transmit and receive data and a control signal in the plurality of serving cells.

The MUX and DEMUX unit 1120 multiplexes data generated from the higher layer processors 1125 and 1130 or the control message processor 1135 or demultiplexes data received from the transceiver 1105 and provides the demultiplxed data to the higher layer processors 1125 and 1130 or the control message processor 1135.

The control message processor 1135 processes a control message received from an eNB and performs a necessary operation according to the processed control message. For example, upon receipt of an SCell-related parameter, the control message processor 1135 provides the SCell-related parameter to the controller 1110.

The higher layer processors 1125 and 1130 can be configured on a service basis. The higher layer processors 1125 and 1130 process data generated from a user service such as File Transfer Protocol (FTP) or Voice over Internet Protocol (VoIP) and provide the processed data to the MUX and DEMUX unit 1120. The higher layer processors 1125 and 1130 also process data received from the MUX and DEMUX unit 1120 and provide the processed data to a higher layer service application.

The controller 1110 checks a scheduling command, for example, a UL grant received through the transceiver 1105 and controls the transceiver 1105 and the MUX and DEMUX unit 1120 to perform a UL transmission in appropriate transmission resources at an appropriate time point. The controller 1110 also determines an operation to perform in an SCell subframe based on the frequency bands and UL/DL configuration of a PCell and the SCell and controls the transceiver 1105 according to the determined operation.

Figure 12:
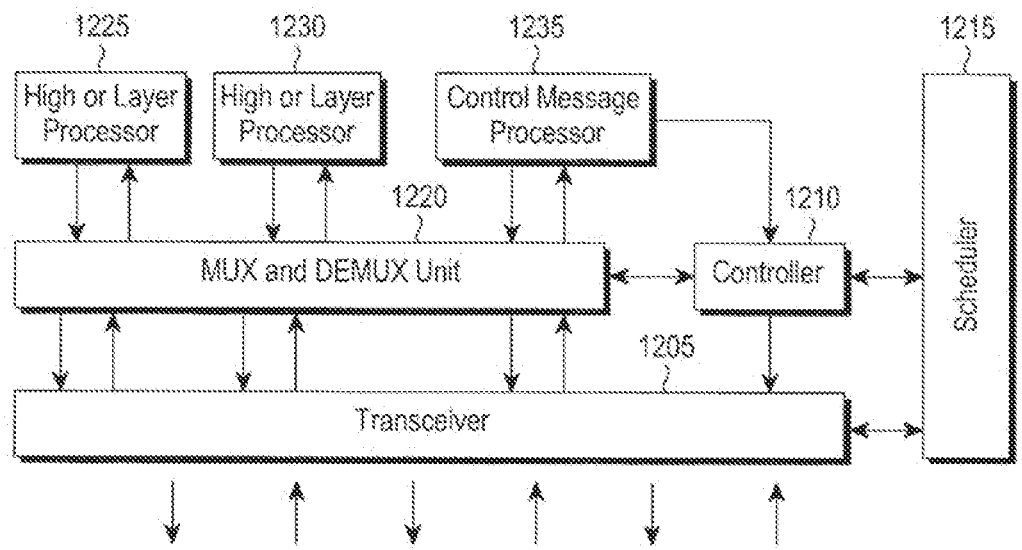
FIG. 12 is a block diagram of an example embodiment of an evolved Node B (eNB) according to this disclosure.

FIG. 12 is a block diagram of an example embodiment of an eNB according to this disclosure.

Referring to FIG. 11, the eNB includes a transceiver 1205, a controller 1210, a MUX and DEMUX unit 1220, a control message processor 1235, one or more higher layer processors 1225 and 1230, and a scheduler 1215.

The transceiver 1205 transmits data and a specific control signal in a DL carrier and receives data and a specific control signal in a UL carrier. If a plurality of carriers are configured, the transceiver 1205 can transmit and receive data and a control signal in the plurality of carriers.

The MUX and DEMUX unit 1220 multiplexes data generated from the higher layer processors 1225 and 1230 or the control message processor 1235, or demultiplexes data received from the transceiver 1205 and provides the demultiplxed data to the higher layer processors 1225 and 1230 or the controller 1210. The control message processor 1235 processes a control message received from a UE and performs a necessary operation according to the processed control message, or generates a control message to be transmitted to the UE and provides the control message to a lower layer.

The higher layer processors 1225 and 1230 can be configured on a UE basis and on a service basis. The higher layer processors 1225 and 1230 process data generated from a user service such as FTP or VoIP and provide the processed data to the MUX and DEMUX unit 1220. The higher layer processors 1225 and 1230 also process data received from the MUX and DEMUX unit 1220 and provide the processed data to a higher layer service application.

The controller 1210 determines SCell subframes in which the UE will receive a DL signal and transmit a UL signal based on the frequency bands and UL/DL configurations of a PCell and the SCell and controls the transceiver 1205 based on the determination.

The scheduler 1215 allocates transmission resources to the UE at an appropriate time point, taking into account the buffer state, channel state, and active time of the UE so that the transceiver 1205 can process a signal received from the UE or a signal to be transmitted to the UE.

The propagation environments of the PCell and the SCell can be different greatly depending on the frequency bands of the PCell and the SCell. As a result, DL reception times can be different between the serving cells. Accordingly, SCell subframe n can overlap at least partially with PCell subframe n and a PCell subframe adjacent to PCell subframe n on the time axis.

Figure 13A:
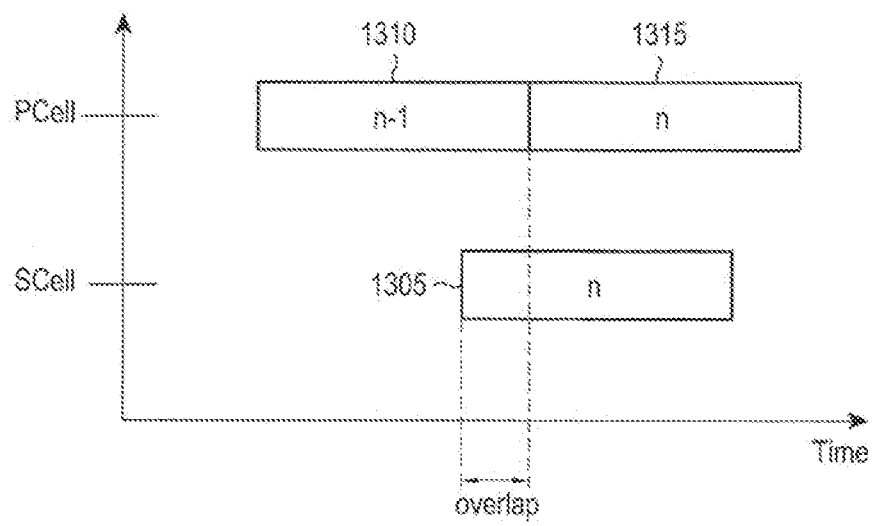
FIGS. 13A and 13B illustrate example embodiments of situations in which subframes of serving cells are overlapped with each other.
Figure 13B:
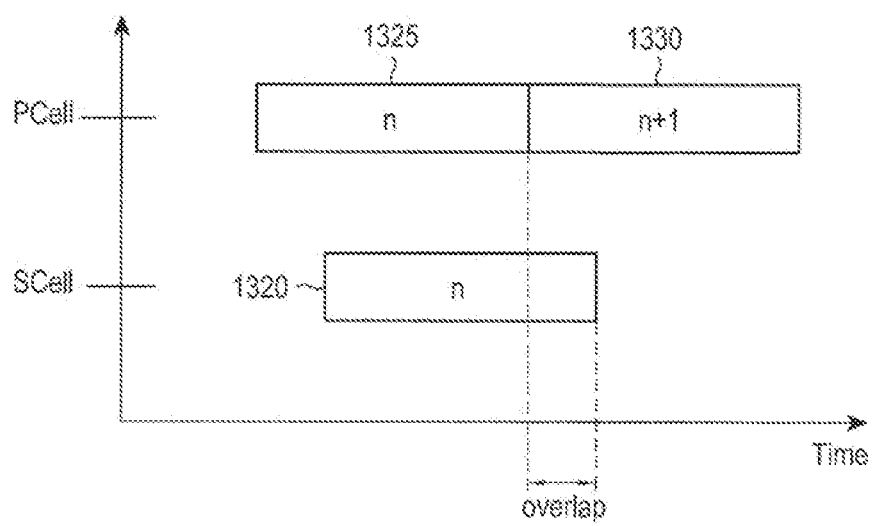

FIGS. 13A and 13B illustrate example embodiments of situations in which subframes of serving cells are overlapped with each other.

Referring to FIG. 13A, a reception time of an SCell precedes a reception time of a PCell. In this case, SCell subframe n (a subframe 1305) is partially overlapped with PCell subframe n (a subframe 1315) and PCell subframe n−1 (a subframe 1310). Referring to FIG. 13B, if the reception time of the SCell is later than the reception time of the PCell, SCell subframe n (a subframe 1320) is partially overlapped with PCell subframe n (a subframe 1325) and PCell subframe n+1 (a subframe 1330).

In the above cases, the UE should consider PCell subframe n and a PCell subframe adjacent to PCell subframe n in determining an operation to perform in SCell subframe n.

Figure 14:
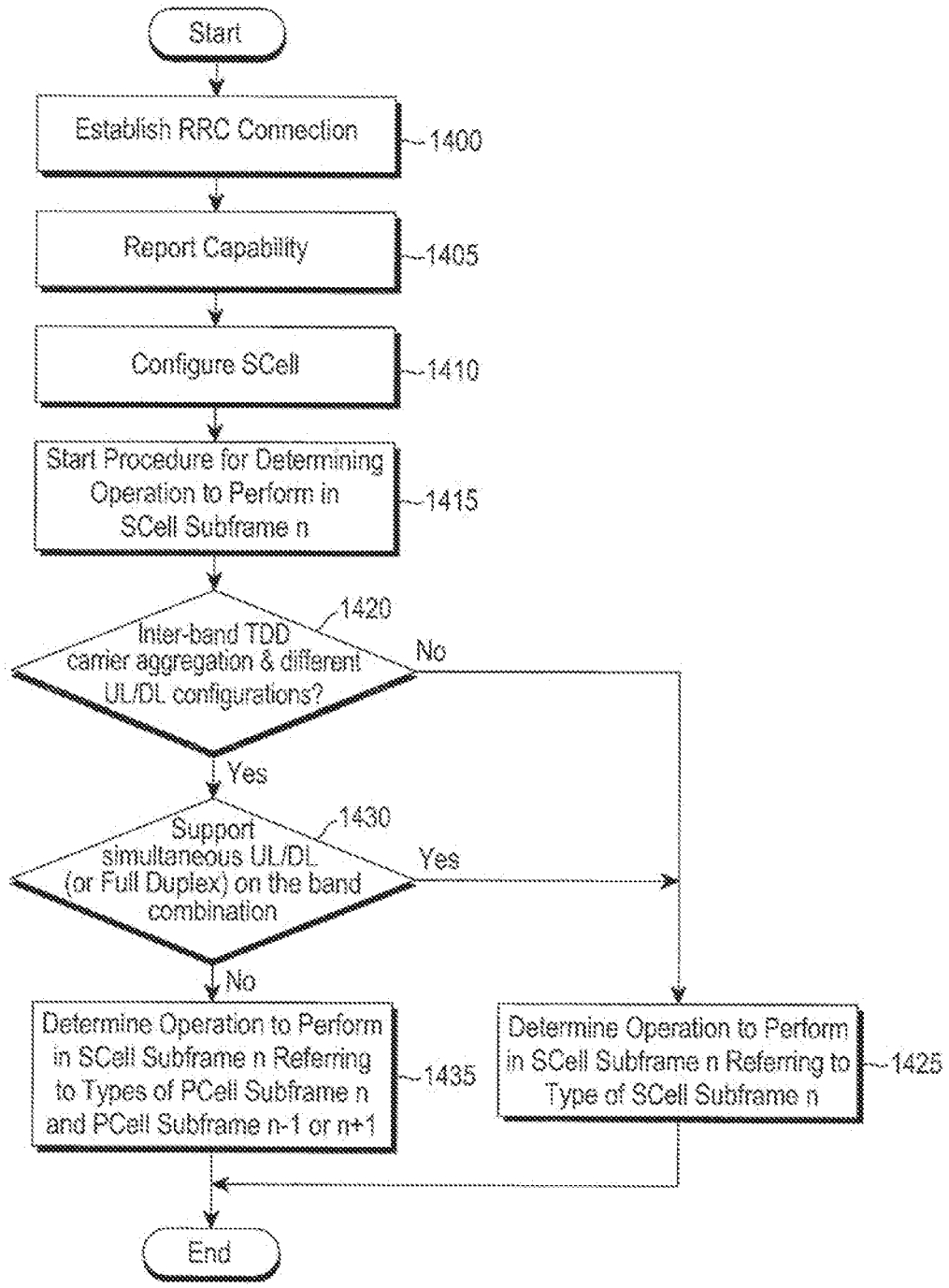
FIG. 14 is a flowchart illustrating an example embodiment of an operation of a UE in a subframe of a secondary serving cell according to this disclosure.

FIG. 14 is a flowchart illustrating an example embodiment of an operation of a UE in a subframe of an SCell according to this disclosure.

Referring to FIG. 14, the UE receives system information about a serving cell and acquires the UL/DL configuration of the serving cell from the system information in operation 1400. Then the UE starts an RRC connection establishment procedure for the serving cell. Upon completion of the RRC connection establishment procedure, the serving cell becomes a PCell for the UE.

In operation 1405, the UE reports its capabilities to an eNB by a capability information message. The capability information message can include information about UE-supported band combinations. The UE additionally reports information indicating availability of simultaneous transmission and reception for an inter-TDD band combination.

In operation 1410, an SCell is configured for the UE. Specifically, the SCell is configured by transmitting an RRC control message including SCell configuration information to the UE by the eNB and establishing a signal path to support the frequency band of the SCell based on the SCell configuration information by the UE, so that data transmission and reception can be performed in the SCell. The SCell configuration information includes, for example, information about a center frequency of the SCell, radio resources allocated to the UE in the SCell, and the UL/DL configuration of the SCell.

In operation 1415, the UE waits until SCell subframe n starts in order to determine an operation to perform in SCell subframe n.

The UE checks whether the following conditions are satisfied in operation 1420. If the conditions are satisfied, the UE goes to operation 1430 and otherwise, the UE goes to operation 1425.

The PCell and the SCell have different frequency bands (inter-band TDD carrier aggregation).

The PCell and the SCell have different UL/DL configurations.

If the conditions are not satisfied, this means that the PCell and the SCell have the same frequency band or that although the PCell and the SCell have different frequency bands, they have the same UL/DL configuration. If the PCell and the SCell have the same frequency band, the same UL/DL configuration should be assigned to the PCell and the SCell.

In operation 1425, the UE determines the type of SCell subframe n based on the UL/DL configuration of the SCell and determines an operation to perform according to the type of SCell subframe n. The UE operates as follows according to the types of subframes.

If subframe n is a D subframe, the UE determines to receive a PDCCH/PHICH/PDSCH in subframe n.

If subframe n is an S subframe, the UE determines to receive a PDCCH/PHICH and when needed, to perform an UpPTS transmission in subframe n.

If subframe n is a U subframe, the UE determines to transmit a PUSCH and an SRS in subframe n, when needed.

The above operations can be limited by another solution or a requirement imposed on the UE. For example, if subframe n does not correspond to an active time in a DRX operation or overlaps with a measurement gap being a time period during which the UE does not perform an uplink transmission and a downlink reception, the above operations can not be performed.

If the above conditions are satisfied, this implies that the PCell and the SCell have different frequency bands and different UL/DL configurations. In operation 1430, the UE determines whether simultaneous transmission and reception is available in a current band combination (such as the combination of the frequency bands of the PCell and the SCell). Or the UE determines whether information indicating support of simultaneous transmission and reception in the current band combination has been reported to the eNB. If the determination result is affirmative, the UE goes to operation 1425 and otherwise, the UE goes to operation 1435.

In operation 1435, the UE determines an operation to perform in SCell subframe n of the SCell based on the type of a PCell subframe overlapped with SCell subframe n. In general, the frame boundaries of the PCell and the SCell are aligned and PCell subframe n is overlapped with SCell subframe n. However, if the frame boundaries of the PCell and the SCell are not aligned, the UE operates as follows.

In the case where the DL reception time of the SCell is earlier than the DL reception time of the PCell (that is, the start of SCell subframe n is before the start of PCell subframe n) and SCell subframe n is a U subframe, if at least one of PCell subframe n−1 and PCell n is a D subframe, the eNB schedules the UE not to perform a UL transmission in SCell subframe n. Even though a UL transmission, for example, a non-adaptive retransmission is scheduled in SCell subframe n, the UE increases CURRENT_TX_NB by 1 without performing the UL transmission.

In the case where the DL reception time of the SCell is later than the DL reception time of the PCell (that is, the start of SCell subframe n is behind the start of PCell subframe n of the PCell) and SCell subframe n is a U subframe, if at least one of PCell subframe n and PCell subframe n+1 is a D subframe, the eNB schedules the UE not to perform a UL transmission in SCell subframe n. Even though a UL transmission, for example, a non-adaptive retransmission is scheduled in SCell subframe n, the UE increases CURRENT_TX_NB by 1 without performing the UL transmission.

In the case where the DL reception time of the SCell is earlier than the DL reception time of the PCell (that is, the start of SCell subframe n is before the start of PCell subframe n) and SCell subframe n is a D subframe, if at least one of PCell subframe n−1 and PCell subframe n is a U subframe, the eNB does not schedule a DL transmission in SCell subframe n for the UE. The UE does not perform a DL reception in SCell subframe n. That is, the UE does not receive a PDCCH/PHICH/PDSCH in SCell subframe n. Only when SCell subframe n is a D subframe and both PCell subframe n−1 and PCell subframe n are D subframes (or either of PCell subframe n−1 and PCell subframe n is not a U subframe), the UE receives a DL signal in SCell subframe n.

In the case where the DL reception time of the SCell is later than the DL reception time of the PCell (that is, the start of SCell subframe n is behind the start of PCell subframe n) and SCell subframe n is a D subframe, if at least one of PCell subframe n and PCell subframe n+1 is a U subframe, the eNB does not schedule a DL transmission in SCell subframe n for the UE. The UE does not perform a DL reception in SCell subframe n. That is, the UE does not receive a PDCCH/PHICH/PDSCH in SCell subframe n. Only when SCell subframe n is a D subframe and both PCell subframe n, and PCell subframe n+1 are D subframes or PCell subframe and PCell subframe n+1 are a D subframe and an S subframe, respectively (or either of PCell subframe n and PCell subframe n+1 is not a U subframe), the UE receives a DL signal in SCell subframe n.

In other words, if any of PCell subframes overlapped at least partially with SCell subframe n is a U subframe, the UE is not allowed to receive a DL signal in SCell subframe n and the eNB schedules the UE accordingly.

If any of PCell subframes overlapped at least partially with SCell subframe n is a D subframe, the UE is not allowed to transmit a UL signal in SCell subframe n and the eNB schedules the UE accordingly.

The UE and the eNB that operate according to the procedure of FIG. 14 have the configurations illustrated in FIGS. 11 and 12, respectively.

To support inter-frequency handover, a UE is configured to measure a frequency other than a current serving frequency (such as a serving cell) from time to time. The UE is not allowed to transmit data or receive data in the serving frequency according to the hardware of the UE while the UE is measuring the non-serving frequency. For example, if the UE includes a single RF front end, the UE can not transmit or receive a signal in the serving frequency during measurement of the non-serving frequency using the single RF front end.

To prevent performance degradation caused by data transmission to the UE or UL scheduling for the UE by an eNB during measurement of the UE, a time period during which the UE does not perform an uplink transmission and a downlink reception can be preset for the UE. This time period is referred to as a measurement gap. The UE does not transmit data and tune its receiver to the carrier frequencies of a PCell and an SCell during the measurement gap.

The measurement gap can start at the start of a specific subframe and last a predetermined time, for example, 6 ms. The subframe in which the measurement gap starts is specified by a parameter, gapOffset. The eNB transmits measurement gap configuration information to the UE, simultaneously with indicating measurement of non-serving frequencies. For example, the measurement gap configuration information can include the following information.

gapOffset: information indicating a subframe in which a measurement gap starts.

Measurement Gap Repetition Period (MGRP) information: information indicating whether an MGRP is 40 ms or 80 ms.

The UE determines a time period corresponding to the measurement gap based on the measurement gap configuration information and performs none of DL reception and UL transmission in the serving cells during the measurement gap.

Figure 15:
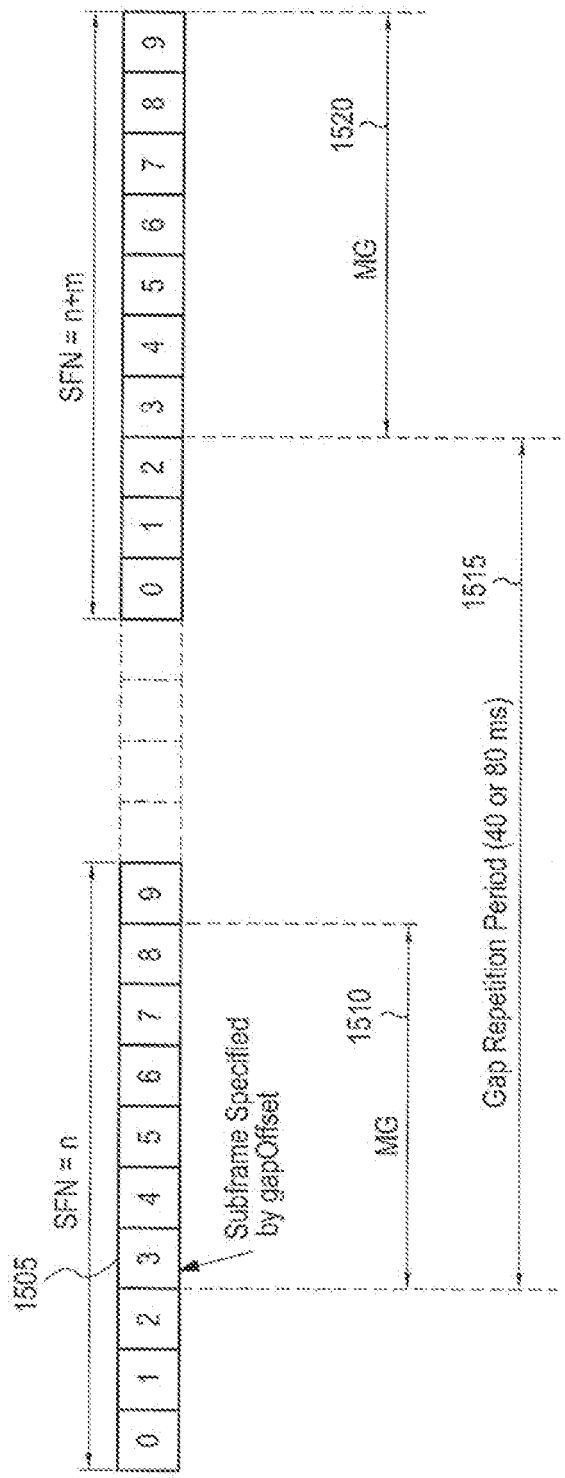
FIG. 15 illustrates an example embodiment of a measurement gap according to this disclosure.

FIG. 15 illustrates an example embodiment of a configuration of a measurement gap according to this disclosure.

Referring to FIG. 15, gapOffset specifies subframe 3 (a subframe 1505) of a radio frame with SFN n. A first measurement gap 1510 starts at the starting of subframe 3 and lasts 6 ms. A second measurement gap 1520 starts in the same subframe of radio frame n+m, that is, subframe 3 of radio frame n+m after a predetermined time period from the starting of the first measurement gap 1510. Herein, m is an integer determined by an MGRP.

Even though a UE completely measures non-serving frequencies during one measurement gap, the measurement gap repeatedly occurs until an eNB releases the measurement gap.

If only one serving cell is configured for the UE, the start of a measurement gap can be determined accurately simply by specifying a starting subframe. However, if a plurality of serving cells are configured for the UE, the start of a measurement gap can not be determined accurately simply by specifying a starting subframe.

Figure 16:
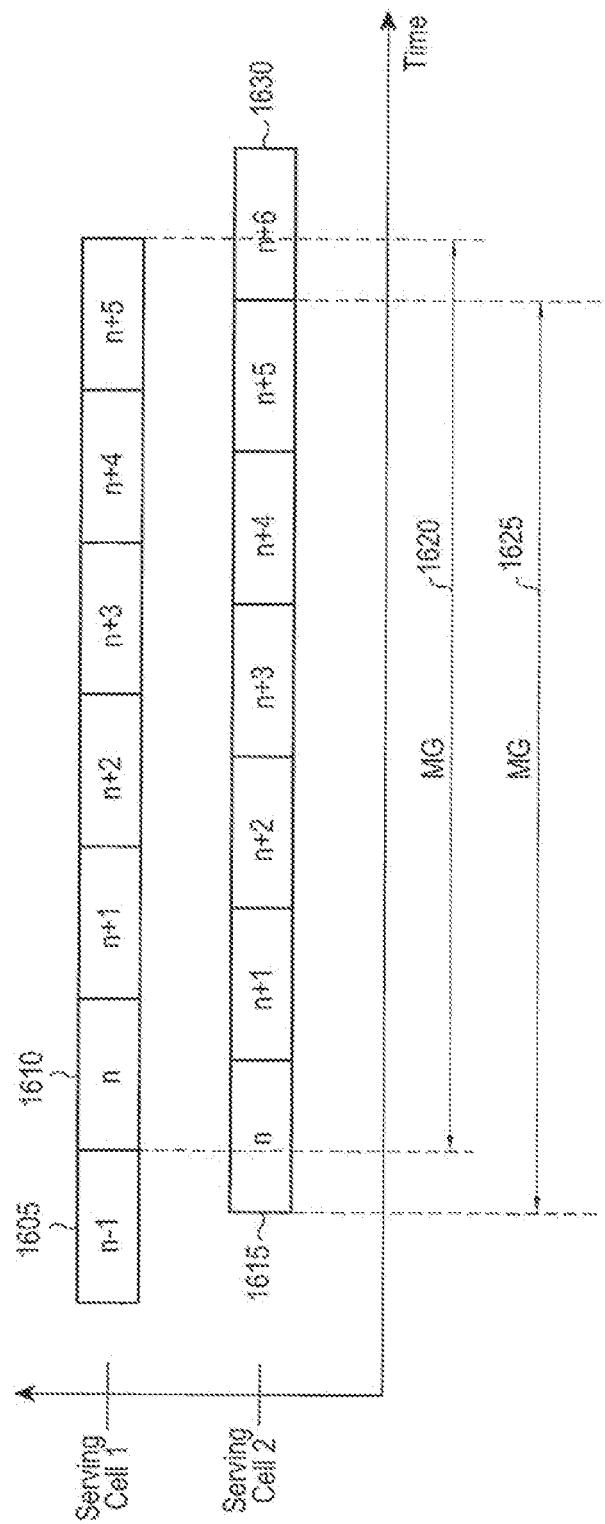
FIG. 16 illustrates an example embodiment of a problem involved in configuring a measurement gap, when the subframe boundaries of serving cells are not aligned.

FIG. 16 illustrates an example embodiment of a problem involved in configuring a measurement gap, when the subframe boundaries of serving cells are not aligned.

Referring to FIG. 16, the DL reception time of serving cell 1 is later than the DL reception time of serving cell 2 and gapOffset specifies the start of a measurement gap as subframe n. With respect to subframe n (a subframe 1610) of serving cell 1, a measurement gap 1620 lasts from subframe n of serving cell 1 to subframe n+5 of serving cell 1. A starting part of subframe n (a subframe 1615) of serving cell 2 is not included in the measurement gap 1620, whereas a starting part of subframe n+6 (a subframe 1630) of serving cell 2 is included in the measurement gap 1620.

With respect to subframe n of serving cell 2, a measurement gap 1625 lasts from subframe n of serving cell 2 to subframe n+5 of serving cell 2. A last part of subframe n−1 (a subframe 1605) of serving cell 1 is included in the measurement gap 1625, whereas a last part of subframe n+5 of serving cell 1 is not included in the measurement gap 1625.

A measurement gap is a time period during which a UE does not perform an uplink transmission and a downlink reception and can measure non-serving frequencies, and an eNB agrees not to schedule the UE in the measurement gap. If the UE and the eNB have different measurement gaps, the eNB can transmit and receive data in a subframe in which the UE does not transmit and receive data. For example, if the eNB uses the measurement gap 1620 configured with respect to serving cell 1 and the UE uses the measurement gap 1625 configured with respect to serving cell 2, the measurement gap 1625 of the UE starts before subframe n−1 of serving cell 1 and thus the UE does not transmit and receive data in subframe n−1 of serving cell 1. However, since the measurement gap 1620 of the eNB does not include subframe n−1 of serving cell 1, the eNB can transmit data to the UE in subframe n−1 of serving cell 1.

To avert the above problem, the UE and the eNB determine the start of a measurement gap based on the same serving cell. In an embodiment of the present disclosure, a PCell can be used as a reference for a measurement gap. In the illustrated case of FIG. 16, if serving cell 1 is a PCell, the measurement gap 1620 is used and if serving cell 2 is a PCell, the measurement gap 1625 is used.

Figure 17:
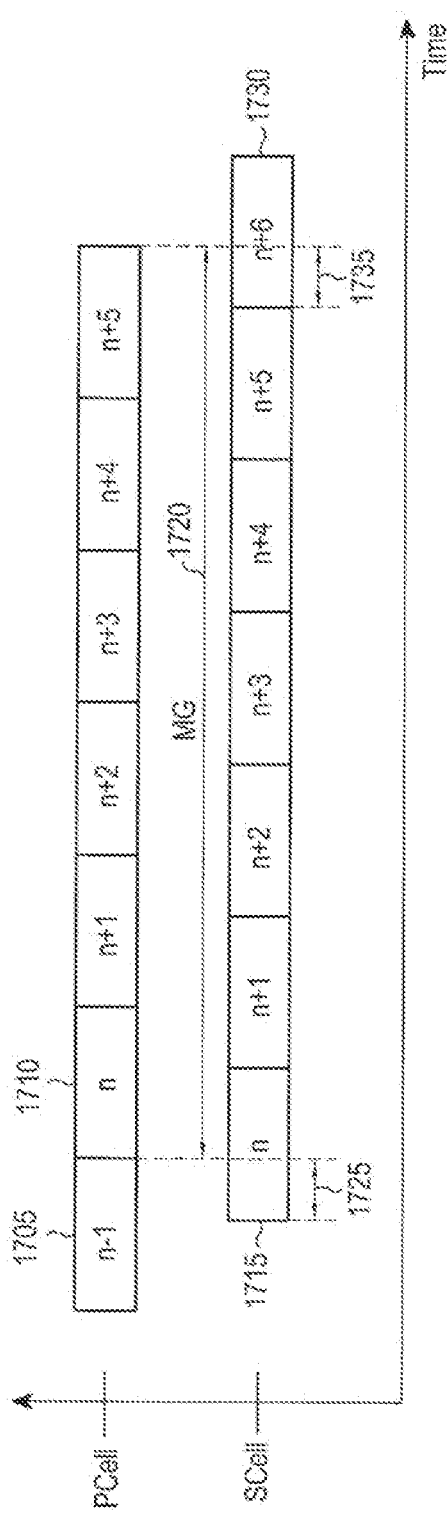
FIG. 17 illustrates an example embodiment of setting of a measurement gap, when a DL reception time of a secondary serving cell precedes a DL reception time of a primary serving cell.

FIG. 17 illustrates configuration of a measurement gap, when the DL reception time of an SCell is earlier than the DL reception time of a PCell. In FIG. 17, both an eNB and a UE set the same measurement gap 1720 starting in PCell subframe n.

Referring to FIG. 17, SCell subframe n (a subframe 1715) is earlier than PCell subframe n (a subframe 1710). Therefore, SCell subframe n is overlapped with PCell subframe n−1 (a subframe 1705) over a specific part 1725. The measurement gap 1720 is configured to start at the start of PCell subframe n and end at the end of PCell subframe n+5. If the SCell precedes the PCell, a starting part 1735 of SCell subframe n+6 (a subframe 1730) is included in the measurement gap 1720 and the eNB does not transmit data to the UE in SCell subframe n+6. While it is determined by the subframe index of SCell subframe n+6 that SCell subframe n+6 does not belong to the measurement gap 1720, the starting part 1735 of SCell subframe n+6 is included in the measurement gap 1720 in the actual time domain. Thus, the UE does not perform data transmission and reception in SCell subframe n+6, determining that the eNB will not schedule the UE in SCell subframe n+6.

If the SCell precedes the PCell as described above, a starting part of a specific SCell subframe is included in a measurement gap and thus the eNB does not transmit data to the UE in the SCell subframe. Although the SCell subframe is determined not to be included in the measurement gap because of its subframe index, the starting part of the SCell subframe is included in the measurement gap. Therefore, the UE does not transmit and receive data in the SCell subframe, determining that the eNB will not schedule the UE in the SCell subframe.

Figure 18:
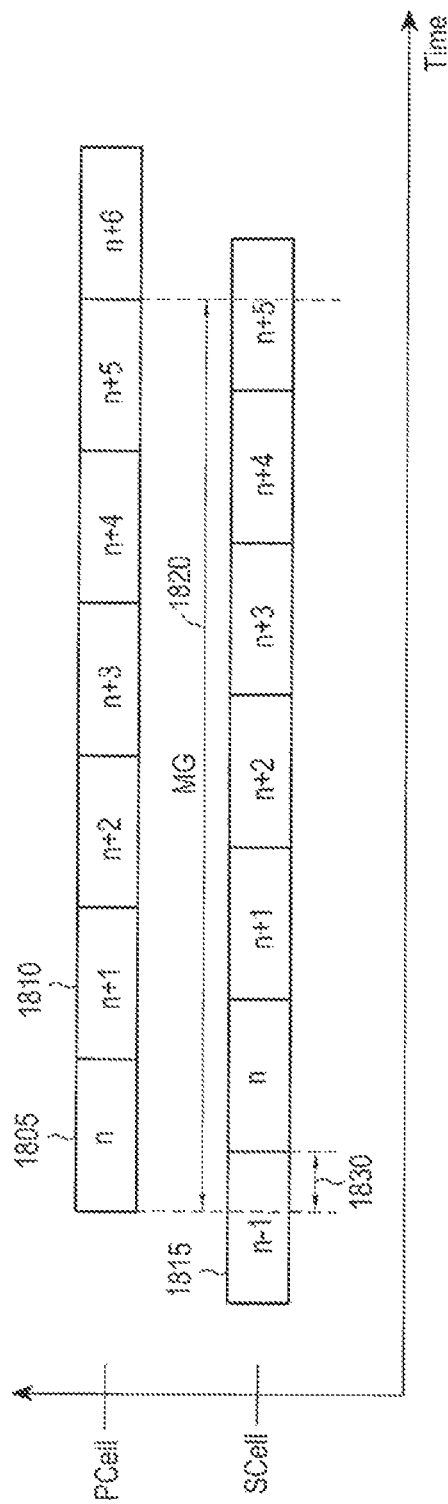
FIG. 18 illustrates an example embodiment of setting of a measurement gap, when a DL reception time of a primary serving cell precedes a DL reception time of a secondary serving cell.

FIG. 18 illustrates an example embodiment of a configuration of a measurement gap, when the DL reception time of a PCell is earlier than the DL reception time of an SCell. In FIG. 18, both an eNB and a UE set the same measurement gap 1820 starting in PCell subframe n.

Referring to FIG. 18, PCell subframe n (a subframe 1805) is overlapped with SCell subframe n−1 (a subframe 1815) over a specific part 1830. If SCell subframe n is behind PCell subframe n, a last part 1830 of SCell subframe n−1 (a subframe 1815) is included in the measurement gap 1820 and thus the eNB does not transmit data to the UE in SCell subframe n−1. While it is determined by the subframe index of SCell subframe n−1 that SCell subframe n−1 does not belong to the measurement gap 1820, the last part 1830 of SCell subframe n−1 is included in the measurement gap 1820 in the time domain. Thus, the UE does not perform data transmission and reception in SCell subframe n−1, determining that the eNB will not schedule the UE in SCell subframe n−1.

Figure 19:
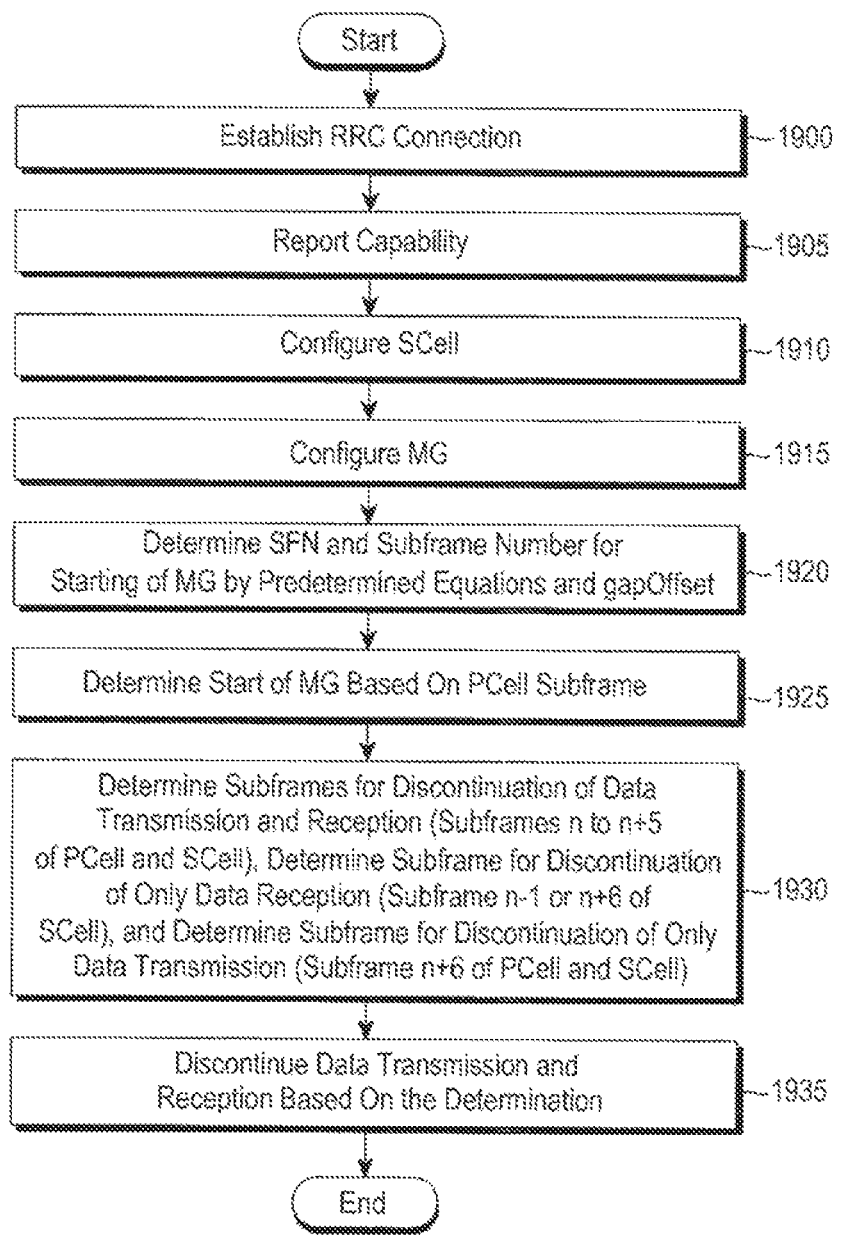
FIG. 19 is a flowchart illustrating an example embodiment of an operation of a UE in regards to a measurement gap according to this disclosure.

FIG. 19 is a flowchart illustrating an example embodiment of an operation of a UE in regards to a measurement gap according to this disclosure.

Referring to FIG. 19, the UE receives system information about a serving cell, acquires information required for an RRC connection establishment procedure, and starts the RRC connection establishment procedure for the serving cell in operation 1900. Once the RRC connection establishment procedure is completed, the serving cell becomes a PCell for the UE.

In operation 1905, the UE reports its capabilities to an eNB by a UE capability information message. If the UE supports CA, the UE capability information message includes information about UE-supported band combinations and the eNB determines what cell having what specific frequency to configure as an SCell based on the supported band combination information.

In operation 1910, the SCell is configured for the UE. The SCell is configured by transmitting an RRC control message including SCell configuration information from the eNB to the UE and establishing a signal path for supporting the frequency band of the SCell based on the SCell configuration information by the UE, or setting a transceiver of the UE to transmit and receive data in the SCell. The SCell configuration information includes, for example, information about a center frequency of the SCell, radio resources allocated to the UE in the SCell, and the like.

In operation 1915, the eNB configures a measurement gap for the UE. The measurement gap is configured by allocating gapOffset to the UE. For example, gapOffset is classified into a first gapOffset ranging from 0 to 39 and a second gapOffset ranging from 0 to 79 and one of the first and second gapOffsets is used. An MGRP corresponding to the first gapOffset is 40 ms and an MGRP corresponding to the second gapOffset is 80 ms.

The SCell configuration (operation 1910) and the measurement gap configuration (operation 1915) can take place simultaneously by one RRC message or sequentially by separate control messages. In the latter case, the order of the SCell configuration and the measurement gap configuration can be changed.

In operation 1920, the UE determines an SFN and a subframe number that specify the starting point of the measurement gap by a predetermined equations and a gap offset. The subframe number indicates a first subframe of the measurement gap.

In an embodiment of the present disclosure, the SFN of a radio frame in which the measurement gap starts can be calculated by equation (1).

$$\text{SFN mod } T = \text{FLOOR}(gapOffset/10) \qquad (1)$$

where T=MGRP/10.

In an embodiment of the present disclosure, the number of a subframe in which the measurement gap starts can be calculated by equation (2).

$$\text{subframe} = gapOffset \bmod 10 \qquad (2)$$

In operation 1925, the UE determines the start of the measurement gap by applying the SFN and the subframe number specifying the start of the measurement gap to the PCell. For example, if subframe number n is calculated by equation (2), the UE determines that the measurement gap starts in PCell subframe n.

In operation 1930, the UE determines in what subframe of what serving cell to discontinue transmission and reception based on the determined measurement gap. The determination can be made as follows.

The UE does not perform either UL transmission or DL reception in subframe n to subframe n+5 of the PCell and subframe n to subframe n+5 of an active SCell.

The UE does not perform (or discontinues) DL reception in a subframe immediately before the measurement gap in SCell p having a DL reception time earlier than the DL reception time of the PCell, that is, in subframe n−1 of SCell p from among active SCells. In other words, DL reception is performed in the other subframes except for subframe n−1 to subframe n+5 of SCell p, unless otherwise prohibited.

The UE does not perform (or discontinues) DL reception in a subframe immediately after the measurement gap in SCell k having a DL reception time later than the DL reception time of the PCell, that is, in subframe n+6 of SCell k from among active SCells. In other words, DL reception is performed in the other subframes except for subframe n to subframe n+6 of SCell k, unless otherwise prohibited.

The UE does not perform (or discontinues) UL transmission in a subframe immediately after the measurement gap in the PCell and all active SCells, that is, in subframes n+6 of the PCell and all active SCells. In other words, UL transmission is performed in the other subframes except for subframes n to subframes n+6 of the PCell and the SCells, if the UL transmission is not prohibited otherwise and the UL transmission is scheduled.

Because UL subframe n+6 is overlapped with DL subframe n+5 on the time axis due to a Timing Advance (TA) applied to an OFDM system, UL transmission is not performed in subframe n+6.

In operation 1935, the UE discontinues (or blocks) DL reception in a specific subframe of a specific serving cell and UL transmission in a specific subframe of a specific serving cell, according to the determination.

Discontinuation of DL reception in a subframe means that the UE does not monitor a PDCCH and buffer a PDSCH in the subframe, and even though the UE is scheduled to receive a DL HARQ feedback in the subframe, the UE does not receive the HARQ feedback in the subframe. The non-received HARQ feedback is a response to a PUSCH transmission. If a PUSCH is transmitted and an HARQ feedback is not received for the PUSCH, the UE performs an HARQ operation, determining that the HARQ feedback is an ACK. If a PUSCH is not transmitted and an HARQ feedback is not received, the UE performs an HARQ operation, determining that the HARQ feedback is a NACK.

Discontinuation of UL transmission in a subframe means that even though PUCCH transmission or PUSCH transmission is scheduled in the subframe, the UE does not perform the UL transmission. Particularly when the UE does not transmit a PUSCH, the UE increases CURRENT_TX_NB by 1 and maintains CURRENT_IRV at a current value.

Since the subframe immediately before the measurement gap can be partially overlapped with the measurement gap in the time domain, DL reception is not performed in the subframe immediately before the measurement gap in the embodiment of the present disclosure illustrated in FIG. 9. However, if the overlapped period is very short relative to a subframe length in the time domain, the probability of receiving a DL signal in the subframe and succeeding in decoding the DL signal at the UE can be very high. An embodiment of receiving a DL signal after puncturing, instead of quitting DL reception in a subframe overlapped with a measurement gap in the time domain will be described below.

One subframe includes 14 OFDM symbols. A PDCCH is transmitted in the first n symbols of the subframe and a PDSCH is transmitted in the last (14-n) symbols. Even though the PDSCH is partially lost, there is a possibility that the PDSCH is decoded successfully using a received part of the PDSCH. In contrast, if even a part of the PDCCH is not received, the PDCCH may not be interpreted correctly. Therefore, a DL subframe to be received should be confined to a subframe having a last part overlapped with a measurement gap. That is, even though a subframe immediately before the measurement gap, that is, subframe n−1 is partially overlapped with the measurement gap, DL reception is possible in subframe n−1. Thus, DL reception may be allowed in subframe n−1. In addition, the start of the measurement gap is appropriately adjusted so as to prevent a subframe immediately after the measurement gap from overlap with the measurement gap on the time axis.

Figure 20:
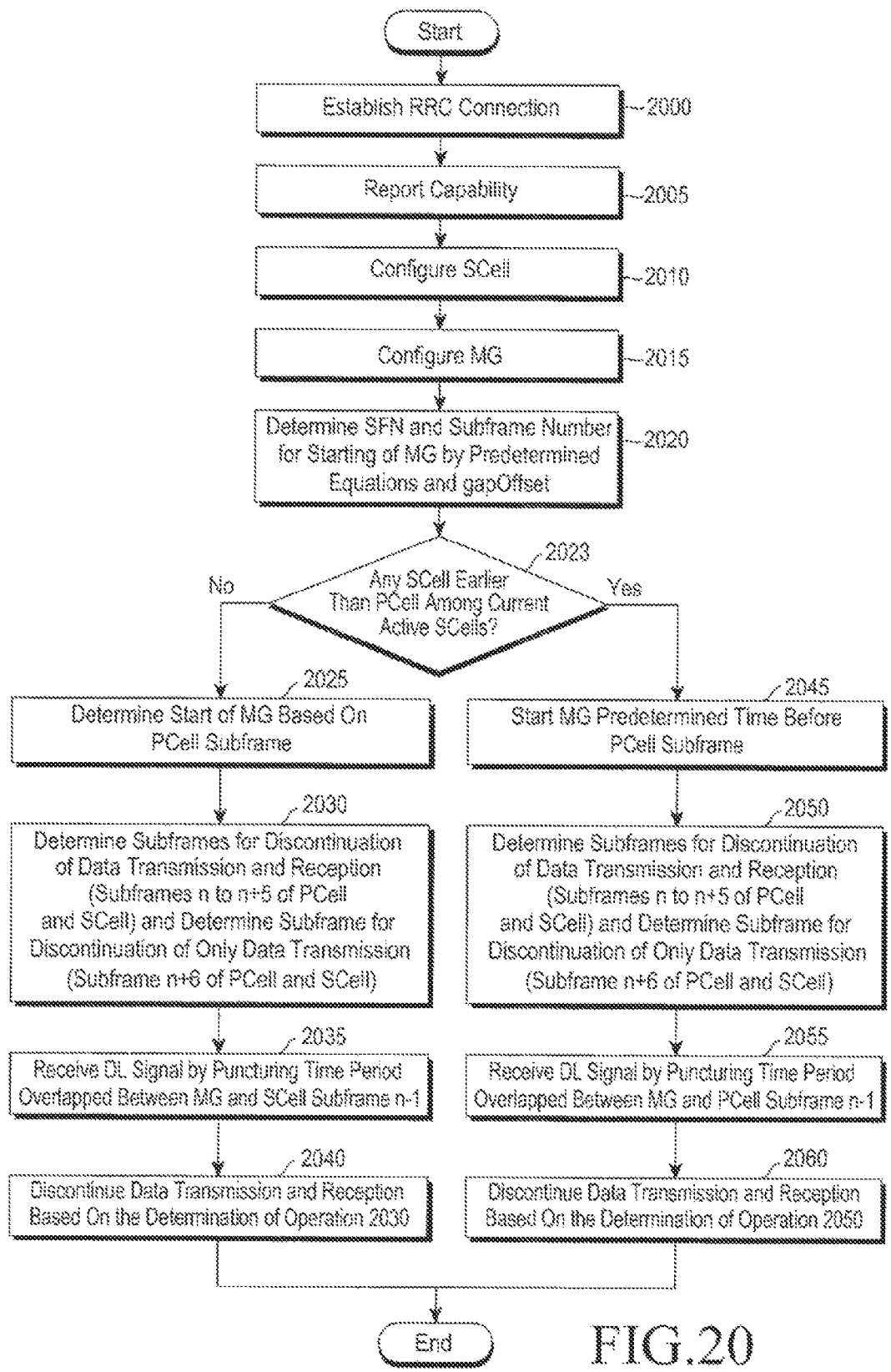
FIG. 20 is a flowchart illustrating an example embodiment of an operation of a UE in regards to a measurement gap according to this disclosure.

FIG. 20 is a flowchart illustrating an example embodiment of an operation of a UE in regards to a measurement gap according to this disclosure. Operations 2000, 2005, 2010, 2015, and 2020 are performed in the same manner as operations 1900, 1905, 1910, 1915, and 1920 illustrated in FIG. 19 and thus will not be described herein.

Referring to FIG. 20, the UE determines whether there is any SCell having a DL reception time earlier than the DL reception time of a PCell among active SCells in operation 2023. In the absence of an SCell having a DL reception time earlier than the DL reception time of the PCell, that is, if the DL reception time of the PCell is earlier than the DL reception times of all active SCells, the UE proceeds to operation 2025. In the presence of at least one SCell having a DL reception time earlier than the DL reception time of the PCell, the UE goes to operation 2045.

If the UE goes to operation 2025, this means that if a measurement gap starts in PCell subframe n, the measurement gap is overlapped with SCell subframe n−1 in the time domain but is not overlapped with SCell subframe n+6 in the time domain. Therefore, the UE determines PCell subframe n to be the starting subframe of the measurement gap in operation 2025 and determines a subframe in which data transmission and reception is to be discontinued and a subframe in which only data transmission is to be discontinued in the same manner as in operation 1930 illustrated in FIG. 19, in operation 2030. That is, the UE determines to discontinue data transmission and reception in subframes n to subframes n+5 of the PCell and an SCell and determines to discontinue data transmission in subframes n+6 of the PCell and the SCell. That is, the UE discontinues data transmission in subframes n+6 of the PCell and the SCell and tunes its receiver to one of the carrier frequencies of the PCell and the SCell. An eNB does not schedule data transmission in the subframes in which the UE discontinues data transmission and reception and does not monitor reception of a DL signal in the subframes.

In operation 2035, the UE receives a DL signal in subframes n−1 of the active SCells. For example, in FIG. 18, the UE discontinues reception in the part 1830 over which the measurement gap is overlapped with subframe n−1 of the SCell in the time domain.

In operation 2040, the UE discontinues DL reception in a specific subframe of a specific serving cell and UL transmission in a specific subframe of a specific serving cell according to the determination made in operation 2030.

If the UE goes from operation 2023 to operation 2045, this means that if the start of the measurement gap is set to PCell subframe n, the measurement gap is not overlapped with SCell subframe n−1 in the time domain but is overlapped with SCell subframe n+6 in the time domain. Therefore, the UE advances the star of the measurement gap from the start of PCell subframe n by a predetermined time period so that a part overlapped with the measurement gap is included in SCell subframe n−1. The predetermined time period corresponds to the difference between the earliest of the DL reception times of the active SCells and the DL reception time of the PCell. Consequently, the start of the measurement gap is determined to be subframe n of an SCell having the earliest DL reception time.

For example, in FIG. 17, the start of the measurement gap advances from the start of subframe n of the PCell by the predetermined time period 1725. With the adjustment of the start of the measurement gap, a part of subframe n−1 of the PCell is overlapped with the measurement gap in the time domain. However, the measurement gap is not overlapped with subframe n+6 of any serving cell in the time domain. After determining the start of the measurement gap, the UE proceeds to operation 2050. Operation 2050 is performed in the same manner as operation 2030.

In operation 2055, the UE performs DL reception in PCell subframe n−1, while the UE discontinues reception in a time-domain part overlapped between PCell subframe n−1 and the measurement gap.

Operation 2060 is performed in the same manner as operation 2040.

In an embodiment of the present disclosure described later, the start of a measurement gap is determined with respect to a serving cell having an earliest DL reception time, instead of a PCell.

Figure 21:
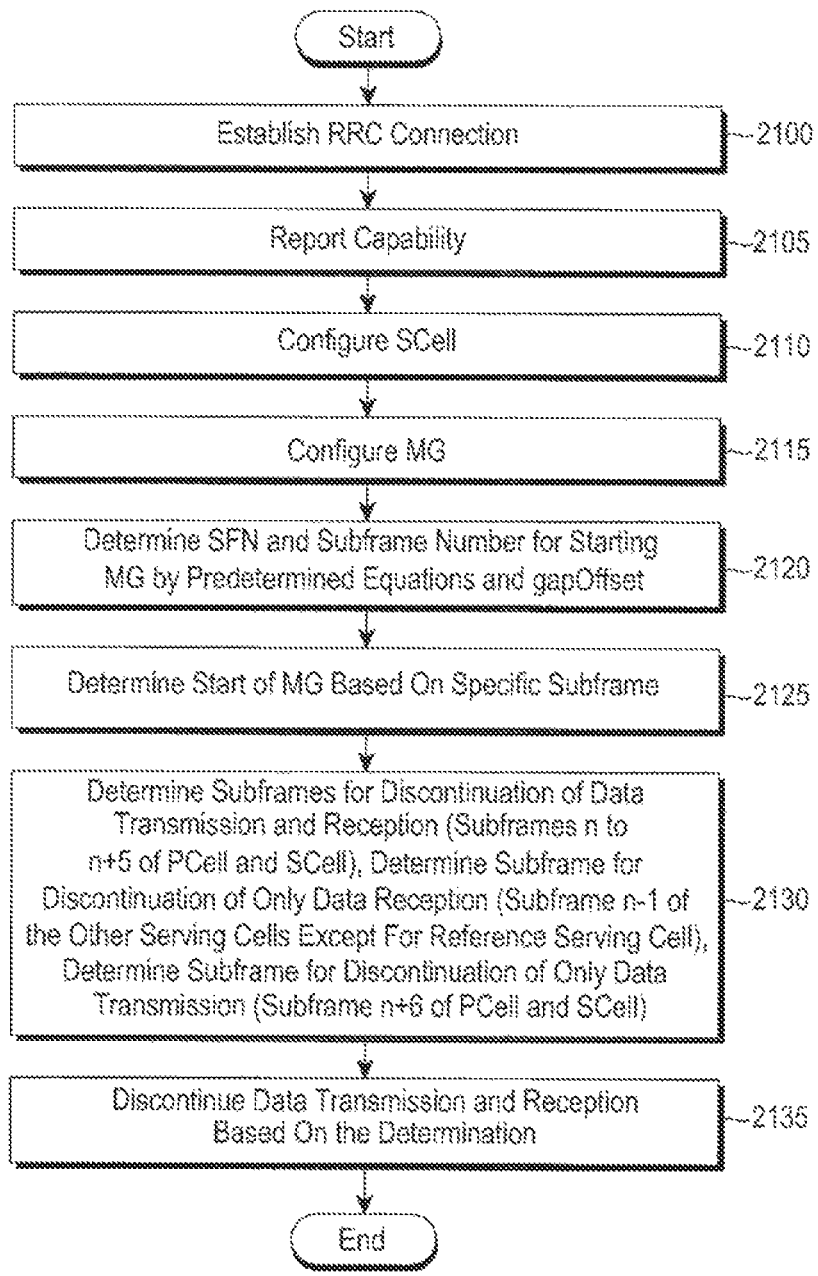
FIG. 21 is a flowchart illustrating an example embodiment of an operation of a UE in regards to a measurement gap according to this disclosure.

FIG. 21 is a flowchart illustrating an example embodiment of an operation of a UE in regards to a measurement gap according to this disclosure. Operations 2100, 2105, 2110, 2115, and 2120 are performed in the same manner as operations 1900, 1905, 1910, 1915, and 1920 and thus will not be described herein.

Referring to FIG. 21, the UE determines the start of a measurement gap by applying an SFN and a subframe number that specify the start of the measurement gap to a reference serving cell in operation 2125. If subframe n is determined by equations (1) and (2), the UE determines the measurement gap to start in subframe n of the reference serving cell. Herein, the reference serving cell is a serving cell having the earliest DL reception time from among current active serving cells. The reference serving cell can be a PCell or an SCell. In the situation of FIG. 17, the reference serving cell is the PCell, while in the situation of FIG. 18, the reference serving cell is the SCell.

In operation 2130, the UE determines in what subframe of what serving cell to discontinue transmission and reception according to the determined measurement gap. The determination is made as follows.

- None of UL transmission and DL reception is performed (or both UL transmission and DL reception are discontinued) in subframes n to subframes n+5 of the PCell and an active SCell.
- DL reception is not performed (or is discontinued) in subframes immediately before the measurement gap, that is, subframes n−1 of the remaining serving cells except for the reference serving cell. In another embodiment of the present disclosure, DL reception is performed in time-domain parts not overlapped between subframes n−1 and the measurement gap and DL reception is not performed only in overlapped parts.
- DL transmission is not performed (or is discontinued) in subframes of the PCell and an active SCell, immediately after the measurement gap, that is, subframes n+6 of the PCell and the active SCell. In other words, if UL transmission is not prohibited otherwise and is scheduled in the other subframes except for subframes n to n+6 of the PCell and the SCell, UL transmission is performed. The reason for not performing UL transmission in subframe n+6 is that UL subframe n+6 is overlapped with DL subframe n+5 on the time axis due to a TA applied in the OFDM communication system.

In operation 2135, the UE discontinues DL reception in a specific subframe of a specific serving cell and UL transmission in a specific subframe of a specific serving cell according to the determination.

The UE and the eNB that operate in the procedures of FIGS. 19 and 20 have the configurations illustrated in FIGS. 11 and 12, respectively.

In an OFDM communication system, an eNB should receive a signal from a UE before the end of a predetermined time period called a CP. To enable UL signals of UEs at different locations to arrive at the eNB before the end of the predetermined time period, the UL transmission times of the UEs should be adjusted. In an LTE system, a UE advances a UL transmission time from a DL reception time by a TA. An eNB can determine a TA for each UE. Accordingly, a measurement gap configured with respect to a DL subframe is not aligned with a UL subframe and a subframe immediately after the measurement gap is always overlapped with the measurement gap in the TA. To guarantee the measurement gap, the UE does not perform UL transmission in a UL subframe immediately after the measurement gap.

Figure 22:
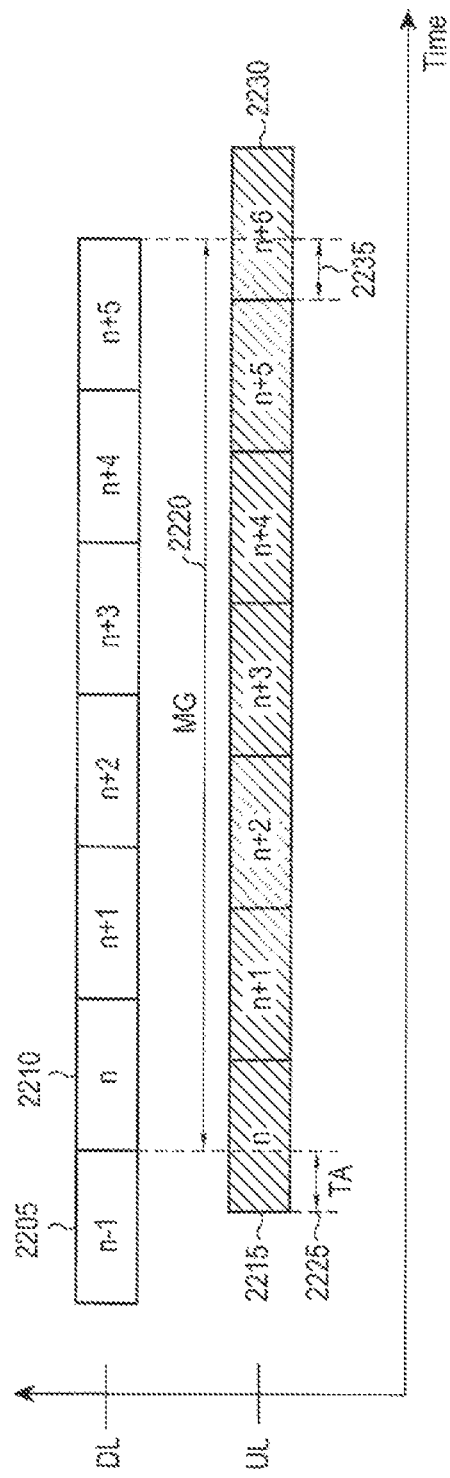
FIG. 22 illustrates an example embodiment of a relationship between a measurement gap and a UL subframe in a Frequency Division Duplexing (FDD) system.

FIG. 22 illustrates an example embodiment of a relationship between a measurement gap and a UL subframe in an FDD system. For the convenience of description, subframe [before] represents a subframe immediately before the measurement gap and subframe [after] represents a subframe immediately after the measurement gap. In FIG. 22, a measurement gap 2220 lasts from subframe n to subframe n+5 and subframe [before] and subframe [after] are subframe n−1 and subframe n+6, respectively.

Referring to FIG. 22, UL subframe n is earlier than DL subframe n by a TA 2225 and thus UL subframe n+6 is overlapped with the measurement gap 2220 by a TA 2235.

In a TDD system, even though subframe [after] is a UL subframe, it is not always overlapped with a measurement gap because a DL and a UL coexist in the same frequency area.

Figure 23:
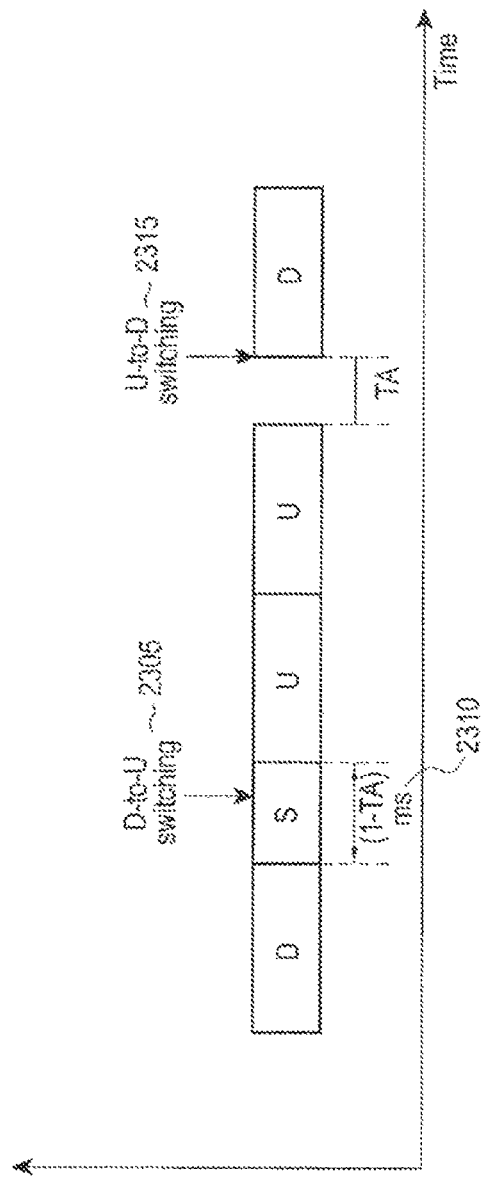
FIG. 23 illustrates an example embodiment of timing adjustment of a UL subframe in a TDD system.

FIG. 23 illustrates an example embodiment of a timing adjustment of a UL subframe in a TDD system.

Referring to FIG. 23, DL-to-UL switching (hereinafter, referred to as D-to-U switching) 2305 occurs during the time period of an S subframe 2310 in the TDD system. The reception time of a U subframe is adjusted in the S subframe 2310 by a TA. Therefore, the length of the S subframe 2310 is not 1 ms but (1−TA) ms. For example, if the TA is 0.05 ms, the S subframe 2310 is 0.995 ms long. When the UL switches to the DL, the subframe timing is delayed by the TA. That is, an empty time period of the TA size occurs during U-to-D switching 2315.

In other words, the subframe timing is advanced by the TA during D-to-U switching and is delayed by the TA during U-to-D switching.

If more D-to-U switchings occur than U-to-D switchings in the measurement gap, the measurement gap includes a part of subframe [after] and the UE does not perform UL transmission in subframe [after]. If the number of D-to-U switchings is equal to the number of U-to-D switchings in the measurement gap, the measurement gap does not include subframe [after] and thus the UE can perform UL transmission in subframe [after].

Since subframes are arranged in a cyclic order of D, S, U, and D, only when subframe [before] is a D subframe, subframe [after] is a U subframe and the number of D-to-U switchings is larger than the number of U-to-D switchings in the measurement gap. Therefore, the UE refers to the type of subframe [before]. If subframe [before] is a D subframe and subframe [after] is a U subframe, the UE does not perform UL transmission in subframe [after]. If subframe [before] is not a D subframe and subframe [after] is a U subframe, the UE performs UL transmission in subframe [after], when needed.

If one serving cell exists or serving cells have the same UL/DL configuration, determination as to whether to perform UL transmission in subframe [after] based on the type of subframe [before] is effective. However, if the serving cells have different UL/DL configurations, a plurality of subframes [before] should be referred to and thus this rule may not be applied.

The UE and the eNB should have the same knowledge of UL transmission or UL non-transmission in subframe [after] to thereby prevent waste of transmission resources or battery consumption of the UE.

Figure 24:
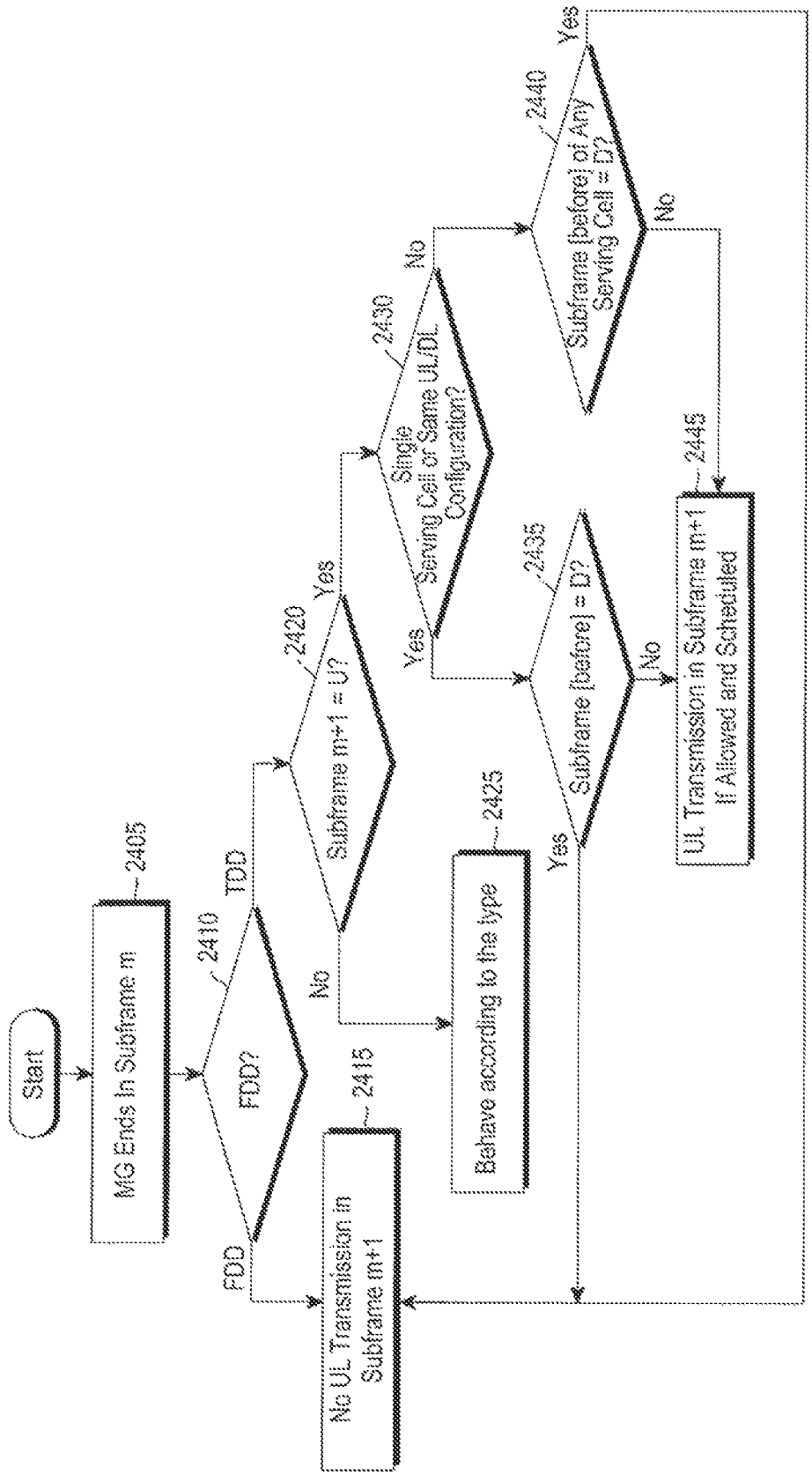
FIG. 24 is a flowchart illustrating an example embodiment of an operation of a UE in regards to setting of a measurement gap according to this disclosure.

FIG. 24 is a flowchart illustrating an example embodiment of an operation of a UE in regards to a measurement gap according to this disclosure. If at least one of a plurality of subframes [before] is a D subframe, a UE does not perform UL transmission in subframe [after] being a U subframe.

Referring to FIG. 24, the UE recognizes that a measurement gap will end in subframe m in operation 2405.

In operation 2410, the UE determines whether a current system is an FDD system or a TDD system. If the current system is an FDD system, the UE goes to operation 2415 and if the current system is a TDD system, the UE goes to operation 2420. In operation 2415, the UE determines that UL transmission is not allowed in U subframe m+1 and thus even though UL transmission is scheduled in U subframe m+1, the UE controls its transmitter to adjust related variables without UL transmission in U subframe m+1. The related variables can include CURRENT_TX_NB, CURRENT_IRV, HARQ_FEEDBACK, and the like.

In operation 2420, the UE determines whether subframe m+1 is a U subframe. If a plurality of serving cells are configured for the UE, the UE determines at least one of subframes m+1 of the serving cells is a U subframe. If at least one of subframes m+1 of the serving cells is a U subframe, the UE goes to operation 2430 and if none of subframes m+1 of the serving cells are U subframes, the UE goes to operation 2425. In operation 2425, the UE performs an appropriate operation according to the type of subframe m+1. That is, if subframe m+1 is a D subframe, the UE performs a DL operation such as PDCCH reception. If subframe m+1 is an S subframe, the UE performs an operation corresponding to the S subframe.

In operation 2430, the UE determines whether only one serving cell has been configured (or only one serving cell is active), or a plurality of serving cells have been configured and active serving cells have the same UL/DL configuration. If only one serving cell has been configured or all serving cells have the same UL/DL configuration, the UE determines whether subframe [before] is a D subframe in 2435. If subframe [before] is a D subframe, the UE goes to operation 2415 and if subframe [before] is not a D subframe, the UE goes to operation 2445. On the other hand, if a plurality of serving cells have been configured and have different UL/DL configurations, the UE goes to operation 2440.

In operation 2440, the UE determines whether at least one of subframes [before] of the configured serving cells (or the active service cells) is a D subframe. If at least one of subframes [before] of the configured serving cells (or the active service cells) is a D subframe, the UE does not perform UL transmission in a U subframe from among subframes m+1 in operation 2415. Herein, the UE performs a normal operation in subframes m+1 that are not U subframes. In operation 2445, the UE performs UL transmission in a U subframe from among subframes m+1 if the U subframe is scheduled for UL transmission and the UL transmission is not prohibited otherwise. As in operation 2415, the UE performs a normal operation in subframes m+1 which are not U subframes.

Even though subframe [after] is a U subframe, an HD UE is not allowed to perform UL transmission if subframe [after] of the PCell is not a U subframe.

Figure 25:
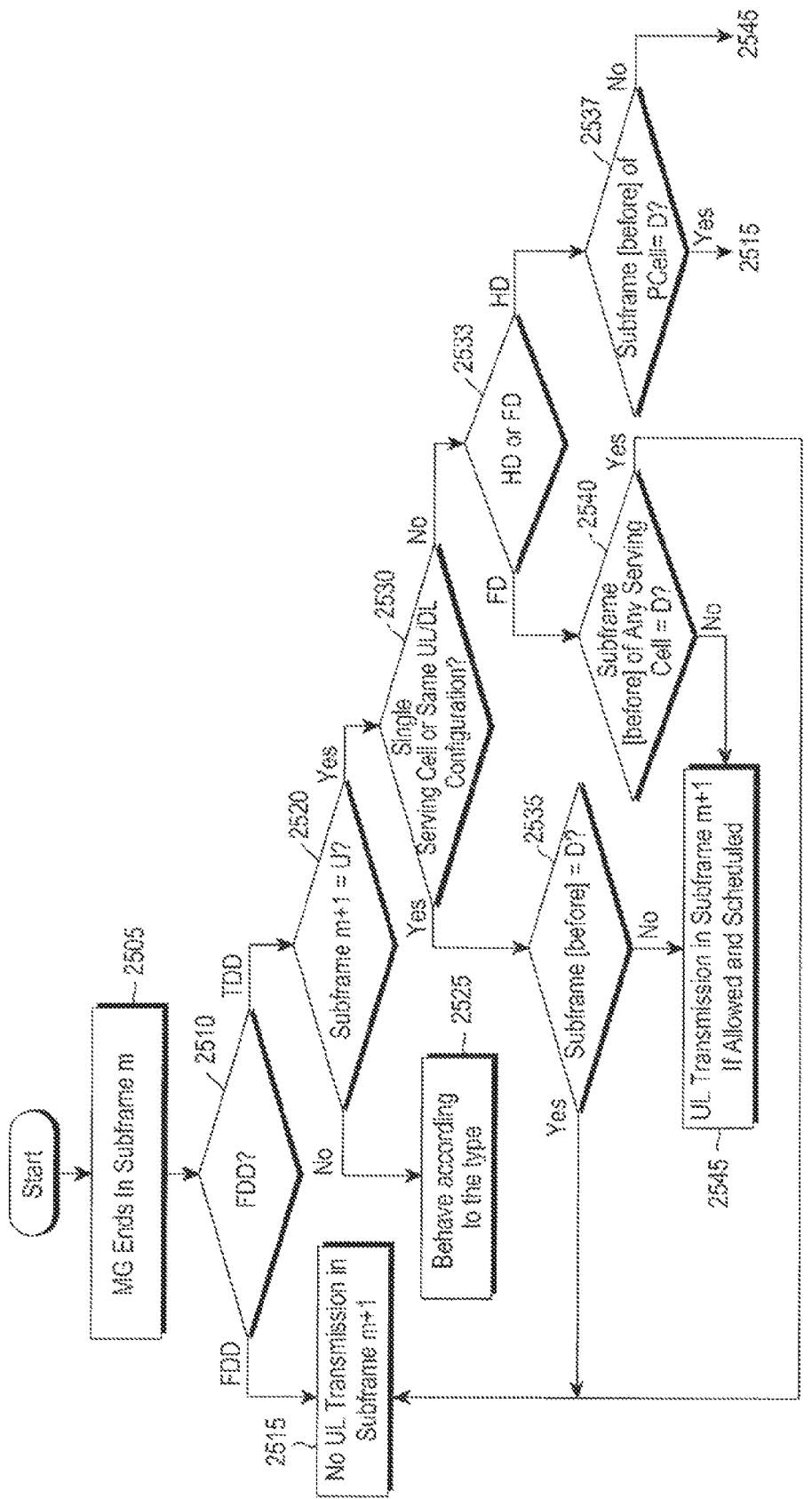
FIG. 25 is a flowchart illustrating an example embodiment of an operation of a UE in regards to a measurement gap according to this disclosure.

FIG. 25 is a flowchart illustrating an example embodiment of an operation of a UE in regards to a measurement gap according to this disclosure. Operations 2505, 2510, 2515, 2520, and 2525 are performed in the same manner as operations 2405, 2410, 2415, 2420, and 2425 illustrated in FIG. 24 and will not be described herein.

Referring to FIG. 25, in operation 2530, the UE determines whether only one serving cell has been configured (or only one serving cell is active), or a plurality of serving cells have been configured and active serving cells have the same UL/DL configuration. If only one serving cell has been configured or all serving cells have the same UL/DL configuration, the UE performs the same operation as operation 2435 of FIG. 24, in operation 2535. If a plurality of serving cells have been configured and have different UL/DL configurations, the UE goes to operation 2533.

In operation 2533, the UE determines whether simultaneous transmission and reception is available in a current band combination (such as whether the UE can operate in FD). Or the UE determines whether information indicating support of simultaneous transmission and reception in the current band combination has been transmitted to an eNB. If the UE can operate in FD, the UE performs the same operation as operation 2440 of FIG. 24 in operation 2540. If the UE does not operate in FD, that is, the UE operates in HD, the UE proceeds to operation 2537.

In operation 2537, the UE determines whether subframe [before] of a PCell is a D subframe. If PCell subframe [before] is a D subframe, the UE does not perform UL transmission in a U subframe from among subframes m+1 in operation 2515. Herein, the UE performs a normal operation in subframes m+1 that are not U subframes. If PCell subframe [before] is not a D subframe, the UE performs UL transmission in a U subframe from among subframes m+1 if the U subframe is scheduled for UL transmission and the UL transmission is not prohibited otherwise, in operation 2545. As in operation 2515, the UE performs a normal operation in subframes m+1 which are not U subframes.

Figure 26:
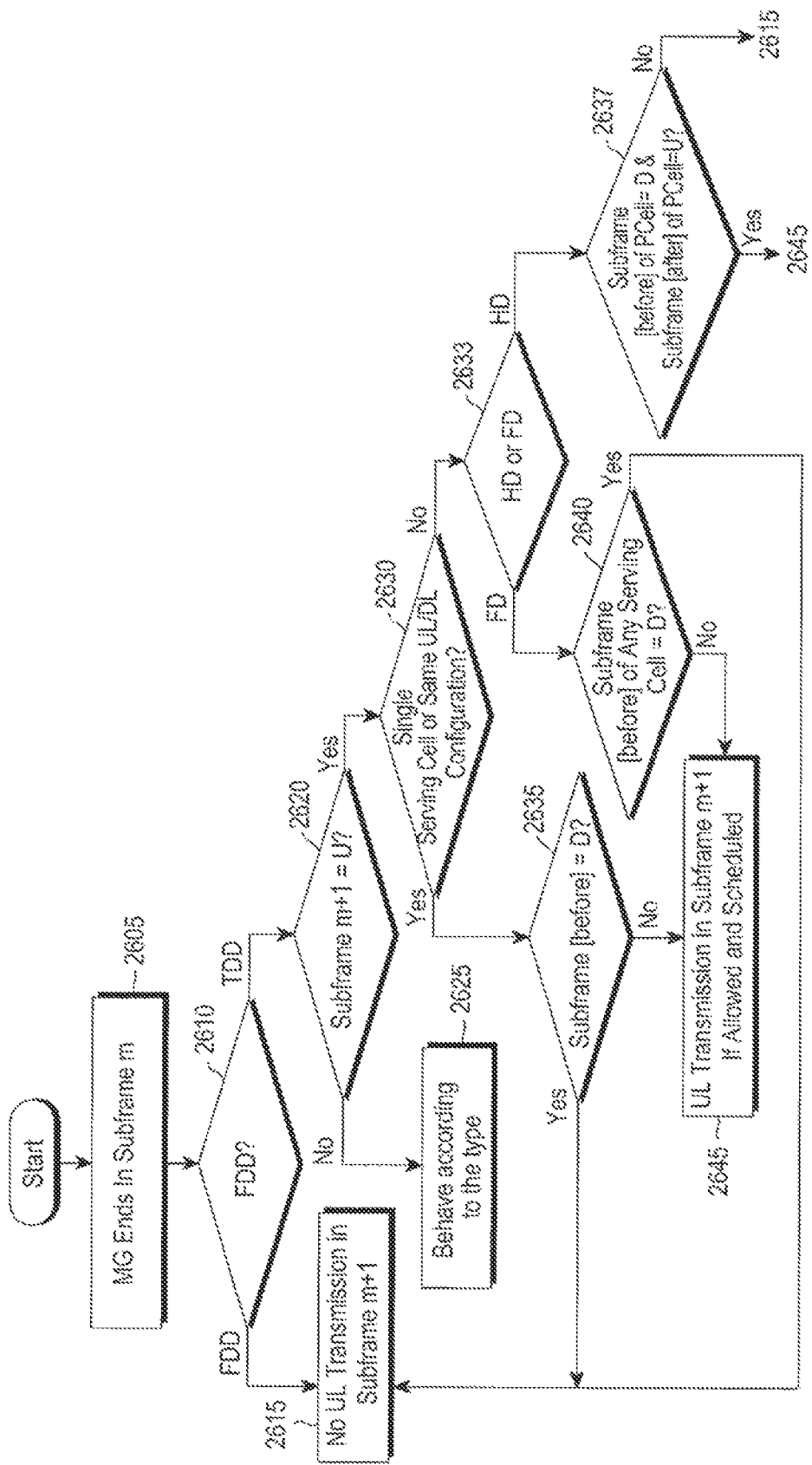
FIG. 26 is a flowchart illustrating an example embodiment of an operation of a UE in regards to a measurement gap according to this disclosure.

FIG. 26 is a flowchart illustrating an example embodiment of an operation of a UE in regards to a measurement gap according to this disclosure. FIG. 26 illustrates another operation of an HD UE. Operations 2605, 2610, 2615, 2620, 2625, 2630, 2635, 2633, 2640, and 2645 are performed in the same manner as operations 2505, 2510, 2515, 2520, 2525, 2530, 2535, 2533, 2540, and 2545 of FIG. 25 and thus will not be described herein.

Referring to FIG. 26, the UE determines whether subframe [before] of a PCell is not a D subframe and subframe [after] of the PCell is a U subframe in operation 2637. If the two conditions are satisfied, the UE can perform UL transmission in subframe [after] of another serving cell and thus the UE proceeds to operation 2645. If at least one of the two conditions is not satisfied, the UE does not perform UL transmission in subframes m+1 of all serving cells in operation 2615. In operation 2645, the UE performs UL transmission in subframe m+1 which is a U subframe from among subframes m+1 of the PCell and SCells, if the UL transmission is scheduled in the subframe and is not prohibited otherwise.

To apply different UL/DL configurations to serving cells, the serving cells should have different frequency bands, as described before. In view of the structure of a UE, the UE should use different RF circuits for different frequency bands. In this case, it is possible to control an operation in subframe [after] on a serving cell basis. That is, only subframe [before] of serving cell x is considered in determining an operation in subframe [after] of serving cell x. In this case, while a measurement gap applies to a different time period in each serving cell, 6 ms can be ensured for the measurement gap.

Figure 27:
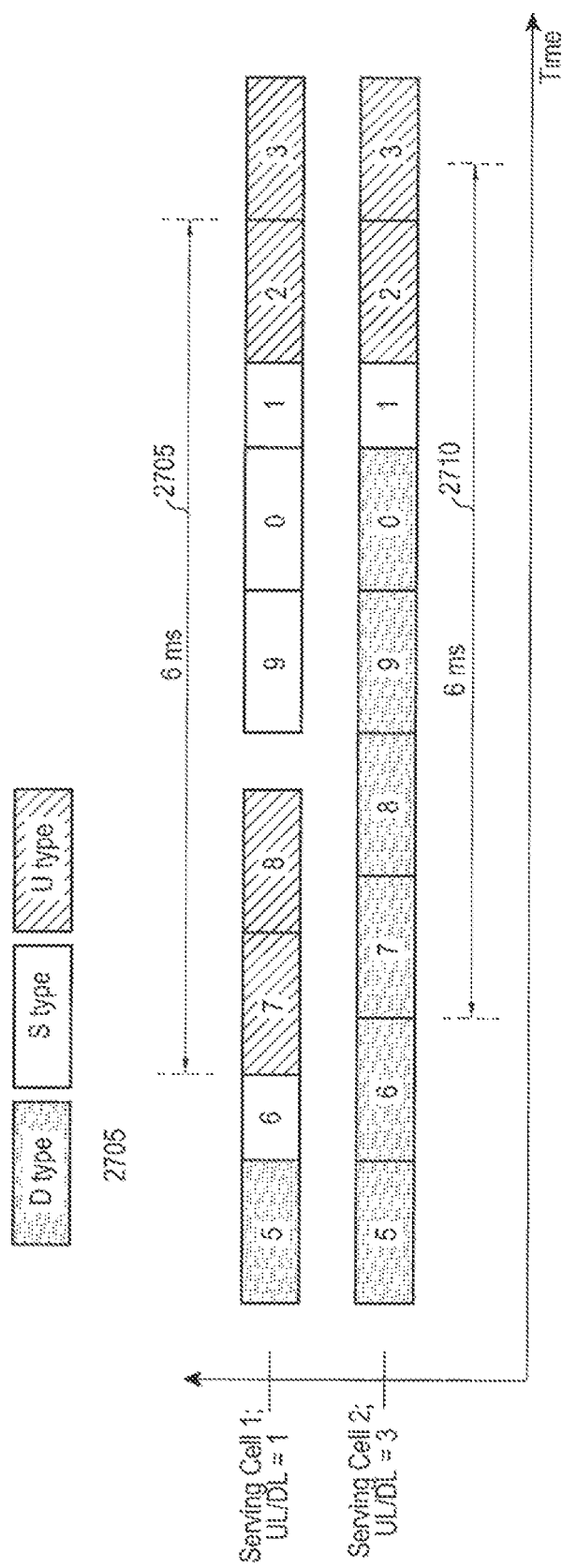
FIG. 27 illustrates an example embodiment of serving cells having different UL/DL configurations.

FIG. 27 illustrates an example embodiment of serving cells having different UL/DL configurations.

Referring to FIG. 27, UL/DL configuration 1 and UL configuration 3 of TABLE 1 are assigned to serving cell 1 and serving cell 2, respectively and a measurement gap lasts from subframe 7 to subframe 2. A UE uses different RF front ends for serving cell 1 and serving cell 2. Let the RF front end applied to serving cell 1 be denoted by RF1 and the RF front end applied to serving cell 2 be denoted by RF2. Then the UE measures one or more non-serving frequencies using one of the RF ends RF1 and RF2. If the UE measures the non-serving frequencies using the RF end RF1, since subframe [before] of serving cell 1 is not a D subframe, a 6-ms period 2705 is given to the RF end RF1 despite UL transmission in subframe [after] being subframe 3. If the UE measures the non-serving frequencies using the RF end RF2, a 6-ms period 2710 is not ensured due to UL transmission in subframe U because subframe [before] is a D subframe and subframe [after] is a U subframe. Therefore, the UE does not perform UL transmission. Therefore, even though an eNB does not have knowledge of an RF end used for measurement at the UE, the eNB can determine clearly whether subframe [after] is available at least at a serving cell level.

Figure 28:
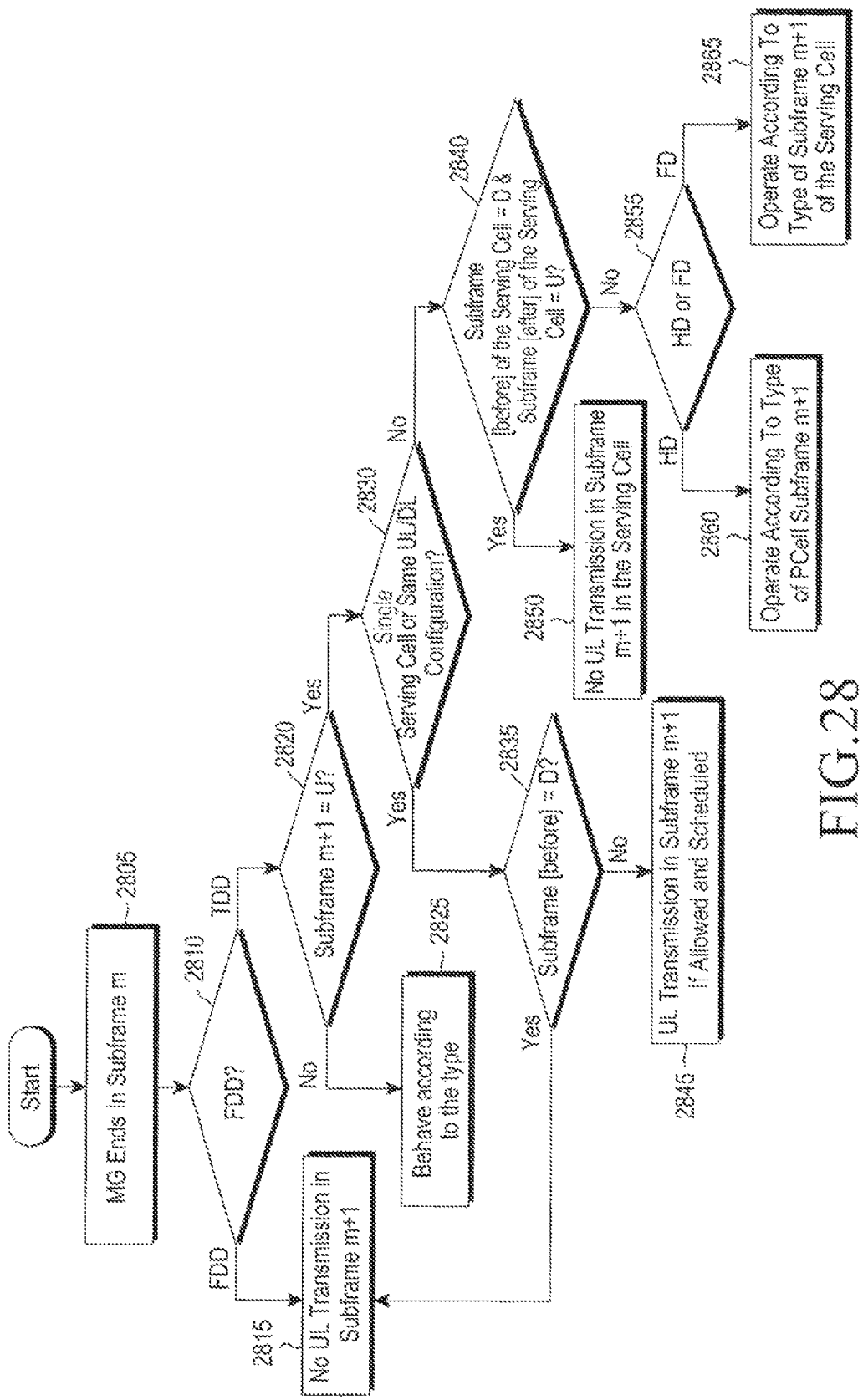
FIG. 28 is a flowchart illustrating an example embodiment of an operation of a UE in regards to setting of a measurement gap according to this disclosure.

FIG. 28 is a flowchart illustrating an example embodiment of an operation of a UE in regards to a measurement gap according to this disclosure. Operations 2805, 2810, 2815, 2820, 2825, 2830, 2835, and 2845 are performed in the same manner as operations 2405, 2410, 2415, 2420, 2425, 2430, 2435, and 2445 illustrated in FIG. 24.

Referring to FIG. 28, if the UE proceeds to operation 2840, this implies that a plurality of serving cells have been configured for the UE, the serving cells have different UL/DL configurations, and at least one subframe m+1 of the serving cells is a U subframe. The UE checks subframes [before] and subframes [after] of active serving cells among the configured serving cells. For a serving cell having a D subframe as subframe [before] and a U subframe as subframe [after], the UE goes to operation 2850 and for the other cells, the UE goes to operation 2855. If the UE goes to operation 2850, this means that if the UE performs UL transmission in subframe [m+1] of the corresponding serving cell, a 6-ms period can not be guaranteed. Even though UL transmission is scheduled in subframe m+1 of the serving cell, the UE just adjusts related variables without performing the UL transmission.

In operation 2855, the UE determines whether the UE operates in FD or HD in a current configuration or a current band combination. If the UE operates in HD, the UE goes to operation 2860 and if the UE operates in FD, the UE goes to operation 2865.

In operation 2860, the UE determines an operation to perform in subframe [after] of an SCell based on the type of a PCell subframe overlapped with subframe [after] of the SCell (such as the type of subframe [after] of the PCell, the type of subframe [after] and subframe [after+1] of the PCell, or the type of subframe [after−1] of the PCell).

In operation 2865, the UE performs an operation to perform in subframe [after] of the SCell based on the type of subframe [after] of the SCell.

In the example of FIG. 27, subframe [before] of a serving cell that is a reference for the start of a measurement gap affects an operation in subframe [after] of the serving cell. For example, if the measurement gap starts in subframe 7 of serving cell 1, UL transmission is possible in subframe [after] of serving cell 2 having a D subframe as subframe [before] as well as in subframe [after] of serving cell 1 because subframe [before] of serving cell 1 is not a D subframe. If the measurement gap starts in subframe 7 of serving cell 2, UL transmission is not allowed in subframe [after] of serving cell 1 having subframe [before] which is not a D subframe as well as in subframe [after] of serving cell 2 because subframe [before] of serving cell 2 is a D subframe.

Therefore, if the eNB and the UE have knowledge of a serving cell having a subframe boundary or a subframe in which the measurement gap start, an operation to perform in subframe [after] of every serving cell can be determined based on subframe [before] of the serving cell.

Figure 29:
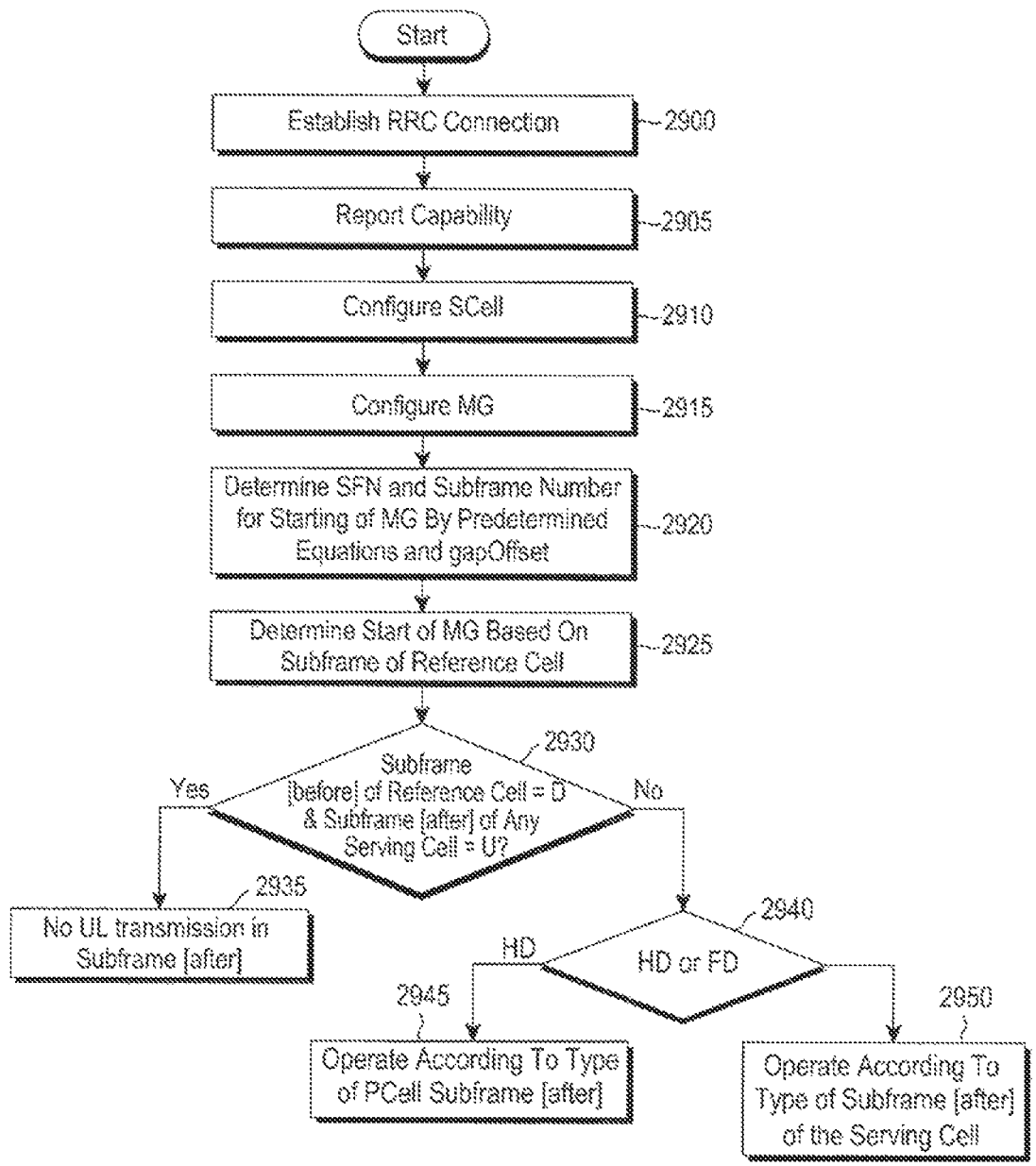
FIG. 29 is a flowchart illustrating an example embodiment of an operation of a UE in regards to a measurement gap according to this disclosure.

FIG. 29 is a flowchart illustrating an example embodiment of an operation of a UE in regards to a measurement gap according to this disclosure. Operations 2900, 2905, 2910, 2915, and 2920 are performed in the same manner as operations 1900, 1905, 1910, 1915, and 1920 illustrated in FIG. 19.

Referring to FIG. 29, a measurement gap starts at the start of a subframe indicated by an SFN and a subframe number that specify the start of the measurement gap from among subframes of a predetermined reference cell in operation 2925. In an embodiment of the present disclosure, the reference cell can be a PCell. In another embodiment of the present disclosure, the reference cell can be a serving cell having the earliest DL reception time among current active serving cells. In another embodiment of the present disclosure, the reference cell can be a serving cell having subframe [before] that is not a D subframe. In another embodiment of the present disclosure, the reference cell can be a serving cell having the last UL reception time among current active serving cells.

In operation 2930, the UE determines whether subframe [before] of the reference cell, for example, the PCell is a D subframe and at least one of current active serving cells including the reference cell has subframe [after] being a U subframe. If the two conditions are satisfied, the UE goes to operation 2935 and if at least one of the conditions is not satisfied, the UE goes to operation 2940.

In operation 2935, the UE does not perform UL transmission in subframe [after] being a U subframe from among subframes [after] of the serving cells. In subframes [after] of the serving cells which are not U subframes, the UE performs a normal operation. For example, if the UE operates in HD, the UE performs an operation in subframe [after] of an SCell based on the types of subframe [after] and its adjacent subframe of the PCell. If the UE operates in FD, the UE performs an operation in subframe [after] of a serving cell based on the type of subframe [after] of the serving cell.

In operation 2940, the UE determines whether it operates in FD or HD in a current configuration or a current band combination. If the UE operates in HD, the UE goes to operation 2945 and if the UE operates in FD, the UE goes to operation 2950. In operation 2945, the UE determines an operation to perform in subframe [after] of an SCell based on the type of a PCell subframe overlapped with subframe [after] of the SCell (such as the type of subframe [after] of the PCell, the types of subframes [after] and [after+1] of the PCell, or the type of subframe [after−1] of the PCell). In operation 2950, the UE determines an operation to perform in subframe [after] of the SCell based on the type of subframe [after] of the SCell.

The UE and the eNB that operate according to the procedures of FIGS. 28 and 29 have the configurations illustrated in FIGS. 11 and 12, respectively.

An embodiment of the present disclosure described below provides a method and apparatus for starting a measurement gap based on a serving cell having the last of the DL reception times of current active serving cells and performing no UL transmission in subframe [after] that is a U subframe. This is because the type of a subframe of a serving cell that provides a reference for the start of the measurement gap affects an operation in subframe [after]. The influence on subframe [before] is minimized by setting the subframe boundary of a hindmost serving cell as the reference for the start of the measurement gap.

Figure 30:
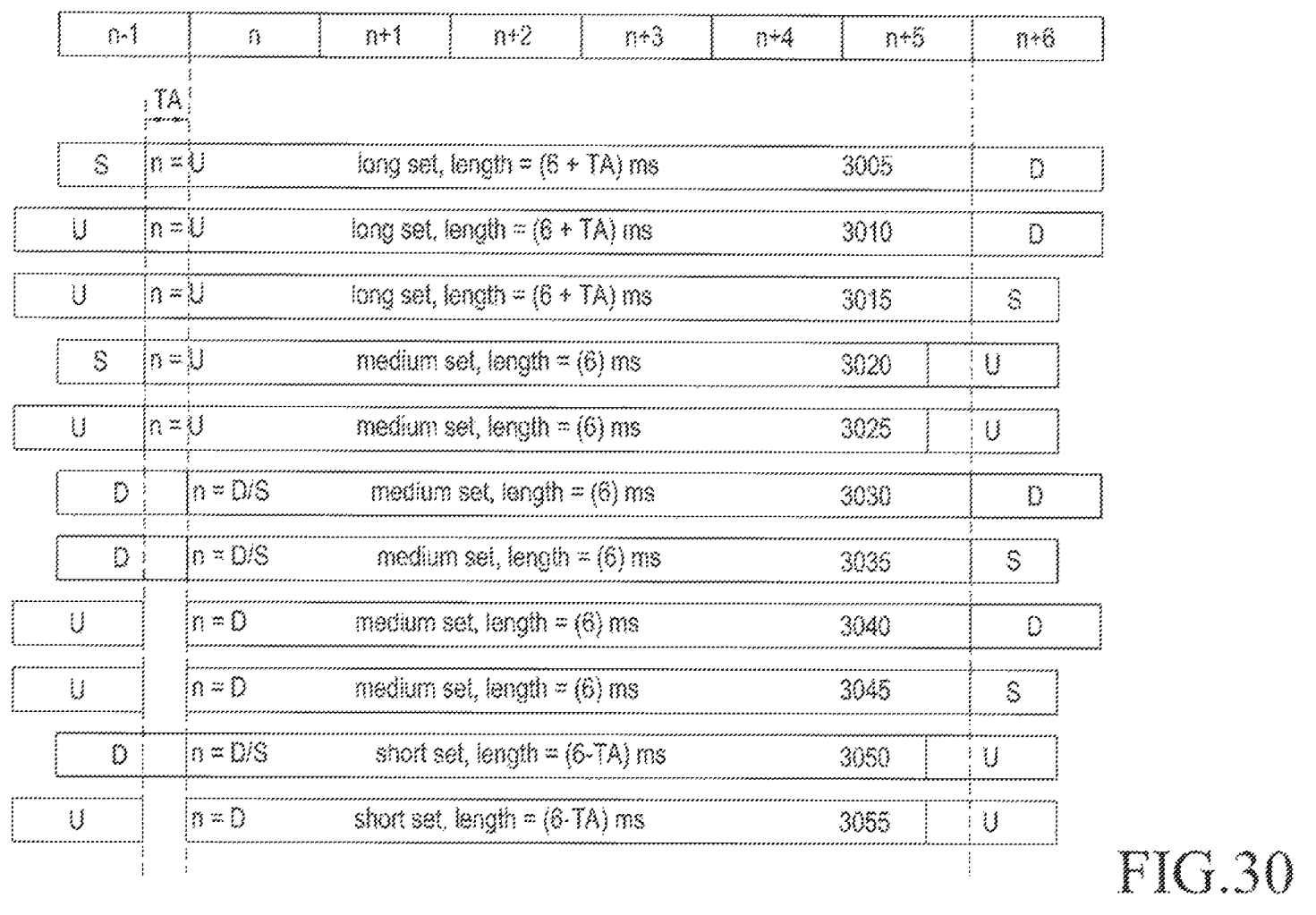

FIG. 30 illustrates an example embodiment of subframe sets according to an embodiment of the present disclosure. In FIG. 30, the starts and lengths of subframe sets are illustrated according to the types of subframes [before] and [after] of the subframe sets. A subframe set refers to a plurality of consecutive subframes. For the convenience of description, the subframe set includes subframes n, n+1, n+2, n+3, n+4, and n+5.

Referring to FIG. 30, when a measurement gap starts at the start of a 6-ms subframe set (referred to as a medium set), the measurement gap does not affect subframe [after] of the same serving cell. When the measurement gap starts at the start of a subframe set shorter than 6 ms (referred to as a short set), a part of subframe [after] of the same serving cell is overlapped with the measurement gap and thus a UE is not allowed to perform transmission and reception in subframe [after]. When the measurement gap starts at the start of a subframe set longer than 6 ms (referred to as a long set), the measurement gap does not affect subframe [after] of the same serving cell.

Nine combinations of subframes [before] and [after] can be produced according to the types of subframes [before] and [after], as follows.

TABLE 7

| Subframe [before] | Subframe [after] | Subframe [before] | Subframe [after] |
|---|---|---|---|
| D | D | U | S |
| D | U | S | D |
| D | S | S | U |
| U | D | S | S |
| U | U | | |

It is not necessary to consider a case where both subframes [before] and [after] are S subframes because the case does not exist from the perspective of UL/DL configurations. If subframe [before] is a U subframe, the next subframe, subframe n is a U subframe or a D subframe. If subframe n is a D subframe, as long a switching gap as a TA is interposed between subframe [before] and subframe n. If subframe n is a U subframe, no switching gap is interposed between subframe [before] and subframe n. Therefore, if subframe [before] is a U subframe, it should be determined whether subframe n is a D subframe or a U subframe. Eventually, the following 11 cases can exist.

TABLE 8

| Subframe [before] | Subframe [n] | Subframe [after] | SET TYPE | Index in FIG. 30 |
|---|---|---|---|---|
| D | | D | medium set | 3030 |
| D | | S | medium set | 3035 |
| D | | U | short set | 3050 |
| U | U | D | long set | 3010 |
| U | D | D | medium set | 3040 |
| U | U | S | long set | 3015 |
| U | D | S | medium set | 3045 |
| U | U | U | medium set | 3025 |
| U | D | U | short set | 3055 |
| S | | D | long set | 3005 |
| S | | U | medium set | 3020 |

As noted from FIG. 30, the starting points of subframe sets 3005, 3010, 3015, 3020, 3025 each having a U subframe as subframe n are earlier than a reference DL reception time by a TA.

If serving cells having different UL/DL configurations are active and a measurement gap starts in subframe n of a serving cell, the following two problems can occur. For the convenience of description, a serving cell that provides a reference for the start of a measurement gap is referred to as cell CELL-START and the other serving cells are referred to as cell CELLOTHER.

1. Overlap between a measurement gap and subframe n−1 of cell CELLOTHER. If the subframe set 3025 is cell CELL-START and the subframe set 3030 is cell CELLOTHER, subframe n−1 of cell CELLOTHER is always a D subframe and the UE does not receive data successfully in the D subframe. Thus, if this situation occurs, the eNB should not transmit a PDSCH or an Enhanced PDCCH (EPDCCH) in subframe n–1 to the UE and the UE receives a PHICH in subframe n–1, not a PDSCH, an EPDCCH, and a Physical Multicast Channel (PMCH). The eNB can transmit a PDCCH to the UE in a PDSCH region and this PDCCH is called an EPDCCH. When severe interference in a PDCCH region is expected, the EPDCCH can be used and the eNB signals a subframe carrying the EPDCCH to the UE in advance. The PMCH carries a Multimedia Broadcast/Multicast Service (MBMS) signal. The PDSCH, the PMCH, and the EPDCCH are characterized by transmission across an entire subframe in the time domain and the PHICH is transmitted only in a starting part of the subframe.

2. Overlap between a measurement gap and subframe n+6 of cell CELLOTHER. If the subframe set 3045 is cell CELLSTART and the subframe set 3055 is cell CELLOTHER, subframe n+6 is always a U subframe. If the UE performs UL transmission in subframe n+6, 6 ms is not ensured for the measurement gap.

In another embodiment of the present disclosure, the UE operates as follows. The UE does not transmit a UL signal in subframe [after] of a short set in cell CELLSTART. The UE does not receive a DL signal in subframe [before] and does not transmit a UL signal in subframe [after] in cell CELLOTHER. That is, the operation of the UE is summarized as follows.

The UE determines a reference serving cell according to a preset rule and starts a measurement gap in the reference serving cell.

If cell CELLSTART satisfies the following conditions, the UE does not perform UL transmission in subframe [after]:

Subframe [before] is a D subframe (corresponding to 3050) or

Subframe [before] is a U subframe and subframe n is a D subframe (corresponding to 3055).

If subframe [before] of cell CELLOTHER is a D subframe, the UE does not receive a PDSCH/EPDCCH/PMCH.

If subframe [after] of cell CELLOTHER is a U subframe, the UE does not transmit a UL signal.

Figure 31:
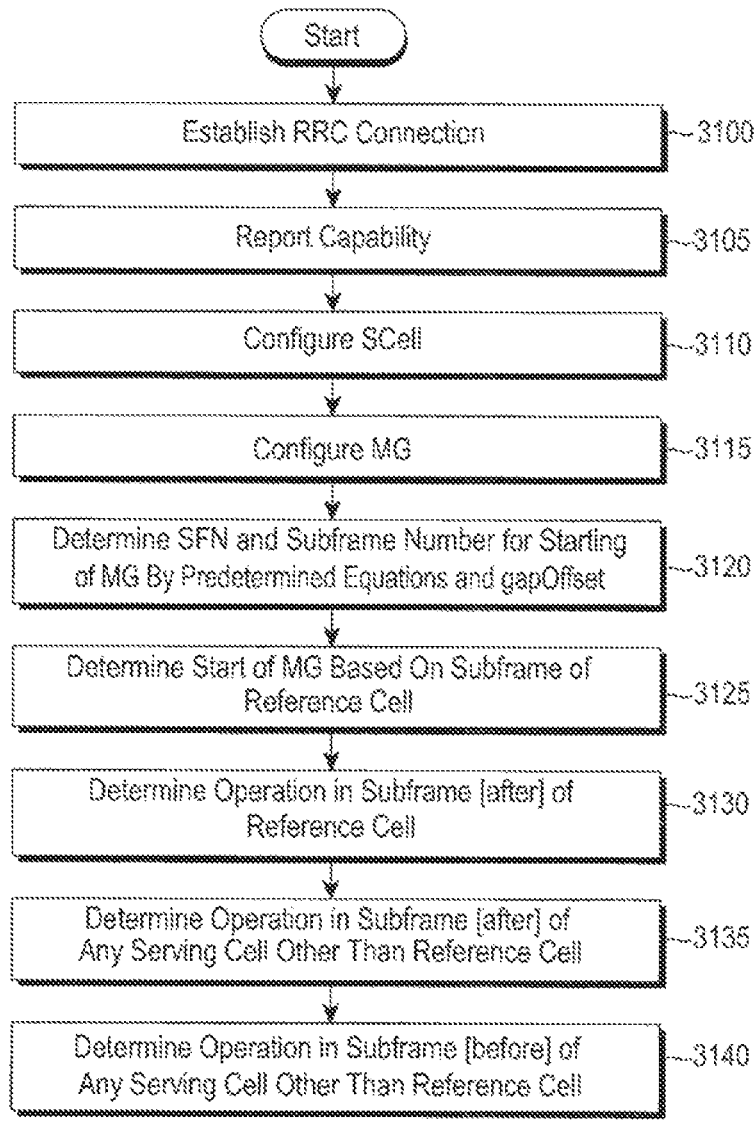
FIG. 31 is a flowchart illustrating an example embodiment of an operation of a UE in regards to a measurement gap according to this disclosure.

FIG. 31 is a flowchart illustrating an example embodiment of an operation of a UE in regards to a measurement gap according to this disclosure. Operations 3100, 3105, 3110, 3115, 3120, and 3125 are performed in the same manner as operations 2900, 2905, 2910, 2915, 2920, and 2925 illustrated in FIG. 29 and thus will not be described herein.

Referring to FIG. 31, the UE determines an operation to perform in subframe [after] of a reference cell in operation 3130. If subframe [before] and subframe [after] of the reference cell are a D subframe and a U subframe, respectively, the UE does not perform UL transmission in subframe [after] of the reference cell.

If subframe [before] of the reference cell is a U subframe, a subframe in which a measurement gap starts, that is, subframe n is a D subframe, and subframe [after] is a U subframe, the UE does not perform UL transmission in subframe [after] of the reference cell.

If the condition is not satisfied, the UE determines an operation to perform in subframe [after] of the reference cell based on the type of subframe [after] of the reference cell.

In operation 3135, the UE determines an operation to perform in subframe [after] of a serving cell other than the reference cell.

If subframe [after] of the cell other than the reference cell is a U subframe, the UE does not perform UL transmission in subframe [after] of the serving cell. If subframe [after] of the serving cell is a D subframe or an S subframe, the UE performs a D-subframe operation or an S-subframe operation in subframe [after] of the serving cell.

In operation 3140, the UE determines an operation to perform in subframe [before] of the serving cell other than the reference cell. If subframe [before] of the serving cell other than the reference cell is a D subframe, the UE receives a PHICH without a PDSCH, a PMCH, and an EPDCCH in subframe [before] of the serving cell. If subframe [before] of the serving cell is an S subframe or a U subframe, the UE performs a normal operation in subframe [before] of the serving cell. Even though subframe [before] of the reference cell is a D subframe, the UE performs a normal operation.

The UE performs appropriate operations in subframes [before] and [after] of serving cells as determined by the UE.

The afore-described first problem, that is, overlap between a measurement gap and subframe [before] of a serving cell other than a reference cell does not occur when the measurement gap starts in a serving cell having a last subframe starting time. For example, if a measurement gap starts in the serving cell 3030, 3035, 3040, 3045, 3050, or 3055, the measurement gap does not overlap with subframe n–1 of a serving cell other than the reference cell.

Figure 32:
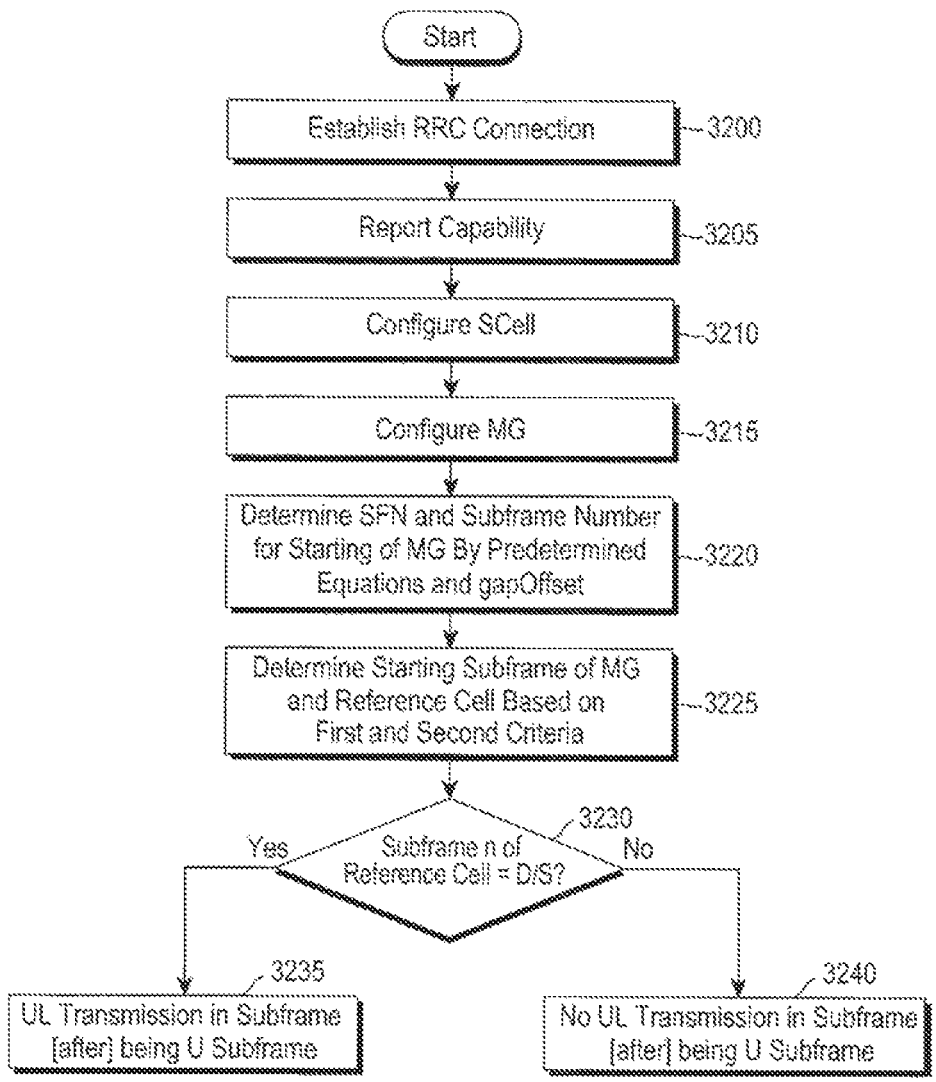
FIG. 32 is a flowchart illustrating an example embodiment of an operation of a UE in regards to a measurement gap according to this disclosure.

FIG. 32 is a flowchart illustrating an example embodiment of an operation of a UE in regards to a measurement gap according to this disclosure. Operations 3200, 3205, 3210, 3215, and 3220 are performed in the same manner as operations 2900, 2905, 2910, 2915, and 2920 illustrated in FIG. 29 and thus will not be described herein.

Referring to FIG. 32, the UE determines subframe n in which a measurement gap will start from among subframes n of a plurality of serving cells. The determination is made based on first and second criterions. The first criterion is the type of subframe n and the second criterion is a DL reception time.

If the types of subframes n of serving cell x and serving cell y are not similar, advance/delay of the starting points of subframes n of serving cell x and serving cell y is determined based on the types of the subframes. On the other hand, if the types of subframes n of serving cell x and serving cell y are similar, advance/delay of the starting points of subframes n of serving cell x and serving cell y is determined based on DL reception times of cell x and cell y. More specifically, if a D subframe or an S subframe coexists with a U subframe, the start of the U subframe precedes the start of the D subframe or the S subframe. If only U subframes or if only D or S subframes exist, advance/delay between the U subframes and advance/delay between the D/S subframes are determined according to the difference between DL reception times, that is, the difference between propagation delays. The starting points of subframes having different types are spaced from each other by a TA and the TA is longer than a propagation delay. Accordingly, whether to advance/delay between subframes of two serving cells is first determined according to the types of the subframes. If the subframes have similar types, advance/delay between the subframes of two serving cells is determined according to the difference between propagation delays.

The UE determines subframe n in which a measurement gap will start from among subframes n of a plurality of serving cells, according to the types of subframes n of the serving cells. If a U subframe coexists with a D subframe or an S subframe, the UE determines to start the measurement gap in the D subframe or the S subframe. If a plurality of subframes n satisfy this condition, the UE finally selects one of the plurality of subframes n based on the second criterion, that is, DL reception times. The second criterion can be the last or earliest DL reception time. If the second criterion is set as the last DL reception time, consistency is maintained between the first and second criteria and thus subframe n of a serving cell having the last subframe starting time is selected. In this case, no problem occurs if the types of subframes n are different. However, if the types of subframes n are similar, the measurement gap is overlapped with a starting part of subframe n+6 of a serving cell other than the reference cell. The overlapped part is as long as a propagation delay difference. Therefore, the UE may not perform transmission or reception. On the other hand, in the case where the second criterion is set as the earliest DL reception time, if the types of subframes n are similar, the measurement gap is overlapped with a last part of subframe n−1 of a serving cell other than the reference cell. The overlapped last part is as long as the propagation delay difference. Therefore, the UE may not perform transmission or reception. From the perspective of reception, it is better to lose a last part of a subframe than to lose a starting part of the subframe. Accordingly, it may be preferred to use the earliest DL reception time as the second criterion.

After determining subframe n in which the measurement gap will start and a reference cell by the first and second criteria, the UE determines an operation to perform in subframe [after] in operation 3230.

In operation 3230, the UE determines whether subframe n of the reference cell or the first subframe in which the measurement gap starts is a D subframe or a S subframe. In other words, the UE determines whether a subframe coinciding with the start of the measurement gap is a D subframe or an S subframe, whether subframe n of the reference cell is a U subframe, or whether subframe n−1 of the reference cell is a D subframe or a U subframe. If the condition is not satisfied, that is, if subframe n is a U subframe, this means that the start of the measurement gap is a TA earlier than if subframe n is a D subframe or an S subframe and even though subframe n+6 is a U subframe, the measurement gap is not overlapped with subframe n+6. In operation 3235, the UE performs a normal UL transmission in subframe n+6 being a U subframe. If subframe n of the reference cell is a D subframe or an S subframe, the start of the measurement gap coincides with the starting point of the D subframe or the S subframe. Thus, if subframe n+6 is a U subframe, the measurement gap is overlapped with subframe n+6. Then the UE does not perform UL transmission in subframe n+6 being a U subframe in operation 3240.

It has been described in the above embodiments of the present disclosure that if a measurement gap starts in subframe n, the starting points of the measurement gap coincides with the starting boundary of subframe n. Now a description will be given of an embodiment of the present disclosure in which if a measurement gap starts in subframe n, the starting points of the measurement gap coincides with the ending boundary of subframe n−1, instead of the starting boundary of subframe n.

Figure 33:
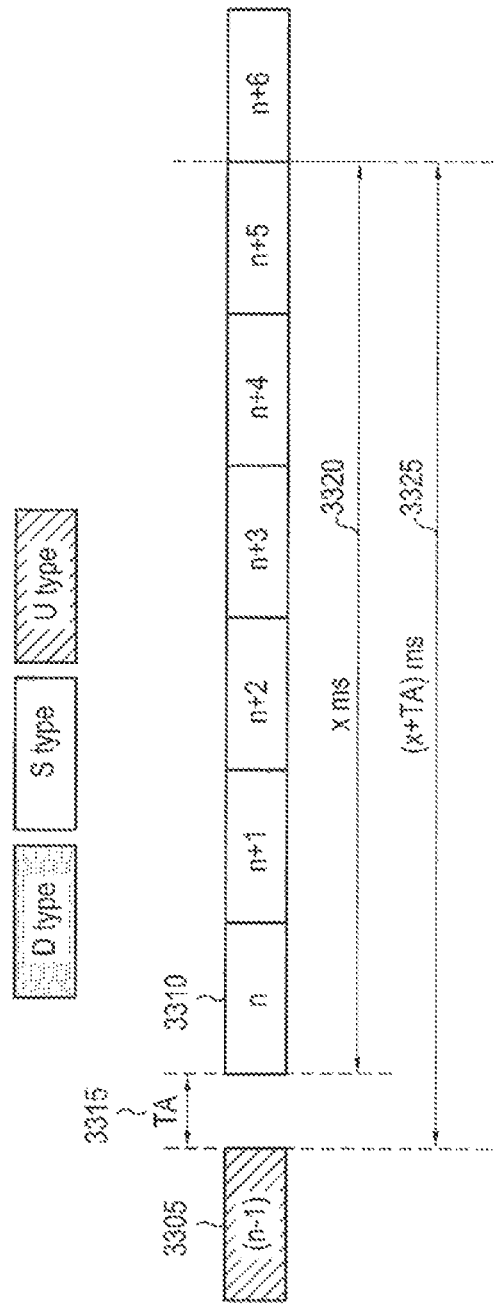
FIG. 33 illustrates an example embodiment of setting of a measurement gap according this disclosure.

FIG. 33 illustrates an example embodiment of a setting of a measurement gap according to this disclosure.

Referring to FIG. 33, subframe n−1 (a subframe 3305) is a U subframe and subframe n (a subframe 3315) is a D subframe. In this case, a measurement gap starts preferably at the ending boundary of subframe n−1 rather than at the starting boundary of subframe n. A gap as long as a TA 3315 is interposed between the U subframe and the D subframe and the gap 3315 is a time period during which U-to-D switching occurs. The measurement gap should include a time period during which a transceiver of a UE switches from a current frequency to a frequency to be measured. Accordingly, it is more efficient to directly switch from the UL to the DL of the measurement frequency than to perform U-to-D switching and then switching to the DL of the measurement frequency. In the example of FIG. 33, if a measurement gap 3320 starting at the starting boundary of subframe n is x ms long, a measurement gap 3325 starting at the ending boundary of subframe n−1 is extended by the TA 3315 and thus is (x+TA) ms long. If the measurement gap 3325 is configured to include the TA 3315, an actual time period allowed as the measurement gap is lengthened, from the perspective of the UE.

If subframe n+6 is a U subframe in a TDD communication system, the length of a time period spanning from subframe n to subframe n+5 is shorter than 6 ms in most cases. Accordingly, it is preferable not to perform UL transmission in subframe n+6 being a U subframe, in terms of complexity reduction of the UE. Even though UL transmission such as SRS or PUCCH transmission is scheduled in subframe n+6, the eNB ignores the UL signal, thereby preventing a problem caused by non-transmission of the UE.

Figure 34:
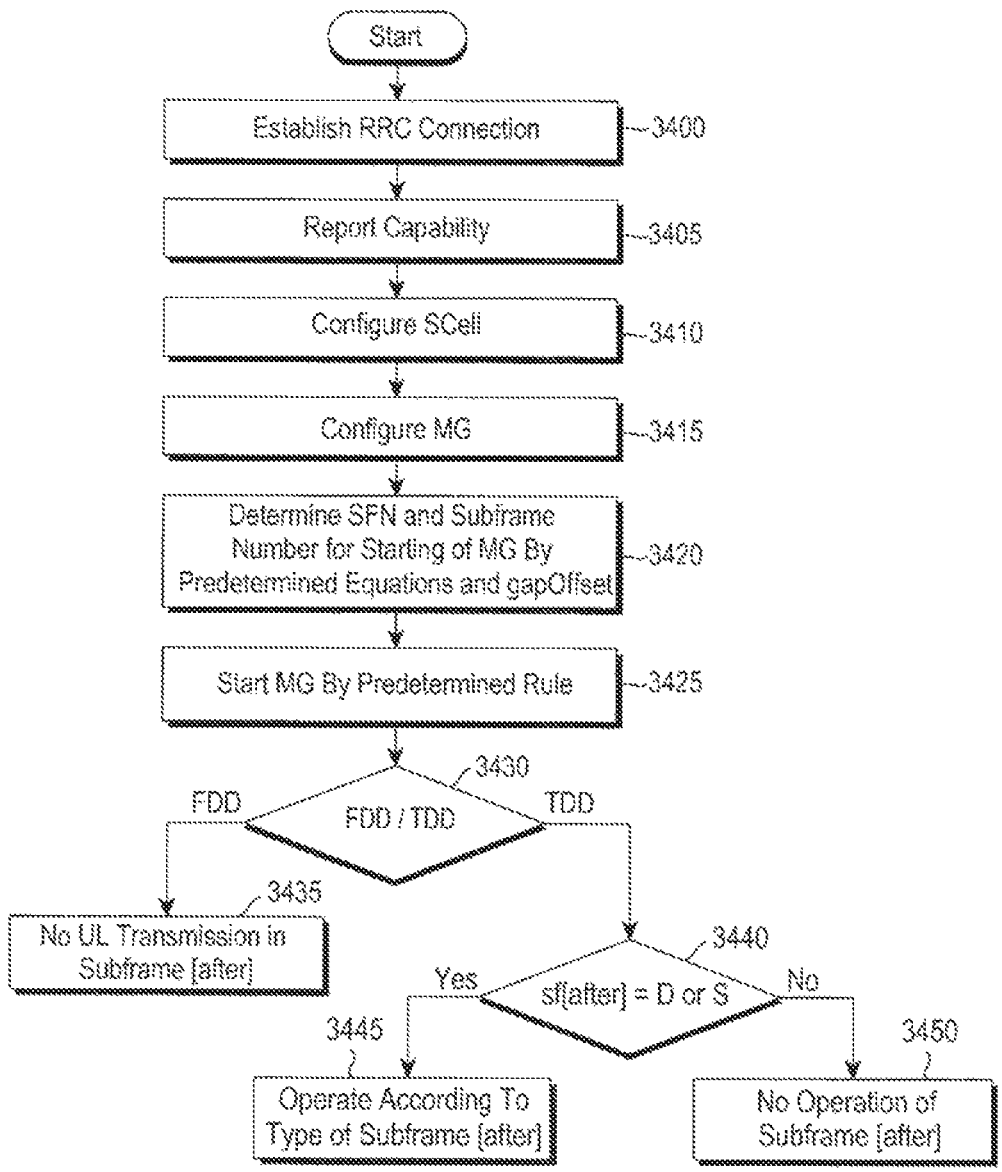
FIG. 34 is a flowchart illustrating an example embodiment of an operation of a UE in regards to a measurement gap according this disclosure.

FIG. 34 is a flowchart illustrating an example embodiment of an operation of a UE in regards to a measurement gap according to this disclosure.

Referring to FIG. 34, the UE receives system information about a serving cell, acquires information required for an RRC connection establishment procedure, and thus starts the RRC connection setup procedure for the serving cell in operation 3400. Once the RRC connection establishment procedure is completed, the serving cell becomes a PCell for the UE.

In operation 3405, the UE reports its capabilities to an eNB by a UE capability information message. If the UE supports CA, the UE capability information message includes information about UE-supported band combinations and the eNB determines what cell having what specific frequency to configure as an SCell based on the supported band combination information.

In operation 3410, the SCell is configured for the UE. The SCell is configured by transmitting an RRC control message including SCell configuration information from the eNB to the UE and establishing a signal path for supporting the frequency band of the SCell based on the SCell configuration information by the UE, or setting a transceiver of the UE for data transmission and reception in the SCell. The SCell configuration information includes, for example, information about a center frequency of the SCell, radio resources allocated to the UE in the SCell, and the like.

In operation 3415, the eNB configures a measurement gap for the UE. The measurement gap is configured by allocating gapOffset to the UE. For example, gapOffset is divided into a first gapOffset ranging from 0 to 39 and a second gapOffset ranging from 0 to 79 and one of the first and second gapOffsets is used. An MGRP corresponding to the first gapOffset can be 40 ms and an MGRP corresponding to the second gapOffset can be 80 ms.

The SCell configuration and the measurement gap configuration can take place simultaneously by one RRC message or sequentially by separate control messages. In the latter case, the order of the SCell configuration and the measurement gap configuration can be changed.

In operation 3420, the UE determines an SFN and a subframe number that specify the starting point of the measurement gap. For example, the SFN of a radio frame in which the measurement gap starts can be calculated by equation (1). For example, the number of the subframe in which the measurement gap starts can be calculated by equation (2).

In operation 3425, the UE determines the starting point of the measurement gap by applying the SFN and the subframe number specifying the starting point of the measurement gap to the PCell. For example, if subframe number n is calculated by equation (1) and equation (2), the UE selects a subframe ending at the last time from among subframes n−1 of current active serving cells and determines to start the measurement gap at the end of the selected subframe, subframe n−1. In other words, the UE starts the measurement gap at the moment all activities are completed in subframes n−1 of the current active serving cells. The activities in subframes n−1 include a UL transmission and a DL reception scheduled in subframes n−1 and a UL transmission and a DL reception commanded in subframes n−1. In the presence of only one active serving cell, that is, in the absence of a configured and activated SCell, the UE starts a measurement operation in the measurement gap at the end of subframe n−1 of the current serving cell.

In 3430, before subframe [after] starts, the UE determines whether a current operation mode is an FDD mode or a TDD mode. In the FDD mode, the UE goes to operation 3435 and in the TDD mode, the UE goes to operation 3440.

A UE reports, to an eNB, information indicating the number of layers that the UE can receive according to the channel state of a serving cell for which a MIMO operation has been configured. This information is called an RI.

An RI can be set on a serving cell basis. Preferably, the size of the RI is set according to a maximum number of layers that can be transmitted and received theoretically in the serving cell. For example, if up to four layers can be transmitted and received, the RI is preferably 2 bits. If up to eight layers can be transmitted and received, the RI is preferably 3 bits.

The maximum number of layers transmittable and receivable in a serving cell is determined to be the smaller between a maximum number of layers receivable at the UE (such as the MIMO capability of the UE) and a maximum number of layers transmittable from the eNB (such as the number of antenna ports configured at the eNB). The maximum number of layers supported by a UE on a DL is indicated by the UE category of the UE. A UE category is an index indicating a combination of parameters that define UL and DL capabilities of a UE. For example, the following eight categories can be defined as listed in TABLE 9.

TABLE 9

| UE Category | Maximum number of DL-SCH transport block bits received within a TTI (In carrier aggregation operation) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

In operation 3435, the UE omits a UL transmission scheduled in subframe [after]. The UE determines whether subframe [after] is a D subframe or an S subframe in operation 3440. If subframe [after] is a D subframe or an S subframe, the UE performs an appropriate operation according to the type of subframe [after] in operation 3445. That is, if subframe [after] is a D subframe, the UE receives a DL signal on a PHICH/PDCCH/PDSCH and if subframe [after] is an S subframe, the UE receives a DL signal on a PHICH/PDCCH and then switches to a UL transmission mode.

If subframe [after] is neither a D subframe nor an S subframe, that is, if subframe [after] is a U subframe, the UE does not perform an operation scheduled in subframe [after] in operation 3450.

While various embodiments of the present disclosure regarding setting of a measurement gap have been described above, it is to be clearly understood that the present disclosure is not limited to the afore-described specific operations. That is, at least a part of the operations according to the foregoing embodiments of the present disclosure can be combined or omitted within the scope of the present disclosure.

Another embodiment of the present disclosure provides Rank Indication (RI) reporting.

In TABLE 9, 'Maximum number of supported layers for spatial multiplexing in DL' is information related to MIMO capabilities of a UE.

Category 1 to Category 5 are defined in LTE Release 8 and Release 9, whereas Category 6, Category 7, and Category 8 are defined in LTE Release 10. Therefore, an eNB conforming to LTE Release 8 or Release 9 does not understand Category 6, Category 7, and Category 8 reported by UEs and UEs do not recognize an LTE release to which the eNB conforms. Therefore, a UE under Category 6, Category 7, and Category 8 reports one of Category 6, Category 7, and Category 8 and one of Category 1 to Category 5 to the eNB. For the convenience of description, a MIMO capability related to Category 1 to Category 5 is referred to as a first MIMO capability and a MIMO capability related to Category 6, Category 7, and Category 8 is referred to as a second MIMO capability.

For a MIMO capability mapped to a UE category, only one value can be reported for all frequency bands. However, the number of layers that a UE can receive can vary with frequency bands. For example, while the UE can receive as many layers as the number of antennas in a high frequency band, the UE can receive a smaller number of layers in a low frequency band because the distance between antennas is decreased to below a half of a frequency wavelength. The UE reports a MIMO capability on a band basis or on a band combination basis, thereby preventing the problem caused by different frequency bands. A MIMO capability for each band combination is reported in a supportedMIMO-Capability Information Element (IE) of a supportedBandCombination IE. supportedBandCombination was introduced to Release 10. A MIMO capability reported on a band combination basis is referred to as a third MIMO capability.

The UE reports its MIMO capability to the eNB as one, two, or three types of MIMO capabilities. A UE under Category 6, Category 7, or Category 8 reports the first, second, and third MIMO capabilities, a UE conforming to Release 10 or a higher-version Release under Category 1 to Category 5 reports the first and third MIMO capabilities, and a UE conforming to Release 8 or Release 9 reports the first MIMO capability.

The bit width (that is the number of bits) to be used in reporting an RI is determined based on a MIMO capability reported by a UE and specific configuration information indicated to the UE by an eNB. A DL transmission mode can further be considered. The UE is configured to receive a PDSCH in one of a plurality of transmission modes by higher layer signaling. A transmission mode defines the format of control information (such as a PDCCH) related to a PDSCH, a resource area to be searched for control information (a search space), and a transmission scheme of the PDSCH. The transmission scheme of the PDSCH includes, for example, an antenna configuration, transmit diversity, spatial multiplexing, Multi User (MU) MIMO, and the like.

Transmission modes, TM1 to TM8 are defined in LTE Release 8 and Release 9 and transmission modes TM9 and TM10 are defined in LTE Release 10 or a higher-version Release. Accordingly, if the eNB configures TM9 or TM10, the UE can determine that the eNB conforms to LTE Release 10 or a higher-version Release. Since the eNB conforming to LTE Release 10 or a higher-version Release may understand a MIMO capability for each band combination, the bit width for an RI can be determined based on the MIMO capability for each band combination.

Figure 35:
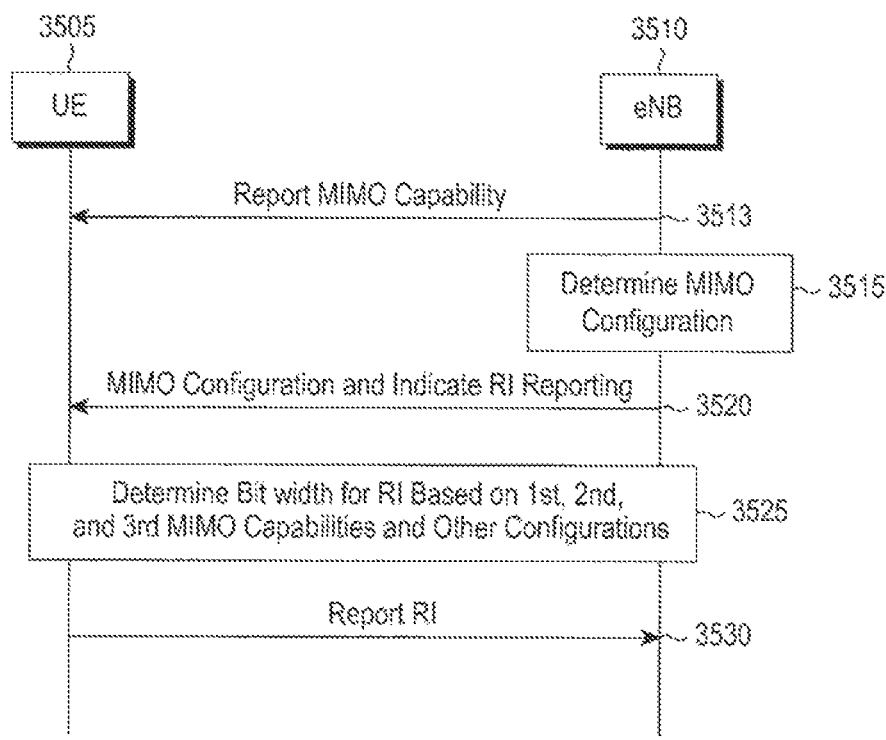
FIG. 35 is a diagram illustrating an example embodiment of a signal flow for an overall operation for determining the number of bits in a Rank Indicator (RI) according to this disclosure.

FIG. 35 is a diagram illustrating a signal flow for an overall operation for determining the bit width for an RI according to an embodiment of the present disclosure.

Referring to FIG. 35, a UE 3505 reports MIMO capability information to an eNB 3510 in operation 3513. The MIMO capability information can indicate a part or all of the first, second, and third MIMO capabilities according to the category and Release of the UE.

The eNB 3510 determines based on a MIMO capability of the UE 3505 and a MIMO capability of the eNB 3510 whether to configure MIMO for the UE 3505 and how many antennas to configure for a MIMO operation of the UE 3505 and generates MIMO configuration information based on the determination in operation 3515.

The eNB 3510 transmits the MIMO configuration information, for example, information indicating the number of antenna ports to be used and information indicating whether an RI is to be reported to the UE 3505 by a predetermined control message in operation 3520. The UE 3505 and the eNB 3510 determine the bit width for an RI according to predetermined information and a predetermined rule in operation 3525. Because the UE and the eNB use the same algorithm, they acquire the same bit width for the RI. The predetermined information and the predetermined rule will be described later. In operation 3530, the UE 3505 reports an RI in the determined bit width and the eNB 3510 determines the number of layers to be transmitted to the UE 3505 by receiving and interpreting the RI according to the bit width for the RI.

Figure 36:
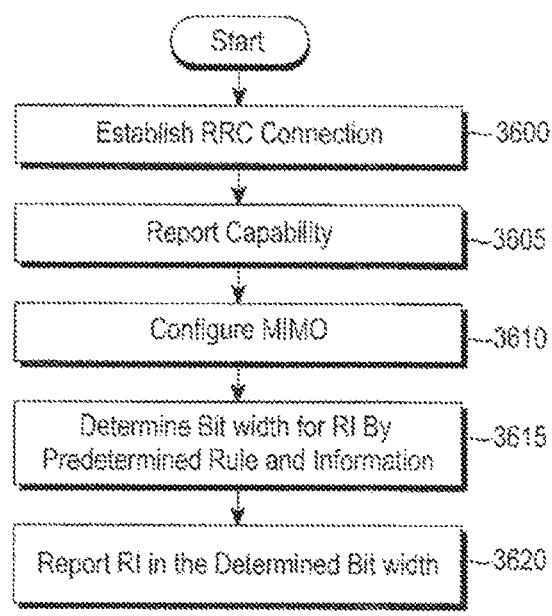
FIG. 36 is a flowchart illustrating an example embodiment of an operation of a UE for determining the number of bits in an RI according to this disclosure.

FIG. 36 is a flowchart illustrating an example embodiment of an operation of a UE for determining the bit width for an RI according to an embodiment of the present disclosure. While the following description is given of a UE operation, an eNB determines the bit width for an RI by the same algorithm.

Referring to FIG. 36, a UE receives system information about a serving cell, acquires information required to establish an RRC connection establishment procedure from the system information, and starts the RRC connection establishment procedure for the serving cell in operation 3600. Upon completion of the RRC connection establishment procedure, the serving cell becomes a PCell for the UE.

In operation 3605, the UE reports its capability to the eNB by a capability information message. If the UE supports CA, the UE includes information about UE-supported band combinations in the capability information message and the eNB determines what cell having what specific frequency to configure as an SCell for the UE based on the supported band combination information. The capability information message includes the following MIMO information.
  If the UE conforms to Release 8 or Release 9, first MIMO capability.
  If the UE conforms to Release 10 or a higher-version Release and belongs to Category 1 to Category 5, the first MIMO capability and third MIMO capability.
  If the UE conforms to Release 10 or a higher-version Release and belongs to Category 6 to Category 8, the first MIMO capability, a second MIMO capability, and the third MIMO capability.

In operation 3610, MIMO is configured for the serving cells of the UE. Then the UE receives a control message indicating reporting of an RI for the serving cell from the eNB.

In operation 3615, the UE determines the bit width for the RI to be reported for the serving cell based on predetermined information according to a predetermined rule. Herein, the UE can use one of the following rules.
  [Rule 1]
  A reference UE capability is determined based on a transmission mode configured for a serving cell. That is, if the transmission mode is Transmission Mode (TM) 9 or TM10, the third MIMO capability is determined to be the reference UE capability. Otherwise, for example, if the transmission mode is TM4 or TM8, the first MIMO capability determined to be the reference UE capability.
  An eNB reference capability is determined based on the antenna configuration of the eNB. That is, the antenna configuration of the eNB can include a maximum number of antenna ports available for data transmission and can be indicated to the UE by system information or a dedicated RRC message.
  The bit width for an RI is determined based on the minimum of the number of layers corresponding to the UE reference capability and the number of layers corresponding to the eNB reference capability. If the minimum value is 4, the RI is 2 bits and if the minimum value is 8, the RI is 3 bits.

If TM4 or TM8 is configured by the eNB, this means that the eNB is highly likely to be a Release 8 eNB or a Release 9 eNB. If TM9 or TM10 is configured by the eNB, this means that the eNB is highly likely to be a Release 10 eNB or an eNB conforming to a higher-version Release. The Release 10 eNB or an eNB conforming to a higher-version Release can understand the third MIMO capability.

The third MIMO capability for a serving cell means a MIMO capability reported in supportedBandCombination corresponding to a configuration for a corresponding time point. For example, if one serving cell is configured in band X and one serving cell is configured in band Y, a third MIMO capability for the serving cell of band X is a MIMO capability reported for band X in supportedBandCombination configured for band X and band Y. In other words, considering the third MIMO capability, the number of layers corresponding to a MIMO capability reported for the frequency band of a serving cell is determined to the UE reference capability.

[Rule 2]
  If at least two serving cells are configured, a third MIMO capability for a corresponding serving cell is determined to be a UE reference capability.
  If only one serving cell is configured and TM9 or TM10 is configured for a UE, a third MIMO capability for the serving cell is determined to be a UE reference capability.
  If only one serving cell is configured and TM4 or TM8 is configured for a UE, a first MIMO capability is determined to be a UE reference capability.
  An eNB reference capability is determined based on the antenna configuration of an eNB.
  The bit width for an RI is determined according to the minimum of the number of layers corresponding to the UE reference capability and the number of layers corresponding to the eNB reference capability.

[Rule 3]
  A UE reference capability is determined according to a transmission mode configured for a serving cell. If TM4 or TM8 is configured in the serving cell for a UE, a first MIMO capability is determined to be a UE reference capability. If TM9 or TM10 is configured in the serving cell and the UE belongs to Category 1 to Category 5, the first MIMO capability is determined to be the UE reference capability. If TM9 or TM10 is configured and the UE belongs to Category 6 to Category 8, a second MIMO capability is determined to be the UE reference capability.
  An eNB reference capability is determined based on the antenna configuration of an eNB.
  The bit width for an RI is determined according to the minimum of the number of layers corresponding to the UE reference capability and the number of layers corresponding to the eNB reference capability.

As noted from TABLE 9, the second MIMO capability for Category 6 and Category 7 is represented by two values, 2 and 4. This is because different MIMO capabilities of a UE for CA and non-CA are considered. If the second MIMO capability is used as a UE reference capability for a UE under Category 6 or Category 7, the value of the second MIMO capability is determined according to the following rule.

If only one serving cell is configured, the second MIMO capability is the higher between the two values, that is, 4.

If two serving cells are configured, the second MIMO capability 2 is the lower between the two values, that is, 2.

[Rule 4]
  If a predetermined indicator is received in a predetermined control message from an eNB, a third MIMO capability for a corresponding serving cell is determined to be a UE reference capability. The indicator can be used to command a UE to use the third MIMO capability.
  If the predetermined indicator is not received in the predetermined control message from the eNB, a first MIMO capability is determined to be the UE reference capability.
  An eNB reference capability is determined based on the antenna configuration of an eNB.
  The bit width for an RI is determined according to the minimum of the number of layers corresponding to the UE reference capability and the number of layers corresponding to the eNB reference capability.

The eNB does not transmit the indicator to a Release 8 UE or a Release 9 UE. Only an eNB that can understand the third MIMO capability transmits the predetermined indicator. Therefore, the UE determines what MIMO capability to be used as the UE reference capability depending on the presence or absence of the indicator.

The indicator can be transmitted only in a control message. The control message can be, for example, an RRC control message including information indicating RI reporting or MIMO configuration information.

In operation 3620, the UE encodes an RI based on the determined bit width for the RI and transmits the coded RI in predetermined transmission resources at a predetermined time point to the eNB.

After establishing an RRC connection for the UE, receiving the capability information message, and indicating RI reporting to the UE, the eNB determines the bit width for the RI according to the same rule and information as used in the UE in operation 3615. The eNB can receive the RI having the determined bit width from the UE in predetermined transmission resources at a predetermined time from the UE and can decode the RI normally.

The UE and the eNB that perform the operations illustrated in FIGS. 30 to 36 have the configurations illustrated in FIGS. 11 and 12, respectively.

The proposed method and apparatus for performing communication using TDD cells having different frequency bands can be implemented as computer-readable code in a computer-readable recording medium. The computer-readable recording medium can include any kind of recording device storing computer-readable data. Examples of the recording medium can include Read Only Memory (ROM), Random Access Memory (RAM), optical disk, magnetic tape, floppy disk, hard disk, non-volatile memory, and the like, and can also include the medium that is implemented in the form of carrier waves (for example, transmission over the Internet). In addition, the computer-readable recording medium can be distributed over the computer systems connected over the network, and computer-readable codes can be stored and executed in a distributed manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a user equipment (UE) in a wireless communication system, the method comprising:
  receiving, from a base station (BS) and by the UE, configuration information related to a measurement gap, wherein the measurement gap comprises a time period during which the UE does not perform an uplink transmission and a downlink reception;
  determining a subframe to identify a starting point of the measurement gap based on the configuration information;
  starting a measurement at an end of a latest subframe occurring immediately before the measurement gap based on the determined subframe; and
  performing an operation in a subframe immediately after the measurement gap if the subframe occurring immediately before the measurement gap is a downlink subframe.

2. The method of claim 1, wherein if a plurality of serving cells are configured for the UE, the measurement starts at an end of the latest subframe among a plurality of subframes immediately before a subframe having a subframe number of the determined subframe in the plurality of serving cells.

3. The method of claim 1, wherein performing the operation comprises:
identifying whether the subframe immediately before the measurement gap is a downlink subframe; and
if the subframe immediately before the measurement gap is a downlink subframe, blocking an uplink transmission in the subframe immediately after the measurement gap.

4. The method of claim 1, wherein performing the operation comprises:
identifying whether the UE is in a Frequency Division Duplexing (FDD) mode or a Time Division Duplexing (TDD) mode;
if the UE is in the TDD mode, identifying whether the subframe immediately before the measurement gap is a downlink subframe; and
if the subframe immediately before the measurement gap is a downlink subframe, blocking an uplink transmission in the subframe immediately after the measurement gap.

5. The method of claim 1, wherein the configuration information includes information about a gap offset that is used to determine the starting point of the measurement gap and information about a measurement gap repetition period.

6. The method of claim 1, wherein the configuration information comprises at least one of information about a center frequency of a cell, radio resources allocated to the UE in the cell, and the uplink/downlink (UL/DL) configuration of the cell.

7. A method by a base station (BS) in a wireless communication system, the method comprising:
transmitting, by the BS and to a user equipment (UE), configuration information related to a measurement gap, wherein the measurement gap comprises a time period during which the UE does not perform an uplink transmission and a downlink reception;
determining subframes included in the measurement gap based on the configuration information; and
if a subframe immediately before the measurement gap is a downlink subframe, blocking a monitoring of an uplink transmission from the UE in an uplink subframe immediately after the measurement gap, wherein the UE starts a measurement at an end of a latest subframe that occurs immediately before the measurement gap based on the configuration information.

8. The method of claim 7, wherein blocking comprises:
identifying whether the UE is in a Frequency Division Duplexing (FDD) mode or a Time Division Duplexing (TDD) mode;
if the UE is in the FDD mode, determining that the UE does not perform an uplink transmission in the subframe immediately after the measurement gap; and
if the UE is in the TDD mode and the subframe immediately before the measurement gap is a downlink subframe, determining that the UE does not perform an uplink transmission in the subframe immediately after the measurement gap.

9. The method of claim 7, wherein the configuration information includes information about a gap offset that is used to determine the starting point of the measurement gap and information about a measurement gap repetition period.

10. The method of claim 7, wherein the configuration information comprises at least one of information about a center frequency of a cell, radio resources allocated to the UE in the cell, and the uplink/downlink (UL/DL) configuration of the cell.

11. An apparatus of a user equipment (UE) to perform communication in a wireless communication system, the apparatus comprising:
a transceiver configured to receive configuration information related to a measurement gap, wherein the measurement gap comprises a time period during which the UE does not perform an uplink transmission and a downlink reception; and
a controller configured to:
determine a subframe to identify a starting point of the measurement gap based on the configuration information,
determine to start a measurement at an end of a latest subframe occurring immediately before the measurement gap based on the determined subframe, and
control the transceiver to perform an operation in a subframe immediately after the measurement gap if the subframe occurring immediately before the measurement gap is a downlink subframe.

12. The apparatus of claim 11, wherein if a plurality of serving cells are configured for the UE, the measurement starts at an end of the latest subframe among a plurality of subframes immediately before a subframe having a subframe number of the determined subframe in the plurality of serving cells.

13. The apparatus of claim 11, wherein the controller is configured to identify whether the subframe immediately before the measurement gap is a downlink subframe, and if the subframe immediately before the measurement gap is a downlink subframe, the controller is configured to block an uplink transmission in the subframe immediately after the measurement gap.

14. The apparatus of claim 11, wherein if the UE is in Time Division Duplexing (TDD) mode and the subframe immediately before the measurement gap is a downlink subframe, the controller is configured to block the transceiver from performing an uplink transmission in the subframe immediately after the measurement gap.

15. The apparatus of claim 11, wherein the configuration information includes information about a gap offset that is used to determine the starting point of the measurement gap and information about a measurement gap repetition period.

16. The apparatus of claim 11, wherein the configuration information comprises at least one of information about a center frequency of a cell, radio resources allocated to the UE in the cell, and the uplink/downlink (UL/DL) configuration of the cell.

17. An apparatus of a base station (BS) to perform communication in a wireless communication system, the apparatus comprising:
a transceiver configured to transmit, to a user equipment (UE), configuration information related to a measurement gap, wherein the measurement gap comprises a time period during which the UE does not perform an uplink transmission and a downlink reception; and
a controller configured to:
determine subframes included in the measurement gap based on the configuration information, and
if a subframe immediately before the measurement gap is a downlink subframe, block the transceiver from monitoring an uplink transmission from the UE in an uplink subframe immediately after the measurement gap, wherein the UE start measurement at an end of a latest subframe occurring immediately before the measurement gap based on the configuration information.

18. The apparatus of claim 17, wherein if the UE is in a Frequency Division Duplexing (FDD) mode, the controller is configured to identify that the UE does not perform an uplink transmission in the subframe immediately after the measurement gap, and if the UE is in a Time Division Duplexing (TDD) mode and the subframe immediately before the measurement gap is a downlink subframe, the controller is configured to determine that the UE does not perform an uplink transmission in the subframe immediately after the measurement gap.

19. The apparatus of claim 17, wherein the configuration information includes information about a gap offset that is used to determine the starting point of the measurement gap and information about a measurement gap repetition period.

20. The apparatus of claim 17, wherein the configuration information comprises at least one of information about a center frequency of a cell, radio resources allocated to the UE in the cell, and the uplink/downlink (UL/DL) configuration of the cell.

* * * * *